US011934147B2

(12) United States Patent
Hashimoto et al.

(10) Patent No.: US 11,934,147 B2
(45) Date of Patent: Mar. 19, 2024

(54) TONER

(71) Applicant: CANON KABUSHIKI KAISHA, Tokyo (JP)

(72) Inventors: Yasuhiro Hashimoto, Shizuoka (JP); Koji Nishikawa, Shizuoka (JP); Yuujirou Nagashima, Shizuoka (JP); Tomoya Nagaoka, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 146 days.

(21) Appl. No.: 17/195,716

(22) Filed: Mar. 9, 2021

(65) Prior Publication Data

US 2021/0294238 A1 Sep. 23, 2021

(30) Foreign Application Priority Data

Mar. 16, 2020 (JP) ................................ 2020-045846

(51) Int. Cl.

| | |
|---|---|
| ***G03G 9/097*** | (2006.01) |
| ***G03G 9/08*** | (2006.01) |
| ***G03G 9/087*** | (2006.01) |

(52) U.S. Cl.

CPC ....... *G03G 9/09775* (2013.01); *G03G 9/0819* (2013.01); *G03G 9/08711* (2013.01); *G03G 9/08755* (2013.01); *G03G 9/08757* (2013.01)

(58) Field of Classification Search

None

See application file for complete search history.

(56) References Cited

U.S. PATENT DOCUMENTS

| | | | |
|---|---|---|---|
| 5,601,913 | A | 2/1997 | Ohtani et al. |
| 7,112,393 | B2 | 9/2006 | Komoto et al. |
| 7,273,686 | B2 | 9/2007 | Onuma et al. |
| 7,288,354 | B2 | 10/2007 | Moribe et al. |
| 7,306,889 | B2 | 12/2007 | Okubo et al. |
| 7,351,509 | B2 | 4/2008 | Moribe et al. |

(Continued)

FOREIGN PATENT DOCUMENTS

| | | | |
|---|---|---|---|
| JP | 4-50859 A | 2/1992 | |
| JP | 3696954 B2 * | 9/2005 | ............. G03G 13/20 |

(Continued)

OTHER PUBLICATIONS

JP-2013140235-A translation (Year: 2023).*

(Continued)

*Primary Examiner* — Peter L Vajda

(74) *Attorney, Agent, or Firm* — VENABLE LLP

(57) ABSTRACT

A toner comprising a toner particle comprising a binder resin and organosilicon polymer particles on a surface of the toner particle, wherein the binder resin comprising an amorphous resin and a crystalline polyester resin, an absolute value $|SP_{cpes}-SP_{si}|$ of a difference between an SP value ($SP_{si}$) of the organosilicon polymer particles and an SP value ($SP_{cpes}$) of the crystalline polyester resin is not more than 2.00 $(cal/cm^3)^{1/2}$, and an amount of adsorbed water in the organosilicon polymer particles at a temperature of 30° C. and a humidity of 80% RH is not more than 20 mg/g.

15 Claims, 3 Drawing Sheets

(56) References Cited

U.S. PATENT DOCUMENTS

| | | | | |
|---|---|---|---|---|
| 7,422,832 | B2 | 9/2008 | Ogawa et al. | |
| 7,459,253 | B2 | 12/2008 | Abe et al. | |
| 7,582,401 | B2 | 9/2009 | Ogawa et al. | |
| 7,745,089 | B2 | 6/2010 | Okubo et al. | |
| 8,053,156 | B2 | 11/2011 | Abe et al. | |
| 8,247,147 | B2 | 8/2012 | Abe et al. | |
| 8,367,289 | B2 | 2/2013 | Isono et al. | |
| 8,440,382 | B2 | 5/2013 | Isono et al. | |
| 8,497,054 | B2 | 7/2013 | Sugiyama et al. | |
| 8,652,737 | B2 | 2/2014 | Handa et al. | |
| 8,778,581 | B2 | 7/2014 | Nonaka et al. | |
| 8,916,319 | B2 | 12/2014 | Ikeda et al. | |
| 8,940,467 | B2 | 1/2015 | Hashimoto et al. | |
| 9,201,323 | B2 | 12/2015 | Nishikawa et al. | |
| 9,229,345 | B2 | 1/2016 | Ikeda et al. | |
| 9,261,804 | B2 | 2/2016 | Yamazaki et al. | |
| 9,341,970 | B2 | 5/2016 | Yoshiba et al. | |
| 9,423,714 | B2 | 8/2016 | Kenmoku et al. | |
| 9,470,993 | B2 | 10/2016 | Nishikawa et al. | |
| 9,588,450 | B2 | 3/2017 | Tsuda et al. | |
| 9,606,462 | B2 | 3/2017 | Nomura et al. | |
| 9,715,188 | B2 | 7/2017 | Terauchi et al. | |
| 9,772,570 | B2 | 9/2017 | Tsuda et al. | |
| 9,804,514 | B2 | 10/2017 | Suzumura et al. | |
| 9,829,818 | B2 | 11/2017 | Yoshiba et al. | |
| 9,841,692 | B2 | 12/2017 | Hasegawa et al. | |
| 9,964,874 | B2 | 5/2018 | Suzumura et al. | |
| 9,971,263 | B2 | 5/2018 | Fukudome et al. | |
| 10,012,919 | B2 | 7/2018 | Matsui et al. | |
| 10,101,683 | B2 | 10/2018 | Nishikawa et al. | |
| 10,156,800 | B2 | 12/2018 | Tsuda et al. | |
| 10,197,934 | B2 | 2/2019 | Matsui et al. | |
| 10,228,627 | B2 | 3/2019 | Nagashima et al. | |
| 10,289,016 | B2 | 5/2019 | Fukudome et al. | |
| 10,295,920 | B2 | 5/2019 | Nishikawa et al. | |
| 10,295,921 | B2 | 5/2019 | Ohmori et al. | |
| 10,303,075 | B2 | 5/2019 | Tanaka et al. | |
| 10,310,397 | B2 | 6/2019 | Sano et al. | |
| 10,503,090 | B2 * | 12/2019 | Tominaga | G03G 9/09725 |
| 10,698,327 | B2 | 6/2020 | Nagashima et al. | |
| 10,732,529 | B2 | 8/2020 | Yoshiba et al. | |
| 10,845,722 | B2 | 11/2020 | Nishikawa et al. | |
| 10,852,650 | B2 | 12/2020 | Inoue et al. | |
| 10,942,463 | B2 | 3/2021 | Yoshiba et al. | |
| 10,983,450 | B2 | 4/2021 | Nomura et al. | |
| 10,983,451 | B2 | 4/2021 | Hashimoto et al. | |
| 2015/0056549 | A1 * | 2/2015 | Ikeda | G03G 9/08711 430/108.22 |
| 2015/0125790 | A1 | 5/2015 | Hotta et al. | |
| 2015/0220013 | A1 | 8/2015 | Nishikawa et al. | |
| 2016/0139522 | A1 | 5/2016 | Yoshiba et al. | |
| 2016/0161874 | A1 | 6/2016 | Yamazaki et al. | |
| 2016/0378003 | A1 * | 12/2016 | Arimura | G03G 9/0836 430/110.1 |
| 2017/0123333 | A1 | 5/2017 | Kuroki et al. | |
| 2017/0227861 | A1 * | 8/2017 | Zenitani | G03G 15/08 |
| 2017/0329246 | A1 * | 11/2017 | Yamawaki | G03G 9/08711 |
| 2018/0329329 | A1 * | 11/2018 | Nakamura | G03G 9/0819 |
| 2019/0369512 | A1 * | 12/2019 | Okuda | G03G 5/1473 |
| 2019/0369529 | A1 * | 12/2019 | Yagi | G03G 9/08797 |
| 2020/0026208 | A1 * | 1/2020 | Terui | G03G 9/08755 |
| 2020/0166861 | A1 | 5/2020 | Uratani et al. | |
| 2020/0183293 | A1 | 6/2020 | Kinumatsu et al. | |
| 2020/0183294 | A1 | 6/2020 | Fukudome et al. | |
| 2020/0209768 | A1 * | 7/2020 | Furui | G03G 9/09775 |
| 2020/0209770 | A1 | 7/2020 | Nishikawa et al. | |
| 2020/0363746 | A1 | 11/2020 | Komiya et al. | |
| 2020/0379363 | A1 * | 12/2020 | Nagaoka | G03G 9/08711 |

FOREIGN PATENT DOCUMENTS

| | | | | |
|---|---|---|---|---|
| JP | 3906575 | B2 * | 4/2007 | G03G 13/20 |
| JP | 2007-171272 | A | 7/2007 | |
| JP | 2013-140235 | A | 7/2013 | |
| JP | 2013140235 | A * | 7/2013 | |
| JP | 2017-62316 | A | 3/2017 | |
| JP | 2018-54961 | A | 4/2018 | |
| WO | WO-2020045037 | A1 * | 3/2020 | |

OTHER PUBLICATIONS

JP-3906575-B2 translation (Year: 2023).*

JP-3696954-B2 (Year: 2023).*

Yuji Harazaki, "Basic Coating Science" pp. 54-57, Sep. 15, 1977, Maki Shoten Publishing.

U.S. Appl. No. 17/193,079, Tomoya Nagaoka, filed Mar. 5, 2021.

U.S. Appl. No. 17/196,555, Koji Nishikawa, filed Mar. 9, 2021.

U.S. Appl. No. 17/197,102, Yuujirou Nagashima, filed Mar. 10, 2021.

* cited by examiner

TONER

BACKGROUND OF THE INVENTION

Field of the Invention

The present disclosure relates to an electrostatic charge image developing toner used for forming an image according to an electrophotographic method.

Description of the Related Art

In recent years, quality requirements for image forming apparatuses such as copying machines and printers have become strict and hence higher performance for toners has been required. In particular, in full color copying machines or full color printers, there are strong demands for size reduction, weight reduction, energy saving, high image quality, and environmental friendliness, and moreover further improvement in durability and low-temperature fixability has been required. With regard to toners, there are demands for more favorable durability and low-temperature fixability, a smaller particle diameter, and reduction of differences in charging performance in different environments.

In response to the requirements, Japanese Patent Application Publication No. 2007-171272 discloses a method for producing a toner by polymerization in which, in a toner having a core-shell structure, the particle diameter of the toner and the average circularity and the hardness of the toner are set to be within appropriate ranges, such that favorable storability and fixability are obtained, and the toner having high image quality and excellent durability is produced. In addition, Japanese Patent Application Publication No. 2018-54%1 discloses a toner that exhibits excellent developing performance in long-term use by externally adding an external additive having a specific primary particle diameter and containing a specific resin. In addition, Japanese Patent Application Publication No. 2017-62316 discloses a toner that suppresses fogging and a decrease in image density when left alone, by externally adding elastomer particles containing a silicone oil and titanium oxide containing a specific element. In addition, Japanese Patent Application Publication No. 2013-140235 discloses a toner which, when externally added with a specific number of silicone resin particles having a specific particle diameter and particle diameter distribution and positively charged inorganic fine particles having a specific particle diameter, excels in environmental stability of charging performance and printing durability.

SUMMARY OF THE INVENTION

However, according to studies by the inventors, Japanese Patent Application Publication No. 2007-171272 has a problem of durability under a high temperature and high humidity environment and under a low temperature and low humidity environment. In addition, Japanese Patent Application Publication No. 2018-54961 has a problem of durability and also a problem of fixability under a high temperature and high humidity environment and under a low temperature and low humidity environment. In addition, Japanese Patent Application Publication No. 2017-62316 and Japanese Patent Application Publication No. 2013-140235 have a problem of durability and also have a problem of fixability under a low temperature and low humidity environment.

In addition, none of the above patent literature mentions long-term storage stability of a fixed image. The present disclosure provides a toner having excellent durability, fixability and long-term storage stability of the obtained fixed image.

That is, the present disclosure relates to a toner comprising a toner particle comprising a binder resin and organosilicon polymer particles on a surface of the toner particle, wherein the binder resin comprising an amorphous resin and a crystalline polyester resin, an absolute value $|SP_{cpes}-SP_{si}|$ of a difference between an SP value ($SP_{si}$) of the organosilicon polymer particles and an SP value ($SP_{cpes}$) of the crystalline polyester resin is not more than 2.00 $(cal/cm^3)^{1/2}$, and an amount of adsorbed water in the organosilicon polymer particles at a temperature of 30° C. and a humidity of 80% RH is not more than 20 mg/g.

The present disclosure can provide a toner having excellent durability, fixability and long-term storage stability of the obtained fixed image. Further features of the present invention will become apparent from the following description of exemplary embodiments with reference to the attached drawings.

DESCRIPTION OF THE EMBODIMENTS

Figure 1:
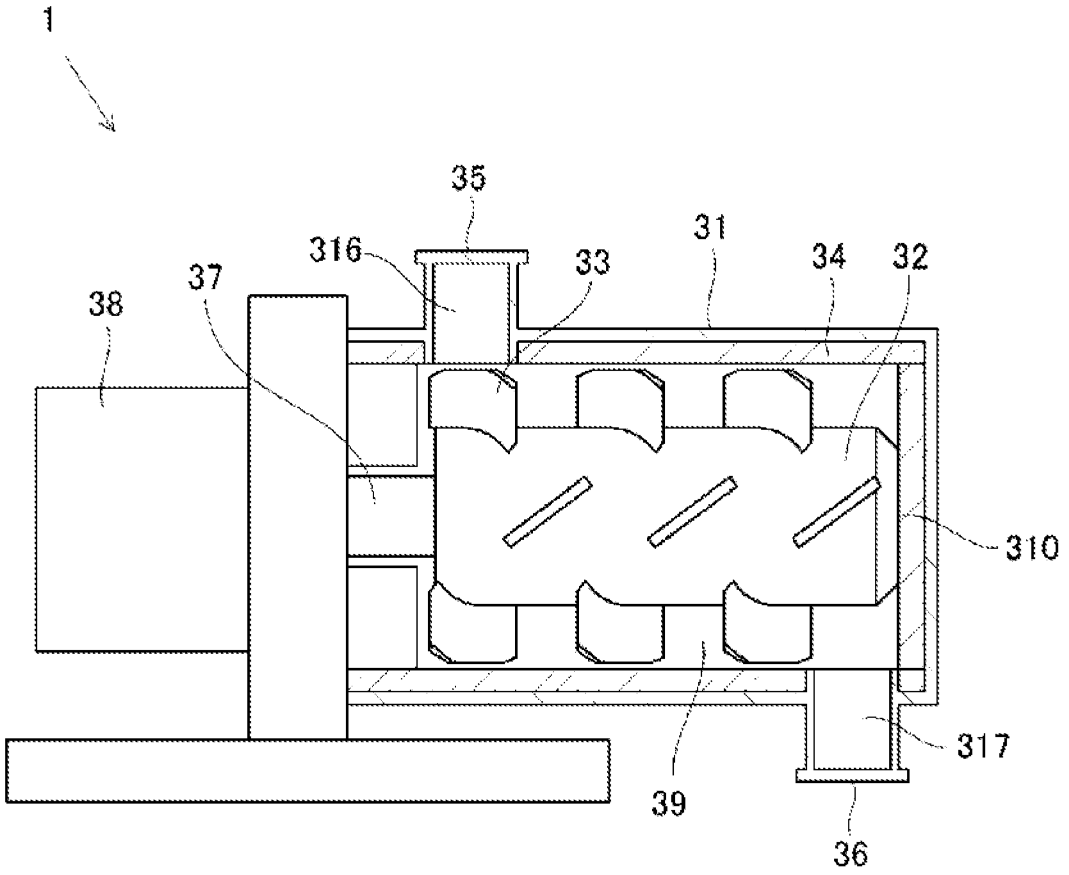
FIG. 1 shows an example of a mixing process apparatus.

Unless specifically indicated otherwise, the expressions "from XX to YY" and "XX to YY" that show numerical value ranges refer to numerical value ranges that include the lower limit and upper limit that are the end points. When numerical value ranges are provided in stages, the upper limits and lower limits of the individual numerical value ranges may be combined in any combination.

The above effect can be obtained by a toner comprising a toner particle comprising a binder resin and organosilicon polymer particles on a surface of the toner particle, wherein the binder resin comprising an amorphous resin and a crystalline polyester resin, an absolute value $|SP_{cpes}-SP_{si}|$ of a difference between an SP value ($SP_{si}$) of the organosilicon polymer particles and an SP value ($SP_{cpes}$) of the crystalline polyester resin is not more than 2.00 $(cal/cm^3)^{1/2}$, and an amount of adsorbed water in the organosilicon polymer particles at a temperature of 30° C. and a humidity of 80% RH is not more than 20 mg/g.

The inventors consider the above effects to be exhibited for the following reasons. When the toner particle contains a crystalline polyester resin, fixability and storability are excellent, but when the obtained fixed image is stored for a long period, the crystalline polyester resin easily recrystallizes on the surface of the fixed image. Therefore, they found that the surface of the fixed image is roughened, the smoothness is reduced, and thus there is a problem of glossiness decreasing. Therefore, they found that, when the organosilicon polymer particles having the above specific SP value difference and amount of adsorbed water are provided on the surface of the toner particle containing a crystalline polyester resin, the organosilicon polymer particles are also present on the surface of the obtained fixed image, and recrystallization of crystalline polyester resins on the surface of the fixed image can be minimized.

Since the SP value ($SP_{si}$) of the organosilicon polymer particles is close to the SP value ($SP_{cpes}$) of the crystalline polyester resin, they are easily compatible with each other. In addition, since the surface of the organosilicon polymer particles and water molecules are not easily compatible with each other, the crystalline polyester resin in the fixed image is distributed so that it comes in contact with the organosilicon polymer particles, and the surface energy is lowered, and thus recrystallization of crystalline polyester resins is minimized. In particular, not only the surface of the organosilicon polymer particles inside the fixed image but also the surface of the organosilicon polymer particles exposed to the surface of the fixed image is not hindered by water in the atmosphere but acts to effectively minimize recrystallization of crystalline polyester resins, and thus the above effects are sufficiently obtained.

The absolute value $|SP_{cpes}-SP_{si}|$ of the difference between the SP value ($SP_{cpes}$) of the crystalline polyester resin and the SP value ($SP_{si}$) of the organosilicon polymer particles is not more than 2.00 $(cal/cm^3)^{1/2}$. When the SP value difference exceeds 2.00, since the crystalline polyester resin and the organosilicon polymer particles are not easily compatible with each other, the effect of minimizing recrystallization of the crystalline polyester resin is weak. $|SP_{cpes}-SP_{si}|$ is preferably not more than 1.90 $(cal/cm^3)^{1/2}$. The lower limit is not particularly limited, and is preferably at least 0.05 $(cal/cm^3)^{1/2}$, and more preferably at least 0.10 $(cal/cm^3)^{1/2}$.

In addition, the amount of adsorbed water of the organosilicon polymer particles at a temperature of 30° C. and a humidity of 80% RH is not more than 20 mg/g. When the amount of adsorbed water exceeds 20 mg/g, since the surface of the organosilicon polymer particles exposed to the surface of the fixed image is not effectively utilized by water in the atmosphere, the above effect is reduced. The amount of adsorbed water is preferably not more than 15 mg/g. The lower limit is not particularly limited and is preferably at least 3 mg/g, and more preferably at least 5 mg/g. The amount of adsorbed water can be controlled according to organosilicon polymer particle production conditions.

Hydrophobicity of Organosilicon Polymer Particles

In the wettability test of the organosilicon polymer particles using a mixed solvent of methanol/water, the concentration of methanol when the transmittance of light with a wavelength of 780 nm is 50% is preferably 45 vol % to 80 vol % and more preferably 50 vol % to 70 vol %. The hydrophobicity of the organosilicon polymer particles can be controlled according to organosilicon polymer particle production conditions including hydrophobic treatment conditions for the organosilicon polymer particles. Not only is there an effect of minimizing recrystallization of the crystalline polyester resin on the surface of the fixed image because the organosilicon polymer particles do not easily adsorb water, but the charging performance is also excellent because they are appropriately hydrophobic. This is because, when the organosilicon polymer particles having the above hydrophobicity are present on the surface of the toner, the surface of the organosilicon polymer particles is appropriately polarized with water in the atmosphere.

Content of Organosilicon Polymer Particles

The content of the organosilicon polymer particles with respect to 100 parts by mass of the toner particle is preferably 0.3 parts by mass to 10.0 parts by mass and more preferably 0.7 parts by mass to 8.0 parts by mass. Within this range, an amount of the organosilicon polymer particles sufficient for exhibiting the above effect is present and the fixability is also excellent.

Particle Diameter of Organosilicon Polymer Particles

The number-average particle diameter of primary particles of the organosilicon polymer particles is preferably from 10 nm to 500 nm and more preferably from 30 nm to 300 nm. When the number-average particle diameter is within the above range, since the organosilicon polymer particles are less likely to be embedded in the surface of the toner particle even after long-term use, the durability is excellent, in addition, since the organosilicon polymer particles are also present on the surface of the fixed image, an effect of minimizing recrystallization of the crystalline polyester resin is strong. In addition, since the surface area of the organosilicon polymer particles present in the vicinity of the surface of the fixed image is sufficiently large, an effect of minimizing recrystallization of the crystalline polyester resin is strong. The number-average particle diameter of primary particles of the organosilicon polymer particles can be controlled by changing organosilicon polymer particle production conditions.

Composition of Organosilicon Polymer Particles

The organosilicon polymer particles preferably have a structure in which silicon atoms and oxygen atoms are alternately bonded, and preferably have a T3 unit structure represented by the following Formula (1).

$$R^1—SiO_{3/2} \quad (1)$$

(in Formula (1), $R^1$ represents an alkyl group having 1 to 6 (preferably 1 to 4, and more preferably 1 or 2) carbon atoms or phenyl group.)

In $^{29}$Si-NMR measurement of the organosilicon polymer particles, the ratio of the area of a peak originating with silicon having the T3 unit structure to the total area of peaks originating with all silicon elements contained in the organosilicon polymer particles is preferably 0.50 to 1.00 and more preferably 0.70 to 1.00. Within the above range, the crosslinking density of the organosilicon polymer particles and the balance of the hydrophobic group of the $R^1$ part in Formula (1) are favorable. Therefore, since the organosilicon polymer particles have sufficient hardness and elasticity, the durability is excellent, and since the compatibility with the crystalline polyester resin is also favorable, an effect of minimizing recrystallization of the crystalline polyester resin in the fixed image is strong. In addition, when the toner particle contains a wax, wax exudation during fixing is promoted, particularly due to the effect of the hydrophobic group of the $R^1$ part in Formula (1), and thus the fixability is also excellent.

The organosilicon polymer particles are preferably polyalkylsilsesquioxane particles. When the organosilicon polymer particles are polyalkylsilsesquioxane particles, since the affinity between the alkyl group and a hydrocarbon moiety, which is an aliphatic moiety of the crystalline polyester resin, is appropriate, the fixability is favorable. In particular, when the number of carbon atoms of the alkyl group is from 1 to 4, since the affinity with the crystalline polyester resin is appropriate, the above effect is likely to be exhibited.

The SP value ($SP_{si}$) $(cal/cm^3)^{1/2}$ of the organosilicon polymer particles is preferably from 7.80 to 11.50 and more preferably from 8.40 to 10.00. When the SP value of the organosilicon polymer is larger, the proportion of the following Formulae (B) and (A) including the T3 unit structure is larger, and when the SP value is smaller, the proportion of the following Formulae (C) and (D) is larger. Therefore, when the SP value ($SP_{si}$) $(cal/cm^3)^{1/2}$ of the organosilicon polymer particles is from 7.80 to 11.50, not only is an appropriate proportion of the T3 unit structure included, but the proportion of the unit structures of the following Formulae (A), (C), and (D) is also appropriate, and thus the crosslinking density of the organosilicon polymer is in an appropriate range. Therefore, the organosilicon polymer particles have hardness and elasticity that provide excellent durability. In addition, when the toner particle contains a wax, since wax molecules easily penetrate into the organosilicon polymer particles when the wax exudes during fixing, both long-term durability and fixability can be easily achieved.

(A)

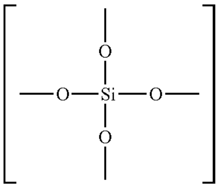

(B)

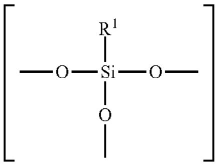

(C)

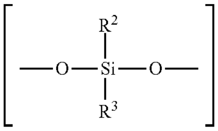

(D)

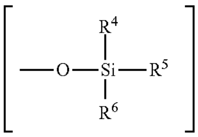

(in Formulae (A) to (D), $R^1$, $R^2$, $R^3$, $R^4$, $R^5$ and $R^6$ each independently represent an alkyl group having from 1 to 6 carbon atoms, phenyl group, halogen atom, a hydroxy group, or an acetoxy group or an alkoxy group having from 1 to 6 carbon atoms; and at least one of $R^4$, $R^3$ and $R^6$ represents an alkyl group having from 1 to 6 carbon atoms).

The organosilicon polymer particle preferably is a condensation polymer of an organosilicon compound having the structure given by the following formula (2).

(2)

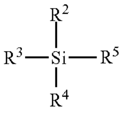

(In formula (2), $R^2$, $R^3$, $R^4$, and $R^5$ each independently represent an alkyl group having from 1 to 6 (preferably from 1 to 4 and more preferably 1 or 2) carbons, a phenyl group, or a reactive group (for example, a halogen atom, hydroxy group, acetoxy group, or alkoxy group (having preferably from 1 to 6 carbons and more preferably from 1 to 3 carbons)).)

An organosilicon compound having four reactive groups in each formula (2) molecule (tetrafunctional silane), an organosilicon compound having in formula (2) an alkyl group or phenyl group for $R^2$ and three reactive groups ($R^3$, $R^4$, $R^4$) (trifunctional silane), an organosilicon compound having in formula (2) an alkyl group or phenyl group for $R^2$ and $R^3$ and two reactive groups ($R^4$, $R^5$) (difunctional silane), and an organosilicon compound having in formula (2) an alkyl group or phenyl group for $R^2$, $R^3$, and $R^4$ and one reactive group ($R^5$) (monofunctional silane) can be used to obtain the organosilicon polymer particles. The use of at least 50 mol % trifunctional silane for the organosilicon compound is preferred in order to obtain 0.50 to 1.00 for the proportion for the area of the peak originating with the T3 unit structure.

$R^2$ in formula (2) is preferably an alkyl group having from 1 to 6 (preferably from 1 to 4 and more preferably 1 or 2) carbons or a phenyl group. $R^3$, $R^4$, and $R^5$ are preferably each independently a reactive group (halogen atom, hydroxy group, acetoxy group, or alkoxy group (having preferably from 1 to 6 carbons and more preferably from 1 to 3 carbons)).

The organosilicon polymer particle can be obtained by causing the reactive groups to undergo hydrolysis, addition polymerization, and condensation polymerization to form a crosslinked structure. The hydrolysis, addition polymerization, and condensation polymerization of $R^3$, $R^4$, and $R^5$ can be controlled using the reaction temperature, reaction time, reaction solvent, and pH.

The tetrafunctional silane can be exemplified by tetramethoxysilane, tetraethoxysilane, and tetraisocyanatosilane.

The trifunctional silane can be exemplified by methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxycthoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, phenyltrihydroxysilane, and pentyltrimethoxysilane.

The difunctional silane can be exemplified by di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethyldimethoxysilane, diethoxydimethylsilane, and diethyldimethoxysilane.

The monofunctional silane can be exemplified by t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

Silanol Ratio of Organosilicon Polymer Particles

The proportion of oxygen atoms derived from silanol groups among oxygen atoms in the organosilicon polymer particles is preferably at least 40.0 mol %, and more preferably from 2.0 mol % to 40.0 mol %. When the proportion of oxygen atoms derived from silanol groups among oxygen atoms in the organosilicon polymer particles is not more than 40.0 mol %, the compatibility between the organosilicon polymer particles and the crystalline polyester resin is favorable, and an effect of minimizing recrystallization of the crystalline polyester resin is strong. When the proportion of oxygen atoms derived from silanol groups among oxygen atoms in the organosilicon polymer particles is from 2.0 mol % to 40.0 mol %, since the oxygen atoms are appropriately present in the organosilicon polymer particles, polarization appropriately easily occurs and charging performance is excellent. In addition, the crystalline polyester resin preferably has at least one or both of the following structures (a) and (b).

(a) a structure in which at least one monomer selected from the group consisting of α,ω-linear aliphatic diols having from 2 to 3 carbon atoms is polycondensed.

(b) a structure in which at least one monomer selected from the group consisting of α,ω-linear aliphatic dicarboxylic acids having from 2 to 3 carbon atoms is polycondensed.

When there is a part in which the interval between ester bond sites of the crystalline polyester resin is short, since charges are unlikely to leak with a smaller number of silanol groups in the organosilicon polymer particles particularly under a high temperature and high humidity environment, charging performance becomes favorable.

Attachment Index of Organosilicon Polymer Particles

The attachment index of the organosilicon polymer particles with respect to a polycarbonate film calculated by the following Formula (1) is preferably not more than 4.5 and more preferably not more than 4.3. On the other hand, the lower limit is not particularly limited and is preferably at least 0.2, and more preferably at least 0.5. The index within the above range indicates that the organosilicon polymer particles are firmly adhered to the toner particle in a step of developing and fixing the toner. That is, since the organosilicon polymer particles are unlikely to be detached, and are present in the fixed image with high efficiency, the above effect is improved. The attachment index of the organosilicon polymer particles can be controlled by changing production conditions when the organosilicon polymer particles are added.

$$\text{Attachment index} = \text{area ratio } A \text{ of the organosilicon polymer particles transferred to the polycarbonate film} / \text{coverage ratio } B \text{ of the organosilicon polymer particles on the surface of the toner particle} \times 100 \quad (1)$$

The coverage ratio of the organosilicon polymer particles on the surface of the toner particle is preferably at least 15 area % and more preferably 25 area % or more. The upper limit is not particularly limited, and is preferably not more than 65 area % and more preferably not more than 55 area %. When the coverage ratio is at least 15 area %, since sufficient organosilicon polymer particles are present on the surface of the fixed image and in the vicinity thereof, the above effect is sufficiently exhibited. The coverage ratio of the organosilicon polymer particles can be controlled according to the amount of the organosilicon polymer particles added, the production device used during external addition, and external addition conditions.

Dispersity Evaluation Index of Organosilicon Polymer Particles

The dispersity evaluation index of the organosilicon polymer particles on the toner surface is preferably from 0.5 to 2.0 and more preferably from 0.5 to 1.5. Within the above range, organosilicon polymer particles are appropriately aggregated and uniformly dispersed on the surface of the toner particle. Therefore, even after long-term use, organosilicon polymer particles that are less likely to be embedded in the toner particle are substantially uniformly distributed on the surface of the toner particle. Therefore, organosilicon polymer particles are substantially uniformly dispersed on the surface of the fixed image. Therefore, the above effect can be uniformly exhibited in a wide range even after long-term use. The dispersity evaluation index of the organosilicon polymer particles can be controlled by changing the production conditions when the organosilicon polymer particles are added.

The shape factor SF-1 of the organosilicon polymer particles is preferably not more than 120 and more preferably not more than 115. The lower limit is not particularly limited, and is preferably at least 103, and more preferably at least 107. When the shape factor SF-1 is not more than 120, even if an external force is applied to the organosilicon polymer particles adhered to the toner particle, the force is uniformly applied, and the distribution of contact surfaces of the organosilicon polymer particles on the surface of the toner particle becomes uniform. Therefore, the effects of durability and wax exudation are further improved. In addition, charging performance is also excellent.

When the number-average particle diameter of primary particles of the organosilicon polymer particles is referred to as Dsi, and the number-average particle diameter (D1) of the toner particle is referred to as Dt, the ratio of Dsi to Dt (Dsi/Dt) is preferably from 0.0040 to 0.0750, more preferably from 0.0100 to 0.0500, and still more preferably from 0.0125 to 0.0250. When the ratio is within the above range, the organosilicon polymer particles are unlikely to be detached from the surface of the toner particle and are unlikely to be to be embedded. Therefore, when the toner particle contains a wax, wax exudation becomes appropriate even after long-term use. In addition, within this range, both fixability and durability can be easily achieved.

The method for producing organosilicon polymer particles is not particularly limited, for example, organosilicon polymer particles can be obtained by dropwise adding water to an organosilicon compound, performing hydrolysis with a catalyst and performing a condensation reaction, and then filtering and drying the obtained suspension. According to the type of catalyst, the blending ratio, the reaction start temperature, duration of dropwise addition, and the like, the number-average particle diameter of primary particles of the organosilicon polymer particles can be controlled. Examples of catalysts include acidic catalysts such as hydrochloric acid, hydrofluoric acid, sulfuric acid, and nitric acid, and basic catalysts such as aqueous ammonia, sodium hydroxide, and potassium hydroxide, and the present invention is not limited thereto.

The organosilicon polymer particles are preferably produced by the following method. The method preferably includes:

(i) a step of hydrolyzing an organosilicon compound to obtain a hydrolysate, and (ii) a step of mixing an alkaline aqueous medium with the obtained hydrolysate as necessary and performing a polycondensation reaction on the hydrolysate to obtain a dispersion in which the organosilicon polymer particles are dispersed.

In some cases, a hydrophobic agent is additionally added to the organosilicon polymer particle dispersion, and the surface may be hydrophobized.

The first step is performed by, for example, bringing an organosilicon compound and a catalyst into contact with each other by a method such as stirring or mixing in an aqueous solution in which an acidic or alkaline substance serving as a catalyst is dissolved in water. Regarding the catalyst, known catalysts can be preferably used. Specific examples of catalysts include acidic catalysts such as hydrochloric acid, hydrofluoric acid, sulfuric acid, and nitric acid, and basic catalysts such as aqueous ammonia, sodium hydroxide, and potassium hydroxide.

The amount of the catalyst used may be appropriately adjusted depending on the type of the organosilicon compound and the catalyst, and is preferably selected in a range of $1\times10^{-3}$ parts by mass to 1 part by mass with respect to 100 parts by mass of the amount of water used when the organosilicon compound is hydrolyzed. The amount of water used is preferably 2 mol to 15 mol with respect to 1 mol of the organosilicon compound.

The reaction temperature is not particularly limited, and the reaction may be performed at a normal temperature or in a heated state, and the reaction is preferably performed when the temperature is maintained at 10° C. to 60° C. because in this case a hydrolysate can be obtained in a short time and a partial condensation reaction of the produced hydrolysate can be minimized. The reaction time is not particularly limited, and may be appropriately selected in consideration of the reactivity of the organosilicon compound used, and the composition and productivity of a reaction solution prepared by mixing an organosilicon compound, an acid and water.

In the method for producing organosilicon polymer particles, in the second step, the raw material solution obtained in the first step and an alkaline aqueous medium (containing an organic solvent as necessary) are mixed and the hydrolysate is subjected to a polycondensation reaction. Thereby, a polycondensation reaction solution is obtained. The alkaline aqueous medium is obtained by mixing an alkaline component, water, and an organic solvent as necessary. The alkaline component used in the alkaline aqueous medium is such that the aqueous solution exhibits basicity, and acts as a neutralizing agent for the catalyst used in the first step and a catalyst for the polycondensation reaction in the second step. Examples of alkaline components may include alkali metal hydroxides such as lithium hydroxide, sodium hydroxide, and potassium hydroxide; ammonia; and organic amines such as monomethylamine and dimethylamine.

The amount of the alkaline component used is an amount that neutralizes an acid and effectively acts as a catalyst for the polycondensation reaction, and for example, when ammonia is used as the alkaline component, the amount thereof is generally selected in a range of from 0.01 parts by mass to 12.5 parts by mass with respect to 100 parts by mass of a mixture containing water and an organic solvent. In the second step, in order to prepare the alkaline aqueous medium, in addition to the alkaline component and water, an organic solvent may be additionally used. The organic solvent is not particularly limited as long as it is compatible with water, but an organic solvent in which at least 10 g of water per 100 g is dissolved at a normal temperature and atmospheric pressure is preferable. Specific examples thereof include alcohols such as methanol, ethanol, n-propanol, 2-propanol, and butanol; polyhydric alcohols such as ethylene glycol, diethylene glycol, propylene glycol, glycerin, trimethylolpropane, and hexanetriol; ethers such as ethylene glycol monoethyl ether, acetone, diethyl ether, tetrahydrofuran, and diacetone alcohol; and amide compounds such as dimethylformamide, dimethylacetamide, and N-methylpyrrolidone. Among the organic solvents listed above, alcohol solvents such as methanol, ethanol, 2-propanol, and butanol are preferable. In addition, in consideration of hydrolysis and the dehydration condensation reaction, it is more preferable to select the same alcohol as the alcohol produced by desorption as the organic solvent.

Regarding a method for collecting organosilicon polymer particles from the obtained polycondensation reaction solution, known methods can be used without particular limitation. For example, a floating powder can be scooped out, and a filtration method may be used, but the filtration method is preferable because the operation is simple. The filtration method is not particularly limited, and known methods such as vacuum filtration, centrifugal filtration, and pressurized filtration may be selected. The filter paper, filter, filter cloth, and the like used for filtration are not particularly limited as long as they are commercially available, and may be appropriately selected according to the apparatus used.

The collected organosilicon polymer particle powder can be directly used, but it is preferable to use a dry powder in order to obtain organosilicon polymer particles with few impurities. The powder drying method is not particularly limited, and can be selected from among known methods such as blast drying and drying under a reduced pressure. Among these, particularly, drying under a reduced pressure is more preferable because it allows a dry powder that is easily melted to be obtained. The drying temperature is not particularly limited as long as it is a temperature at which functional groups such as alkyl groups contained in the organosilicon polymer particles are not decomposed and is preferably in a range of 65° C. to 350° C., and more preferably in a range of 80° C. to 250° C., and the suitable temperature may be set appropriately. In addition, the drying time is not particularly limited, and when the drying time is set to 2 hours to 48 hours, sufficiently dried hydrophobized spherical organosilicon polymer particles can be obtained. The surface of the organosilicon polymer particles is treated with a known component such as a silane coupling agent or a silicone oil, and thus the hydrophobicity may be adjusted.

Binder Resin

The binder resin includes an amorphous resin in addition to the crystalline polyester resin. The amorphous resin is not particularly limited, and for example, the following polymers can be used. Homopolymers of styrene such as polystyrene, poly-p-chlorostyrene, and polyvinyltoluene and substitutes thereof; styrene copolymers such as styrene-p-chlorostyrene copolymers, styrene-vinyltoluene copolymers, styrene-vinyl naphthalene copolymers, styrene-acrylic acid ester copolymers, styrene-methacrylic acid ester copolymers, styrene-$\alpha$-chlormethylmethacrylate copolymers styrene-acrylonitrile copolymers, styrene-vinyl methyl ether copolymers, styrene-vinyl ethyl ether copolymers, styrene-vinyl methyl ketone copolymers, and styrene-acrylonitrile-indene copolymers; and polyvinyl chloride, phenolic resins, natural resin modified phenolic resins, natural resin modified maleic acid resins, acrylic resins, methacrylic resins, polyvinyl acetate, silicone resins, polyester resins, polyurethane resins, polyamide resins, furan resins, epoxy resins, xylene resins, polyvinyl butyral, terpene resins, coumarone-indene resins petroleum resins, and the like can be used. In particular, styrene copolymers such as styrene-acrylic acid ester copolymers and styrene-methacrylic acid ester copolymers, and polyester resins are preferable.

Polymerizable Monomers

Regarding polymerizable monomers used in the styrene copolymers, vinyl-based polymerizable monomers that can be radically polymerized can be used. Regarding the vinyl-based polymerizable monomers, monofunctional polymerizable monomers or polyfunctional polymerizable monomers can be used.

Examples of monofunctional polymerizable monomers includes styrene; styrene derivatives such as α-methylstyrene, β-methylstyrene, o-methylstyrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, and p-phenyl styrene; acrylic polymerizable monomers such as methyl acrylate, ethyl acrylate, n-propyl acrylate, iso-propyl acrylate, n-butyl acrylate, isobutyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, and 2-benzoyloxyethyl acrylate; methacrylic polymerizable monomers such as methyl methacrylate, ethyl methacrylate, n-propyl methacrylate, iso-propyl methacrylate, n-butyl methacrylate, isobutyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate, and dibutyl phosphate ethyl methacrylate; methylene aliphatic monocarboxylic acid ester; vinyl esters such as vinyl acetate, vinyl propionate, vinyl butyrate, vinyl benzoate, and vinyl formate; vinyl ethers such as vinyl methyl ether, vinyl ethyl ether, and vinyl isobutyl ether; and vinyl ketones such as vinyl methyl ketone, vinyl hexyl ketone, and vinyl isopropyl ketone.

Examples of polyfunctional polymerizable monomers include diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis(4-(acryloxy-diethoxy)phenyl)propane, trimethylolpropane triacrylate, tetramethylolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis(4-(methacryloxy-diethoxy)phenyl)propane, 2,2'-bis(4-(methacryloxy-polyethoxy)phenyl)propane, trimethylolpropane trimethacrylate, tetramethylolmethane tetramethacrylate, divinylbenzene, divinyl naphthalene, and divinyl ether.

The above monofunctional polymerizable monomers may be used alone or at least two thereof may be used in combination, and the above monofunctional polymerizable monomers and polyfunctional polymerizable monomers may be used in combination. Regarding the polymerizable monomers used in addition to styrene, styrene derivatives, acrylic polymerizable monomers such as n-butyl acrylate and 2-ethylhexyl acrylate, or methacrylic polymerizable monomers such as n-butyl methacrylate and 2-ethylhexyl methacrylate are preferable. This is because the binder resin obtained by polymerizing polymerizable monomers has excellent strength and flexibility.

The amorphous resin preferably includes at least one selected from the group consisting of amorphous polyester resins and styrene copolymers, and is more preferably at least one selected from the group consisting of amorphous polyester resins and styrene copolymers. In addition, the amorphous resin preferably includes an amorphous polyester resin and is more preferably an amorphous polyester resin. The styrene copolymers are preferably at least one selected from the group consisting of acrylic polymerizable monomers and methacrylic polymerizable monomers or styrene polymers. The content of the amorphous resin in the binder resin is preferably from 50.0 mass % to 96.0 mass % and more preferably from 65.0 mass % to 92.0 mass %.

The SP value ($SP_{apes}$) $(cal/cm^3)^{1/2}$ of the amorphous resin is preferably 9.50 to 11.00 and more preferably 9.80 to 10.60. The absolute value ($|SP_{cpes}-SP_{apes}|$) of the difference between $SP_{cpes}$ and $SP_{apes}$ is preferably 0.05 to 1.10 and more preferably 0.10 to 0.60. When the absolute value of the SP value difference is satisfied, since these resins are rapidly compatible with each other on the surface of the toner during fixing, and are appropriately phase-separated except during fixing, both low-temperature fixability and storability can be achieved.

The weight-average molecular weight (Mw) of the amorphous resin is preferably 6,000 to 100,000, more preferably 6.500 to 85,000, and still more preferably 6,500 to 45,000. When the weight-average molecular weight is at least 6,000, the organosilicon polymer particles on the surface of the toner are less likely to be embedded due to durable use in continuous image output, and deterioration in transferability is minimized. When the weight-average molecular weight is not more than 100,000, it is easy to obtain a toner having a small particle diameter and a uniform particle size distribution.

Regarding a method for producing an amorphous polyester resin, for example, a method using a dehydration condensation reaction between a carboxylic acid component and an alcohol component, and a transesterification reaction may be used for production. The catalyst may be a general acidic or alkaline catalyst used in the esterification reaction, and may be, for example, zinc acetate, a titanium compound, or the like. Then, a recrystallization method, a distillation method, and the like may be performed for high purification. A preferable production method is a dehydration condensation reaction of a carboxylic acid component and an alcohol component because of the variety of raw materials and ease of the reaction.

In the amorphous polyester resin, in all components, preferably, the proportion of the alcohol component is 43 mol % to 57 mol %, and the proportion of the acid component is 43 mol % to 57 mol %. Known alcohol components can be used for producing an amorphous polyester resin. Examples of alcohol components include ethylene glycol, neopentyl glycol, 2-ethyl-1,3-hexanediol, hydrogenated bisphenol A, a bisphenol derivative represented by the following Formula (A) and diols such as a diol represented by the following Formula (B).

(A)

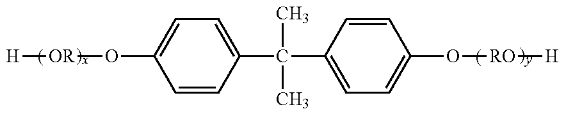

(in the formula, R represents an ethylene or propylene group, x and y each represent an integer of at least 0, and the average value of x+y is from 0 to 10).

(B)

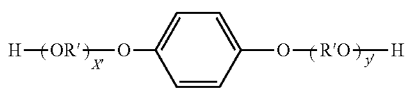

In the formula, R' is

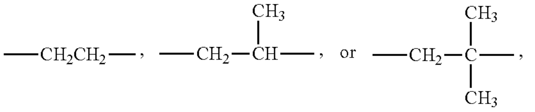

x' and y' each represent an integer of 0 or more, and the average value of x'+y' is 0 to 10.

Examples of divalent carboxylic acids include benzene dicarboxylic acids such as phthalic acid, terephthalic acid, isophthalic acid, phthalic anhydride, diphenyl-P·P'-dicarboxylic acid, naphthalene-2,7-dicarboxylic acid, naphthalene-2,6-dicarboxylic acid, diphenyl methane-P·P'-dicarboxylic acid, benzophenone-4,4'-dicarboxylic acid, and 1,2-diphenoxyethane-P·P'-dicarboxylic acid or anhydrides thereof; alkyl dicarboxylic acids such as succinic acid, adipic acid, sebacic acid, azelaic acid, glyceric acid, cyclohexane dicarboxylic acid, triethylenedicarboxylic acid, and malonic acid or anhydrides thereof, or succinic acids substituted with an alkyl group or alkenyl group having from 6 to 18 carbon atoms or anhydrides thereof; and unsaturated dicarboxylic acids such as fumaric acid, maleic acid, citraconic acid, and itaconic acid or anhydrides thereof.

Particularly preferable alcohol components include the bisphenol derivative represented by the above Formula (A) and ethylene glycol. Examples of preferable acid components include terephthalic acid or anhydrides thereof, succinic acid, n-dodecenyl succinic acid, or anhydrides thereof, and dicarboxylic acids such as fumaric acid, maleic acid, and maleic anhydride. Particularly, terephthalic acid or fumaric acid is preferable.

Regarding the amorphous polyester resin, a polycarboxylic acid or polyol with a valency of at least 3 may be used. Examples of polycarboxylic acids with a valency of at least 3 include trimellitic acid, pyromellitic acid, cyclohexanetricarboxylic acids, 2,5,7-naphthalene tricarboxylic acid, 1,2,4-naphthalene tricarboxylic acid, 1,2,4-butane tricarboxylic acid, 1,2,5-hexanetricarboxylic acid, 1,3-dicarboxy-2-methylene carboxylpropane, 1,3-dicarboxy-2-methyl-methylenecarboxylpropane, tetra(methylene carboxyl)methane, 1,2,7,8-octanetetracarboxylic acid and anhydrides thereof.

Examples of polyols with a valency of at least 3 include sorbitol, 1,2,3,6-hexanetetor, 1,4-sorbitan, pentaerythritol, dipentaerythritol, tripentaerythritol, sucrose, 1,2,4-methane triol, glycerin, 2-methylpropane triol, 2-methyl-1,2,4-butantriol, trimethylolethane, trimethylolpropane, and 1,3,5-trihydroxymethylbenzene.

The amount of polycarboxylic acids with a valency of at least 3 based on all acid monomer units is preferably not more than 10.00 mol %. In addition, similarly, the amount of polyols with a valency of at least 3 based on all alcohol monomer units is preferably 10.00 mol % or less. This range is preferable in consideration of pigment dispersibility because the amount of the insoluble component due to crosslinking is small. In addition, the proportion of the branched polyester resin is small, and the strength is excellent, which is preferable in consideration of durability.

The amorphous polyester resin is preferably an aromatic saturated polyester. This is because the toner has excellent charging performance, durability, and fixability, and it is easy to control properties of the toner and polyester. In particular, charging performance due to an interaction of π electrons of an aromatic component is excellent. In addition, crosslinking is unlikely to occur and fixability becomes favorable.

Content of Crystalline Polyester Resin

The content of the crystalline polyester resin in the binder resin is preferably from 4.0 mass % to 50.0 mass % and more preferably from 8.0 mass % to 35.0 mass %. When the content of the crystalline polyester resin is within this range, not only both fixability and storability can be achieved, but also charging performance becomes favorable.

SP Value of Crystalline Polyester Resin

The SP value ($SP_{cpes}$) of the crystalline polyester resin is preferably from 9.25 to 10.80, more preferably from 9.60 to 10.80, and still more preferably from 9.70 to 10.55. A smaller $SP_{cpes}$ indicates a smaller polarity of the crystalline polyester resin, and a larger $SP_{cpes}$ indicates a larger polarity. Therefore, when the $SP_{cpes}$ is within the above range, the polarity of the crystalline polyester resin is appropriate, which is preferable in consideration of charging performance.

The crystalline polyester resin can be preferably obtained by reacting a polycarboxylic acid with a valency of at least 2 with an alcohol with a valency of at least 2. Among these, a polyester containing an aliphatic diol and an aliphatic dicarboxylic acid as main components is preferable because it has a high degree of crystallinity. Regarding the crystalline polyester, only one type thereof may be used or a plurality of types thereof may be used in combination. The crystalline resin refers to a resin that has a clear endothermic peak in differential scanning calorimetry (DSC).

Examples of aliphatic dicarboxylic acids include oxalic acid, malonic acid, succinic acid, glutaric acid, adipic acid, pimelic acid, suberic acid, glutaconic acid, azelaic acid, sebacic acid, nonane dicarboxylic acid, decane dicarboxylic acid, undecane dicarboxylic acid, dodecane dicarboxylic acid, maleic acid, fumaric acid, mesaconic acid, citraconic acid, itaconic acid, isophthalic acid, terephthalic acid, n-dodecyl succinic acid, n-dedosenyl succinic acid, cyclohexane dicarboxylic acid, anhydrides of these acids and lower alkyl esters.

In addition, in addition to the above components, a polycarboxylic acid with a valency of at least 3 may be used. Examples of carboxylic acid components with a valency of at least 3 include trimellitic acid, 2,5,7-naphthalene tricarboxylic acid, 1,2,4-naphthalene tricarboxylic acid, pyromellitic acid, 1,2,4-butane tricarboxylic acid, 1,2,5-hexanetricarboxylic acid, 1,3-dicarboxy-2-methyl-2-methylenecarboxypropane, and acid anhydrides thereof and derivatives such as lower alkyl esters. These may be used alone or at least two thereof may be used in combination.

Specific examples of aliphatic diols include ethylene glycol, diethylene glycol, triethylene glycol, 1,2-propanediol, 1,3-propanediol, dipropylene glycol, trimethylene glycol, tetramethylene glycol, pentamethylene glycol, hexamethylene glycol, octamethylene glycol, nonamethylene glycol, decamethylene glycol, neopentyl glycol, 1,4-butadiene glycol, and others. In addition, in addition to the above components, divalent alcohols such as polyoxyethylene bisphenol A, polyoxypropylene bisphenol A, and 1,4-cyclohexanedimethanol, aromatic alcohols such as 1,3,5-trihydroxymethylbenzene, trivalent alcohols such as pentaerythritol, dipentaerythritol, tripentaerythritol, 1,2,4-butanetriol, 1,2,5-pentanetriol, glycerin, 2-methylpropantriol, 2-methyl-1,2,4-butantriol, trimethylolethane, and trimethylolpropane, and the like may be used. Examples of at least trivalent alcohols include glycerin, trimethylolethane, trimethylolpropane, and pentaerythritol. These may be used alone or at least two thereof may be used in combination.

The aliphatic dicarboxylic acid is preferably a linear aliphatic dicarboxylic acid represented by the following Formula (4). The aliphatic diol is preferably a linear aliphatic diol represented by the following Formula (5).

$$HOOC—(CH_2)_m—COOH \quad (4)$$

[in the formula, m represents an integer of 2 to 16]

$$HO—(CH_2)_n—OH \quad (5)$$

[in the formula, n represents an integer of 2 to 16]

When the type is linear, since the crystallinity of the polyester resin is excellent and the crystal melting point is appropriate, the toner blocking resistance, image storability and low-temperature fixability are excellent. In addition, when the number of carbon atoms is at least 2, since the melting point (Tm) is appropriate, the toner blocking resistance, image storability and low-temperature fixability are excellent. When the number of carbon atoms is not more than 16, it is easy to obtain a practical material. The number of carbon atoms in the dicarboxylic acid and diol is more preferably not more than 14.

Composition of Crystalline Polyester

The crystalline polyester resin preferably has at least one or both of the following structures (a) and (b).

(a) a structure in which at least one monomer selected from the group consisting of α,ω-linear aliphatic diols having from 2 to 3 carbon atoms is polycondensed.

(b) a structure in which at least one monomer selected from the group consisting of α,ω-linear aliphatic dicarboxylic acids having from 2 to 3 carbon atoms is polycondensed.

The crystalline polyester resin more preferably has a structure in which α,ω-linear aliphatic diols having from 2 to 3 carbon atoms are polycondensed. The crystalline polyester resin is more preferably a condensation polymer of an α,ω-linear aliphatic diol having from 2 to 12 (preferably from 4 to 10) carbon atoms, an α,ω-linear aliphatic dicarboxylic acid having from 2 to 12 (preferably from 4 to 10) carbon atoms, and at least one selected from the group consisting of α,ω-linear aliphatic diols having from 2 to 3 carbon atoms and α,ω-linear aliphatic dicarboxylic acids having from 2 to 3 carbon atoms. This is because the sharp melt property and the melt viscosity during fixing are low, which is desirable because both low-temperature fixability and storability are achieved.

In consideration of the crystallinity of the crystalline polyester resin, the content of the aliphatic dicarboxylic acid within the carboxylic acid component is preferably at least 80 mol %, more preferably at least 90 mol %, and still more preferably 100 mol %. Inconsideration of the crystallinity of the crystalline polyester resin, the content of the aliphatic diol within the alcohol component is preferably 80 mol % or more, more preferably 90 mol % or more, and still more preferably 100 mol %.

Here, as necessary, in order to adjust the acid value and the hydroxyl value, monovalent acids such as acetic acid and benzoic acid and monovalent alcohols such as cyclohexanol benzyl alcohol are also used. The crystalline polyester resin can be produced by a general polyester synthesis method. For example, the crystalline polyester resin can be obtained by subjecting a dicarboxylic acid component and a dialcohol component to an esterification reaction or a transesterification reaction, and then decompressing or introducing nitrogen gas and performing a polycondensation reaction by a general method. During the esterification or transesterification reaction, as necessary, general esterification catalysts or transesterification catalysts such as sulfuric acid, tertiary butyl titanium butoxide, dibutyltin oxide, manganese acetate, and magnesium acetate can be used. In addition, for polymerization, general polymerization catalysts, for example, known components such as tertiary butyl titanium butoxide, dibutyltin oxide, tin acetate, zinc acetate, tin disulfide, antimony trioxide, and germanium dioxide can be used. The polymerization temperature and the amount of the catalyst are not particularly limited, and may be arbitrarily selected as necessary.

In addition, the acid value of the crystalline polyester can be controlled by sealing the carboxylic group at the end of the polymer. Monocarboxylic acids and monoalcohols can be used for end sealing. Regarding the monocarboxylic acids, for example, monocarboxylic acids such as benzoic acid, naphthalene carboxylic acid, salicylic acid, 4-methylbenzoic acid, 3-methyl benzoic acid, phenoxy acetic acid, biphenylcarboxylic acid, acetic acid, propionic acid, butyric acid, octanoic acid, decanoic acid, dodecanoic acid, and stearic acid may be exemplified. In addition, regarding the monoalcohols, methanol, ethanol, propanol, isopropanol, butanol, and higher alcohols can be used. In addition, a copolymer obtained by copolymerizing (modifying) other components at a ratio of not more than 60 mass % (preferably not more than 40 mass %) with respect to the crystalline polyester moiety is also used as a crystalline polyester (hybrid crystalline polyester) resin. When the crystalline polyester has a copolymer moiety obtained by polymerizing other components, it is preferable that the copolymer moiety be an amorphous vinyl copolymer. Regarding the vinyl-based polymerizable monomer, those described above can be used.

The melting point (DSC endothermic peak) of the crystalline polyester resin is preferably from 50.0° C. to 90.0° C. Within the above range, the toner particles are less likely to aggregate, the storability and fixability of the toner particles can be maintained, and when toner particles are produced by the polymerization method, the solubility in the polymerizable monomers becomes high. The melting point (DSC endothermic peak) of the crystalline polyester resin can be measured by differential scanning calorimetry (DSC). In addition, the melting point of the crystalline polyester resin can be adjusted according to the type of the alcohol monomer or carboxylic acid monomer used, the degree of polymerization and the like.

The weight-average molecular weight (Mw) of the crystalline polyester resin is preferably from 5,000 to 35,000 and more preferably from 10,000 to 35,000. According to the crystalline polyester having the weight-average molecular weight (Mw), the dispersibility of the crystalline polyester resin is improved, and the durable stability is improved in the obtained toner particles.

When the weight-average molecular weight (Mw) of the crystalline polyester resin is at least 5,000, the density of the crystalline polyester increases and the durable stability is improved. On the other hand, when the weight-average molecular weight (Mw) of the crystalline polyester resin is not more than 35,000, the crystalline polyester resin is rapidly melted and the dispersion state becomes uniform, and thus development stability is improved. The weight-average molecular weight (Mw) of the crystalline polyester can be adjusted according to the type of the alcohol monomer or carboxylic acid monomer used, the polymerization time, the polymerization temperature, and the like.

The acid value (AV) of the crystalline polyester resin is preferably from 0.0 mg KOH/g to 20.0 mg KOH/g, more preferably from 0.0 mg KOH/g to 10.0 mg KOH/g, and still more preferably from 0.0 mg KOH/g to 5.0 mg KOH/g. When the acid value is lowered, the adhesiveness between the toner and paper during image formation is improved. In addition, when toner particles are produced by the polymerization method, if the acid value (AV) of the crystalline polyester resin is not more than 20.0 mg KOH/g, the toner particles tend to be less likely to aggregate with each other. In addition, since the distribution state of the crystalline polyester resin in the toner is less likely to be biased, charge stability and durable stability are improved.

Wax

A wax may be used for the toner. The wax is not particularly limited, and a known wax can be used. Known waxes, for example, hydrocarbon waxes such as paraffin wax, polyolefin wax, microcrystalline wax and Fischer-Tropsch wax, petroleum waxes such as polymethylene wax, amide wax, and petrolatum and derivatives thereof, montan wax and derivatives thereof, natural waxes such as carnauba wax and candelilla wax and derivatives thereof, hardened castor oil and derivatives thereof, plant wax, animal wax, higher fatty acid, long chain alcohol, ester wax, ketone wax and graft compounds thereof, and derivatives of block compounds can be used. These can be used alone or in combination. A hydrocarbon wax is preferable. This is preferable in consideration of toner blocking resistance, multisheet durability, low-temperature fixability and offset resistance.

At least one of the waxes has a melting point of preferably from 65° C. to 120° C. and more preferably from 65° C. to 90° C. In addition, a wax that is solid at a normal temperature is preferable, and particularly, a solid wax having a melting point of from 65° C. to 90° C. is preferable in consideration of toner blocking resistance, multisheet durability, low-temperature fixability and offset resistance.

The content of the wax in the toner with respect to 100 parts by mass of the binder resin is preferably from 3 parts by mass to 30 parts by mass. When the content of the wax is at least the lower limit value, the offset prevention effect does not decrease. When the content is not more than the upper limit value, the blocking resistance effect does not decrease, the offset resistance effect is easily obtained, and the toner drum fusion and the toner developing sleeve fusion can be minimized.

Here, when it is necessary to extract the wax from the toner in order to obtain the above properties, any extraction method can be used without particular limitation. For example, a predetermined amount of the toner is soxhlet-extracted with toluene, the solvent is removed from the obtained toluene-soluble component and a chloroform insoluble component is then obtained. Then, identification analysis is performed by the IR method or the like. In addition, for quantification, quantitative analysis is performed using a differential scanning calorimeter (DSC) or the like. Specifically, measurement is performed using DSC-2920 (commercially available from TA Instruments Japan). The intersection between the line at the middle point of the baseline before and after specific heat changes during measurement and the differential thermal curve is defined as the glass transition point. In addition, the maximum endothermic peak temperature of the wax component is obtained from the obtained DSC curve during heating.

Charge Control Agent

For the toner, a known charge control agent can be used. The content of the charge control agent with respect to 100 parts by mass of the binder resin is preferably from 0.01 parts by mass to 20 parts by mass, and more preferably from 0.5 parts by mass to 10 parts by mass.

Pigment

The toner may contain a colorant. Examples of colorants include pigments and dyes. Regarding the pigment used for the cyan colorant, a copper phthalocyanine compound and derivatives thereof, an anthraquinone compound, and a basic dye lake compound can be used. Specifically, the following examples may be used. C.I. Pigment Blue 15, 15:1, 15:2, 15:3 and 15:4. Regarding the pigment used for the magenta colorant, a condensed azo compound, a diketopyrrolopyrrole compound, an anthraquinone compound, a quinacridone compound, a basic dye lake compound, a naphthol compound, a benzimidazole compound, a thioindigo compound and a perylene compound can be used. Specifically, the following examples may be used. C.I. Pigment Violet 19, C.I. Pigment Red 31, 32, 122, 150, 254, 264 and 269.

Regarding the pigment used for the yellow colorant, a condensed azo compound, an isoindoline compound, an anthraquinone compound, an azo metal complex, a methine compound and an allyl amide compound can be used. Specifically, the following examples may be used. C.I. Pigment Yellow 74, 93, 120, 139, 151, 155, 180 and 185. Regarding the black colorant, carbon black, a magnetic material, and a black colorant made using the above yellow, magenta and cyan colorants can be used.

When the pigment is carbon black, C.I. Pigment Blue 15:3, C.I. Pigment Red 122, 150, 32, 269, C.I. or Pigment Yellow 155, 93, 74, 180 and 185, the above effects are easily obtained. Carbon black, C.I. Pigment Blue 15:3, C.I. and Pigment Red 122 are particularly desirable. In the case of carbon black, it is preferable that the pH be from 6 or more and the adsorption (DBP) be from 30 (ml/100 g) to 120 (ml/100 g). The content of these colorants with respect to 100 parts by mass of the binder resin is preferably from 1 part by mass to 20 parts by mass.

Other Additives

In the toner, various known inorganic and organic additives can be used in order to impart various properties as long as the above effects are not impaired. In consideration of durability when added to the toner, the additive used preferably has a particle diameter of not more than 3/10 of the weight average diameter of the toner particles. The particle diameter of the additive refers to an average particle diameter obtained by observing the surface of the toner particles under a scanning electron microscope. The content of these additives with respect to 100 parts by mass of the toner particles is preferably from 0.01 parts by mass to 10 parts by mass, and more preferably front 0.02 parts by mass to 3 parts by mass. These additives may be used alone or a plurality thereof may be used in combination. In addition, these additives may be hydrophobized. In the hydrophobic treatment method, various coupling agents such as a silane coupling agent and a titanium coupling agent can be used, and it is preferable to increase the hydrophobicity with a silicone oil. This is because it is possible to minimize adsorption of water in the inorganic fine powder under a high humidity, and additionally, contamination on a control member, a charge member and the like can be minimized, and thus a high-quality image can be obtained.

A production method for controlling a fixing state and a dispersion state of the organosilicon polymer particles with respect to the surface of the toner particles will be described. Preferably, organosilicon polymer particles are firmly adhered to the surface of the toner particles without embedding them in at least a certain amount. When the external additive is adhered to the toner particles, the adhesion force is determined by the contact area between the external additive and the toner particles and the adhesion force per unit area determined by the type of the external additive and the toner particles. Since the organosilicon polymer particles have low surface free energy and have high releasability, the adhesion force per unit area is low. Therefore, in order to increase the adhesion force, it is necessary to increase the contact area, but, even if an impact is applied, deformation of the toner particles does not proceed due to the elastic resilience force of the organosilicon polymer particles, and the contact area does not increase much.

If an impact force is increased once and an impact is continuously applied, the adhesion force can increase, but the organosilicon polymer particles are embedded. Therefore, in order to firmly adhere the organosilicon polymer particles to the surface of the toner particles without embedding them in at least a certain amount, it is preferable to increase the adhesion rate by heat. When heat is applied, the surface of the toner particles can be slightly deformed to fill minute voids between the organosilicon polymer particles and the surface of the toner particles, the contact area can increase without being embedded in the surface of the toner particles, and the adhesion force can increase. In addition, it is more preferable to increase the adhesion rate by heat after the organosilicon polymer particles are appropriately hydrophilized. The hydrophilization here means hydrophilization of the surface by optimizing the abundance of hydroxy groups derived from silanol groups.

According to hydrophilization, it is possible to increase the adhesion force per unit area between the toner particles and the organosilicon polymer particles without changing mechanical properties of the organosilicon polymer particles. When heat is applied after surface modification, minute voids between the organosilicon polymer particles and the toner particles are filled while the adhesion force per unit area is high, and the contact area can be increased without embedding the organosilicon polymer particles in at least a certain amount. Therefore, the adhesion rate can be further increased without embedding the organosilicon polymer particles in the surface of the toner particles in at least a certain amount. When heat and an impact force are applied at the same time, the embedding depth of the organosilicon polymer particles can be controlled according to the particle diameter of the organosilicon polymer particles.

When the temperature in the heating step is set as $T_R$(° C.) and the glass transition temperature of the toner particles is set as Tg (° C.), the temperature Ta in the heating step preferably satisfies $Tg-10(° C.) \leq T_R \leq Tg+5$ (° C.), and more preferably satisfies $Tg-5(° C.) \leq T_R \leq Tg+5$ (° C.). Within this range, it is easy to optimally control the dispersion state and adhesion state of the organosilicon polymer particles with respect to the toner particles. The heating time is not particularly limited, and is preferably 3 minutes to 30 minutes, and more preferably 3 minutes to 10 minutes. In addition, in consideration of storability, the glass transition temperature Tg of the toner particles is preferably 40° C. to 70° C., and more preferably 50° C. to 65° C.

Figure 2:
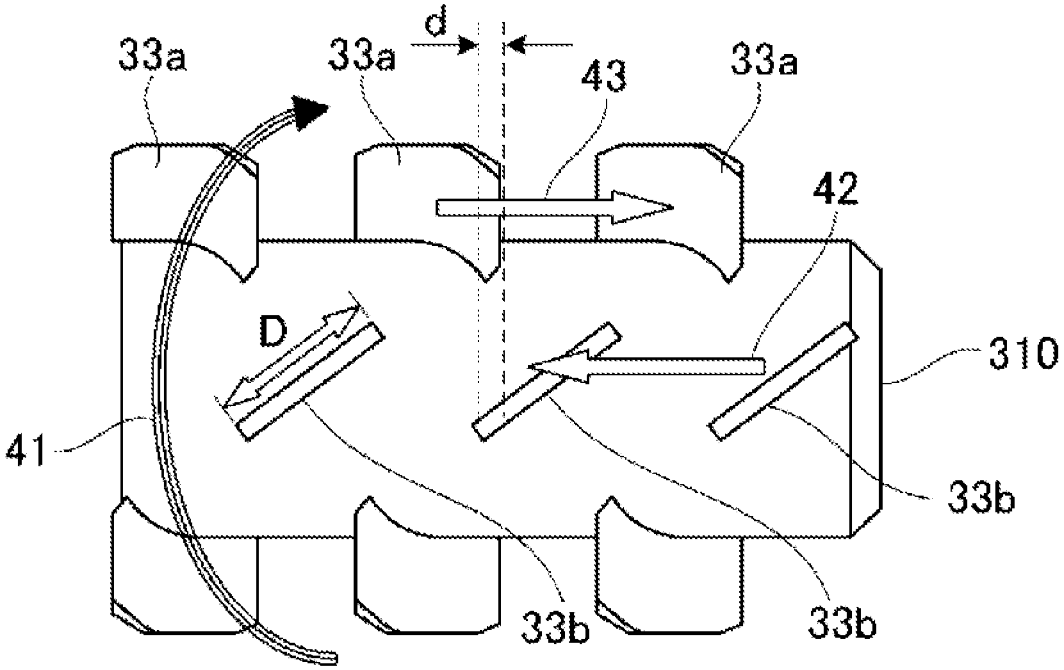
FIG. 2 shows an example of a configuration of a stirring member used in the mixing process apparatus.

Regarding the apparatus used in the heating step, an apparatus having a mixing function is preferable, and a known mixing process apparatus can be used, and a mixing process apparatus 1 shown in FIG. 1 is particularly preferable. FIG. 1 is a schematic diagram showing an example of the mixing process apparatus 1 that can be used in the heating step. On the other hand, FIG. 2 is a schematic diagram showing an example of a configuration of a stirring member used in the mixing process apparatus 1.

The mixing process apparatus 1 includes a rotating member 32 in which a plurality of stirring members 33 are installed on the surface, a drive member 38 that rotates and drives the rotating member, and a main body casing 31 that is provided with a gap between it and the stirring member 33. In the gap (clearance) between the inner peripheral part of the main body casing 31 and the stirring member 33, heat is efficiently applied to the toner particles and shear is uniformly applied to the toner particles, and the organosilicon polymer particles that are being loosened from secondary particles to primary particles can be adhered to the surface of the toner particles.

In addition, in this mixing process apparatus, the diameter of the inner peripheral part of the main body casing 31 is not more than twice the diameter of the outer peripheral part of the rotating member 32. FIG. 1 shows an example in which the diameter of the inner peripheral part of the main body casing 31 is 1.7 times the diameter of the outer peripheral part of the rotating member 32 (the diameter of the body part excluding the stirring member 33 from the rotating member 32). When the diameter of the inner peripheral part of the main body casing 31 is not more than twice the diameter of the outer peripheral part of the rotating member 32, since the processing space in which a force acts on toner particles is appropriately limited, the organosilicon polymer particles which are secondary particles can be sufficiently dispersed.

In addition, the clearance is appropriately adjusted according to the size of the main body casing. The size of the clearance is preferably 1% to 5% of the diameter of the inner peripheral part of the main body casing 31 because heat is efficiently applied to the toner particles. Specifically, when the diameter of the inner peripheral part of the main body casing 31 is about 130 mm, the size of the clearance is about 2 mm to 5 mm, and when the diameter of the inner peripheral part of the main body casing 31 is about 800 mm, the size thereof may be about 10 mm to 30 mm.

As shown in FIG. 2, at least a part of the plurality of stirring members 33 is formed as a feed stirring member **33*a* that feeds toner particles in one axial direction of the rotating member as the rotating member 32 rotates. In addition, at least a part of the plurality of stirring members 33 is formed as a return stirring member 33*b* that returns toner particles in the other axial direction of the rotating member as the rotating member 32 rotates. Here, as shown in FIG. 1, when a raw material input port 35 and a product discharge port 36 are provided at both ends of the main body casing 31, the direction from the raw material input port 35 toward the product discharge port 36 (the right direction in FIG. 1**) is referred to as a "feed direction".

That is, as shown in FIG. 2, a plate surface of the feed stirring member **33*a* is inclined so that toner particles are fed in a feed direction 43. On the other hand, a plate surface of the stirring member 33*b* is inclined so that toner particles are fed in a return direction 42. Thereby, a heat treatment is performed while repeatedly feeding in the feed direction 43 and feeding in the return direction 42. In addition, the stirring members 33*a* and 33*b* are a set of a plurality of members disposed at intervals in the circumferential direction of the rotating member 32. In the example shown in FIG. 2, the stirring members 33*a* and 33*b* form a set of two members at intervals of 180° in the rotating member 32**, but a larger number of members may be formed as a set such as three members at intervals of 120°, or four members at intervals of 90°.

In the example of the stirring member shown in FIG. 2, a total of 12 stirring members 33*a* and 33*b* are formed at equal intervals. In FIG. 2, D indicates the width of the stirring member, and d indicates the interval indicating an overlapping part of the stirring member. In order to efficiently feed toner particles in the feed direction and the return direction, D is preferably about 20% to 30% of the length of the rotating member 32. FIG. 2 shows an example in which D is 23% of the length of the rotating member 32. When an extension line is drawn in the vertical direction from the end position of the stirring member 33*a*, it is preferable that the stirring member 33*a* and the stirring member 33*b* have a certain size of the overlapping part d between the stirring member 33*b* and the stirring member 33*a*.

Thereby, the organosilicon polymer particles can be efficiently dispersed on the surface of the toner particles, d to D ((d/D)×100) is preferably 10% to 30% in order to apply appropriate shear.

In addition to the shape shown in FIG. 2, the shape of the blade may be, for example, a shape having a curved surface or a paddle structure shape in which a tip blade part is connected to the rotating member 32 with a rod-like arm, as long as toner particles can feed in the feed direction and the return direction, and the clearance can be maintained.

Hereinafter, more detailed description will be provided with reference to the schematic diagram of the apparatus shown in FIG. 1 and FIG. 2. The apparatus shown in FIG. 1 includes the rotating member 32 in which at least aa plurality of stirring members 33 are installed on the surface, the drive member 38 that rotates and drives the rotating member 32, and the main body casing 31 that is provided with a gap between it and the stirring member 33. In addition, a jacket 34 which is provided inside the main body casing 31 and adjacent to a rotating member end side surface 310 and through which a cold medium can flow is provided. In addition, the mixing process apparatus shown in FIG. 1 further includes the raw material input port 35 formed above the main body casing 31 and the product discharge port 36 formed below the main body casing 31. The raw material input port 35 is used for introducing toner particles and organosilicon polymer particles. The product discharge port 36 is used for discharging the toner subjected to the external addition mixing treatment from the main body casing 31 to the outside.

In the mixing process apparatus shown in FIG. 1, a raw material input port inner piece 316 is inserted into the raw material input port 35, and a product discharge port inner piece 317 is inserted into the product discharge port 36.

First, the raw material input port inner piece 316 is removed from the raw material input port 35, toner particles and organosilicon polymer particles are put into a processing space 39 via the raw material input port 35, and the raw material input port inner piece 316 is inserted. Next, the rotating member 32 is rotated (41 indicates the rotation direction) by the drive member 38, the input processing substance is stirred with the plurality of stirring members 33 provided on the surface of the rotating member 32, and is subjected to a heating and mixing treatment with mixing.

In addition, heating can be performed by allowing hot water with a desired temperature to pass through the jacket 34. The temperature of hot water is monitored using a thermocouple installed inside the raw material input port inner piece 316. In order to obtain the toner stably, the temperature $T_R$ (thermocouple temperature; ° C.) inside the raw material input port inner piece 316 is in a condition of preferably Tg−10(° C.)≤$T_R$≤Tg+5(° C.) and more preferably Tg−5(° C.)≤$T_R$≤Tg+5(° C.), when the glass transition temperature of the toner particles is set as Tg (° C.).

In the embedded state of the organosilicon polymer particles formed in the heating step, it is preferable to promote slight meting of the surface by heat without additionally embedding. Therefore, it is preferable not to apply a mechanical impact force to the toner. On the other hand, in order to make the coating state of the organosilicon polymer particles uniform, minimum power is necessary. The power of the drive member 38 is a value obtained by subtracting the air power (W) that is operated when no toner particles are input from the power (W) when the toner particles are input and dividing by the toner particle input amount (g). The treatment time is not particularly limited because it depends on the heating temperature, and is preferably 3 minutes to 30 minutes and more preferably 3 minutes to 10 minutes. When the time is controlled within the above range, both the toner strength and adhesion are easily achieved.

Since the rotational speed of the stirring member is linked to the power, it is not particularly limited as long as the power is within a range of $1.0\times10^{-4}$ W/g to $1.0\times10^{-1}$ W/g. In the apparatus in which the volume of the processing space 39 in the apparatus shown in FIG. 1 is $2.0\times10^{-3}$ $m^3$, in order to make the coating state of the organosilicon polymer particles uniform, the rotational speed of the stirring member when the stirring member 33 has a shape shown in FIG. 2 is preferably 50 rpm to 500 rpm and more preferably 100 rpm to 300 rpm. After the mixing treatment is completed, the product discharge port inner piece 317 in the product discharge port 36 is removed, the rotating member 32 is rotated by the drive member 38, and the toner is discharged from the product discharge port 36. As necessary, coarse particles of the toner may be separated by a sieve machine such as a circular vibrating sieve.

When organosilicon polymer particles are adhered in the heating step using the apparatus of the mixing process apparatus 1, it is preferable to externally add the organosilicon polymer particles in the external addition step in advance. In the external addition step, a toner in which organosilicon polymer particles are externally added to toner particles can be obtained using known mixers such as an FM mixer (commercially available from Nippon Coke & Engineering. Co., Ltd.), a super mixer (commercially available from Kawata MFG Co., Ltd.), Nobilta (commercially available from Hosokawa Micron Corporation), and a hybridizer (commercially available from Nara Machinery Co., Ltd.).

When the toner is heated in the external addition step, external addition and adhesion can be performed in one step, and when external addition and adhesion are performed in one step in the external addition step, a known mixing process apparatus can be used. When external addition and adhesion are performed in one step in the external addition step, hot water with a desired temperature is caused to flow through a jacket of a known mixer such as an FM mixer (commercially available from Nippon Coke & Engineering. Co., Ltd.), a super mixer (commercially available from Kawata MFG Co., Ltd.), Nobilta (commercially available from Hosokawa Micron Corporation), and a hybridizer (commercially available from Nara Machinery Co., Ltd.), and thus the operation may be performed while heating.

A method for producing toner particles will be described. The method for producing toner particles is not particularly limited. Examples thereof include a method for directly producing toner particles in a hydrophilic medium (hereinafter referred to as a polymerization method) such as a suspension polymerization method/interfacial polymerization method/dispersion polymerization method, an emulsification aggregation method, and a dissolution suspension method. In addition, a pulverizing method may be used, and toner particles obtained by the pulverizing method may be thermally made spherical. Among these, toner particles produced by a suspension polymerization method, an emulsification aggregation method, or a dissolution suspension method, in which individual particles are substantially spherical and the distribution of the amount of charge is relatively uniform, and thus transferability is high, are preferable.

In addition, regarding a production method for producing toner particles by the pulverizing method, the following examples may be exemplified, in the raw material mixing step, as materials constituting toner particles, predetermined amounts of a binder resin, a colorant as necessary, other additives and the like can be weighed, blended and mixed. Examples of mixing apparatuses include a double cone mixer, a V type mixer, a drum type mixer, a super mixer, an FM mixer, a Nauta mixer, and a mechano hybrid (commercially available from Nippon Coke & Engineering. Co., Ltd.).

Next, the mixed materials can be meh-kneaded and the colorant and the like can be dispersed in the binder resin. In the melt-kneading step, a batch type kneader such as a pressure kneader and a Banbury mixer or a continuous-type kneading machine can be used. A single-screw or twin-screw extruder is preferable because production can be continuously performed. Examples thereof include a KTK type twin-screw extruder (commercially available from Kobelco), a TEM type twin-screw extruder (commercially available from Toshiba Machine Co., Ltd.), a PCM kneading machine (commercially available from Ikegai), a twin-screw extruder (commercially available from KCK Corporation), Co-Kneader (commercially available from Buss Corporation), and Kneadex (commercially available from Nippon Coke & Engineering. Co., Ltd.). In addition, a resin composition obtained by melt-kneading may be rolled with two rollers and cooled with water or the like in the cooling step.

Then, the cooled product of the resin composition may be pulverized to have a desired particle diameter in the pulverizing step. In the pulverizing step, coarse pulverization is performed with a pulverizing machine and then fine pulverization can be additionally performed with a fine pulverizing machine. Examples of pulverizing machines include a crusher, a hammer mill, and a feather mill. Examples of fine pulverizing machines include a Krypton system (commercially available from Kawasaki Heavy Industries, Ltd.), Super Rotor (commercially available from Nisshin Engineering Inc.), Turbo mill (commercially available from Freund Turbo Co., Ltd.) and an air jet type fine pulverizing machine.

Then, toner particles can be obtained by classifying using the following classifier or sieving machine as necessary. For classification, an inertia classification type elbow jet (commercially available from Nittetsu Mining Co., Ltd.), a centrifugal force classification type Turboplex (commercially available from Hosokawa Micron Corporation), a TSP separator (commercially available from Hosokawa Micron Corporation), FACULTY (commercially available from Hosokawa Micron Corporation), and the like can be used.

In addition, the toner particles may be made spherical. Regarding systems and the like that can be used for spheroidizing after pulverization, the following systems may be exemplified: hybridization system (commercially available from Nara Machinery Co., Ltd.), a mechanofusion system (commercially available from Hosokawa Micron Corporation). FACULTY (commercially available from Hosokawa Micron Corporation), and Meteorainbow MR Type (commercially available from Nippon Pneumatic Mfg. Co., Ltd.).

Regarding the production method, an emulsification aggregation method will be described. The emulsification aggregation method is a production method in which resin fine particles that are sufficiently small with respect to a desired particle diameter are prepared in advance, the resin fine particles are aggregated in an aqueous medium, and thus core particles are produced. In the emulsification aggregation method, toner particles are produced through a resin fine particle emulsification step, an aggregating step, a fusion step, a cooling step, and a washing step. In addition, as necessary, a shelling step is added after the cooling step to obtain a core-shell toner.

Emulsification Step of Resin Fine Particles

Resin fine particles containing a resin such as an amorphous polyester resin as a main component can be prepared by a known method. For example, the resin is dissolved in an organic solvent and added to an aqueous medium, particles are dispersed in an aqueous medium together with a surfactant and a polymer electrolyte using a dispersing machine such as homogenizer, the solvent is then removed by heating or decompression, and thereby a resin particle dispersion can be prepared. Regarding the organic solvent used for dissolving, any solvent can be used as long as the resin is dissolved, and tetrahydrofuran, ethyl acetate, chloroform or the like is preferable because it has high solubility.

In addition, the resin, a surfactant, abase, and the like are added to an aqueous medium, and emulsified and dispersed in an aqueous medium that is substantially free of an organic solvent by a dispersing machine that applies a high speed shear force such as Crea Mix, a homomixer, or a homogenizer, which is preferable in consideration of an environment load. In particular, the content of the organic solvent having a boiling point of 100° C. or lower is preferably not more than 100 μg/g. Within the above range, when the toner is produced, a new step of removing and collecting the organic solvent is not required, and no load is applied to wastewater treatment measures. Here, the content of the organic solvent in the aqueous medium can be measured using gas chromatography (GC).

The surfactant used during emulsification is not particularly limited, and for example, the following examples may be used: anionic surfactants such as a sulfuric ester salt-based surfactant, a sulfonate-based surfactant, a carboxylate-based surfactant, a phosphate ester-based surfactant, and a soap-based surfactant; cationic surfactants such as an amine salt-based surfactant and a quaternary ammonium salt-based surfactant; and nonionic surfactants such as a polyethylene glycol-based surfactant, an alkylphenol ethylene oxide adduct-based surfactant, and a polyhydric alcohol-based surfactant. These surfactants may be used alone or at least two thereof may be used in combination. The median diameter of the resin fine particles based on the volume distribution is preferably 0.05 to 1.0 μm and more preferably 0.05 to 0.4 μm. When the median diameter is not more than 1.0 μm, toner particles having an appropriate median diameter of 4.0 to 7.0 pan based on the volume distribution are easily obtained as the toner particles. Here, the median diameter based on the volume distribution can be measured using a dynamic light scattering particle size distribution meter (Nanotrac UPA-EX150: commercially available from Nikkiso Co., Ltd.).

Aggregating Step

The aggregating step is a step in which the above resin fine particle, and colorant fine particles and wax fine particles as necessary are mixed to prepare a mixed solution, and then the particles contained in the prepared mixed solution aggregate to form an aggregate. Regarding a method for forming the aggregate, for example, a method in which a flocculant is added to and mixed with the above mixed solution, and the temperature, mechanical power, and the like are appropriately adjusted may be preferably exemplified. Examples of flocculants include metal salts of monovalent metals such as sodium and potassium; metal salts of divalent metals such as calcium and magnesium; and metal salts of trivalent metals such as iron and aluminum.

The adding and mixing of the flocculant are preferably performed at a temperature not more than the glass transition temperature (Tg) of the resin particles contained in the mixed solution. When the above mixing is performed under this temperature condition, aggregation proceeds in a stable state. The above mixing can be performed using a known mixing apparatus, homogenizer, mixer or the like. Here, the weight-average particle diameter of the formed aggregate is not particularly limited, but may be generally controlled to 4.0 μm to 7.0 μm that is about the same as the weight-average particle diameter of the toner particles to be obtained. For example, the control can be easily performed by appropriately setting and changing the temperature when the flocculant and the like are added and mixed and the above stirring and mixing conditions. Here, the particle size distribution of the toner particles can be measured using a particle size distribution analyzing apparatus (coulter multisizer III: commercially available from Beckman Coulter Inc.) according to a coulter method.

Fusion Step

The fusion step is a step in which the above aggregate is heated and fused at at least a glass transition temperature (Tg) of the resin, and thus particles having a smoothed aggregate surface are produced. Before the primary fusion step, in order to prevent fusion between toner particles, a chelating agent, a pH adjusting agent, a surfactant, and the like can be appropriately added. Examples of chelating agents include the following: alkaline metal salts such as ethylenediamine tetraacetic acid (EDTA) and its Na salt, sodium gluconate, sodium tartrate, potassium citrate and sodium citrate, nitrotriacetate (NTA) salt, many water-soluble polymers containing both COOH and OH functionality (polymer electrolyte). The heating temperature may be a temperature between the glass transition temperature (Tg) of the resin contained in the aggregate and the temperature at which the resin is thermally decomposed. For the heating and fusion time, a short time is sufficient if the heating temperature is high and a long time is required if the heating temperature is low. That is, since the heating and fusion time depends on the heating temperature, it cannot be determined unconditionally, but is generally 10 minutes to 10 hours.

Cooling Step

The cooling step is a step in which the temperature of the aqueous medium containing the above particles is lowered to a temperature lower than the glass transition temperature (Tg) of the resin used. When cooling is not performed to a temperature lower than Tg, coarse particles may be produced. A specific cooling rate is 0.1° C./min to 50° C./min.

Shelling Step

In addition, as necessary, a shelling step can be added before the following washing and drying step. The shelling step is a step in which resin fine particles are newly added and adhered to the particles prepared in the previous step to form a shell. Here, the resin fine particles added may have the same structure as the binder resin fine particles used for the core or may have a different structure.

The resin constituting such a shell layer is not particularly limited and known resins used for the toner may be exemplified. For example, a polyester resin, a vinyl polymer such as a styrene-acrylic copolymer, an epoxy resin, a polycarbonate resin, a polyurethane resin, and the like can be used. Among these, a polyester resin or a styrene-acrylic copolymer is preferable, and a polyester resin is more preferable because it has high fixability and durability. When the polyester resin has a rigid aromatic ring in the main chain, since it is more flexible than a vinyl polymer such as a styrene-acrylic copolymer, it can impart the same mechanical strength even with a lower molecular weight than that of a vinyl polymer. Therefore, a polyester resin is preferable as a resin suitable for low-temperature fixability. Resins constituting the shell layer may be used alone or at least two thereof may be used in combination.

Washing and Drying Step

The particles prepared through the above steps are washed and filtered with ion-exchanged water whose pH is adjusted with sodium hydroxide or potassium hydroxide, and then washed and filtered with ion-exchanged water a plurality of times. Then, drying can be performed to obtain emulsified and aggregated toner particles.

In the case of suspension polymerization, it is possible to directly produce a toner by the following production method. The suspension polymerization method is a method for producing toner particles through a granulating step and a polymerizing step. In the granulating step, a polymerizable monomer composition containing polymerizable monomers that produce a binder resin, and additives such as a colorant and a wax as necessary is dispersed in an aqueous medium, and thereby droplets of the polymerizable monomer composition can be produced. In the polymerizing step, the polymerizable monomers in the droplet can be polymerized. Regarding the polymerizable monomer that can be used for producing a binder resin, the above vinyl-based polymerizable monomers can be preferably exemplified.

As necessary, a polar resin such as a polyester resin, a wax, a colorant, a crosslinking agent, and other additives are added to the polymerizable monomer, and uniformly dissolved or dispersed by a homogenizer, an ultrasonic dispersing machine, or the like to obtain a polymerizable monomer composition. The obtained polymerizable monomer composition is dispersed in an aqueous medium containing a dispersion stabilizer by a general stirrer, a homomixer, a homogenizer, or the like. In this case, the stirring speed and time are adjusted so that the droplets of the polymerizable monomer composition have a desired toner size, and granulating is performed to form particles of the polymerizable monomer composition. Then, the particle form is maintained due to the action of the dispersion stabilizer and stirring may be performed to such an extent that precipitation of the particles is prevented. As necessary, a polymerization initiator is added to cause a polymerization reaction. The polymerization temperature is generally at least 40° C., and is preferably set to a temperature of 50° C. to 120° C. When the polymerization temperature is at least 95° C., the container in which the polymerization reaction occurs may be pressurized and evaporation of the aqueous medium may be minimized.

The temperature may be raised in the latter half of the polymerization reaction, and the pH may be changed as necessary. In addition, in order to remove unreacted polymerizable monomers, byproducts and the like that cause an odor during fixing, the reaction temperature may be raised in the latter half of the reaction, or a part of the aqueous medium may be distilled off in the latter half of the reaction or after the reaction is completed. After the reaction is completed, the produced toner particle precursor dispersion is obtained. Next, the toner particle precursor dispersion is collected by concentration, cooling, washing, and filtration, and dried. The pH in the aqueous medium during granulating is not particularly limited, and is preferably pH 3.0 to 13.0, more preferably 3.0 to 7.0, and still more preferably 3.0 to 6.0. When granulating is performed in an acidic region, it is possible to prevent the content of metals derived from the dispersion stabilizer from becoming excess in the toner.

In addition, the toner particles are preferably washed with an acid with a pH of not more than 2.5 and more preferably washed with an acid with a pH of not more than 1.5. When the toner particles are washed with an acid, it is possible to reduce the amount of the dispersion stabilizer present on the surface of the toner particles. The acid used for washing is not particularly limited, and inorganic acids such as hydrochloric acid and sulfuric acid can be used. Thereby, it is possible to adjust charging performance of the toner particles to be within a desired range.

In addition to poorly water-soluble inorganic fine particles as the dispersion stabilizer, organic compounds, for example, polyvinyl alcohol, gelatin, methyl cellulose, methyl hydroxypropyl cellulose, ethyl cellulose, sodium salts of carboxymethyl cellulose, and starch may be used in combination. It is preferable to use from 0.01 parts by mass to 2.0 parts by mass of these dispersion stabilizers with respect to 100 parts by mass of the polymerizable monomer.

In addition, from 0.001 mass % to 0.1 mass % of a surfactant may be used in combination for refining these dispersion stabilizers. Specifically, commercially available nonionic, anionic, and cationic surfactants can be used. For example, sodium dodecyl sulfate, sodium tetradecyl sulfate, sodium pentadecyl sulfate, sodium octyl sulfate, sodium tetradecyl sulfate, sodium pentadecyl sulfate, sodium oleate, sodium laurate, potassium stearate, and calcium oleate are preferably used.

Hereinafter, other production devices will be described. Known devices can be used, regarding an example of a stirring device in the granulating step, devices having stirring blades such as a paddle blade, an inclined paddle blade, a three-swept blade, an anchor blade, and a full zone blade (commercially available from Kobe Steel Pantech Co., Ltd.), Max Blend (commercially available from Sumitomo Heavy Industries, Ltd.), Super Mix (commercially available from Satake Chemical Equipment Mfg., Ltd.), and Hi-F mixer (commercially available from Soken Chemical & Engineering Co., Ltd.) can be used. In addition, a stirrer that can impart a high shear force is more preferable. Regarding a high shear stirrer, a stirrer having a stirring chamber formed by a stirring rotor that rotates at a high speed and a screen provided to surround the stirring rotor is preferably used. Specifically, Ultra Turrax (commercially available from IKA), Polyilon (commercially available from Kinematica), T.K. homomixer (commercially available from PRIMIX Corporation), Crea Mix (commercially available from M Technique Co., Ltd.), W motion (commercially available from M Technique Co., Ltd.), Cavitron (commercially available from Cavitron), Sharp Flow Mill (commercially available from Pacific Machinery & Engineering Co., Ltd.), and the like are used.

The weight-average particle diameter (D4) of the toner is preferably from 4.0 μm to 12.0 μm and more preferably from 4.0 μm to 9.0 μm. When the weight-average particle diameter is at least 4.0 μm, the durability and heat resistance are favorable even after long-term use, and when the weight-average particle diameter is not more than 12.0 μm, the toner tinting strength and the image resolution are favorable.

In consideration of the storability and fixability, the glass transition temperature of the toner particles is preferably from 52° C. to 75° C.

The average circularity of the toner particles is preferably at least 0.950 and more preferably at least 0.960. The above range is preferable because there is a higher probability that toner particles or toner particles and a toner carrying member or a toner layer thickness control member will be uniformly triboelectrically charged, the stress received by the toner particles becomes uniform, charging performance is favorable, and fusion to the toner layer thickness control member is minimized.

Method for Measuring Number-Average Primary Particle Diameter of Organosilicon Polymer Particles Measurement of the number-average primary particle diameter of the organosilicon polymer particles is performed using an "S-4800" scanning electron microscope (product name, Hitachi, Ltd.). Observation is carried out on the toner to which organosilicon polymer particles have been added; in a visual field enlarged by a maximum of 50,000×, the long diameter of the primary particles of 100 randomly selected organosilicon polymer particles is measured; and the number-average particle diameter is determined. The enlargement factor in the observation is adjusted as appropriate depending on the size of the organosilicon polymer particles.

When the organosilicon polymer particles can be independently acquired as such, measurement can also be performed on these organosilicon polymer particles as such. When the toner contains silicon-containing material other than the organosilicon polymer particles, EDS analysis is carried out on the individual particles of the external additive during observation of the toner and the determination is made, based on the presence/absence of a peak for the element Si, as to whether the analyzed particles are organosilicon polymer particles.

When the toner contains both organosilicon polymer particles and silica fine particles, the organosilicon polymer particles are identified by comparing the ratio (Si/O ratio) for the Si and O element contents (atomic %) with a standard. EDS analysis is carried out under the same conditions on standards for both the organosilicon polymer particles and silica fine particles to obtain the element content (atomic %) for both the Si and O. Using A for the Si/O ratio for the organosilicon polymer particles and B for the Si/O ratio for the silica fine particles, measurement conditions are selected whereby A is significantly larger than B. Specifically, the measurement is run ten times under the same conditions on the standards and the arithmetic mean value is obtained for both A and B. Measurement conditions are selected whereby the obtained average values satisfy $A/B>1.1$.

When the Si/O ratio for a fine particle to be classified is on the A side from $[(A+B)/2]$, the fine particle is then scored as an organosilicon polymer particle. Tospearl 120A (Momentive Performance Materials Japan LLC) is used as the standard for the organosilicon polymer particles, and HDK V15 (Asahi Kasei Corporation) is used as the standard for the silica fine particles.

Method for Calculating Hydrophobicity of Organosilicon Polymer Particles and Inorganic Fine Particles The hydrophobicity is determined from the methanol dropwise transmittance curve obtained as follows. First, 70 ml of water is put into a cylindrical glass container with a diameter of 5 cm and a thickness of 1.75 mm, and dispersion is performed with an ultrasonic dispersion device for 5 minutes in order to remove bubbles and the like. Next, 0.1 g of organosilicon polymer particles or inorganic fine particles are accurately weighed and added to the container containing water to prepare a measurement sample solution. Then, the measurement sample solution is set in a powder wettability tester "WET-101P" (commercially available from Rhesca Co., Ltd.). This measurement sample solution is stirred at a rate of 6.7 $s^{-1}$ (400 rpm) using a magnetic stirrer. Here, as a rotor for the magnetic stirrer, a spindle type rotor coated with a fluororesin and having a length of 25 mm and a maximum barrel diameter of 8 mm is used.

Figure 3:
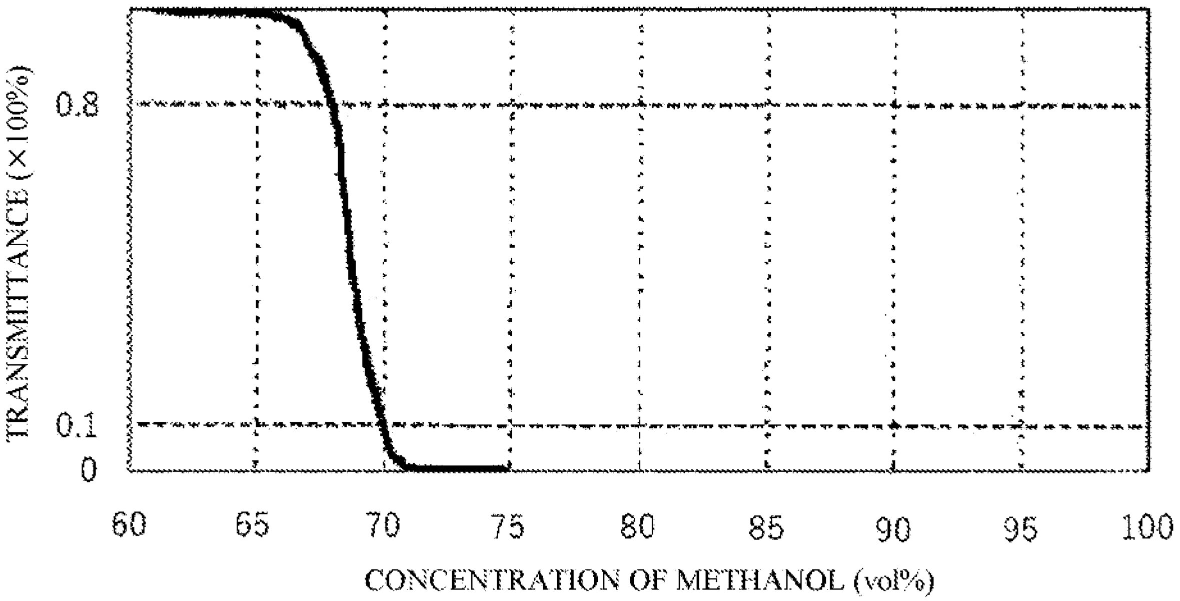
FIG. 3 shows a graph showing the transmittance with respect to the concentration of methanol.

Next, the transmittance of light with a wavelength of 780 nm is measured while continuously adding methanol at a dropping rate of 1.3 ml/min to the measurement sample solution through the above apparatus, and a methanol dropwise transmittance curve as shown in FIG. 3 is created. The concentration of methanol (vol %) when the transmittance reaches 50% of the transmittance when dropwise addition starts is defined as the hydrophobicity.

Identification of the Organosilicon Polymer Particles and Confirmation of the T3 Unit Structure Pyrolysis gas chromatography/mass spectrometry (also referred to hereafter as "pyrolysis GC/MS") and NMR are used to identify the composition and ratios of the constituent compounds of the organosilicon polymer particles present in the toner. When the toner contains a silicon-containing material and/or external additive other than the organosilicon polymer particles, the toner is dispersed in a solvent, e.g., chloroform, and the organosilicon polymer particles are then separated based on specific gravity differences using, e.g., centrifugal separation. This method is as follows. First, 1 g of the toner is added to and dispersed into 31 g of chloroform filled into a vial and, e.g., the organosilicon polymer particles, other external additive, and so forth, are separated from the toner. The dispersion is prepared by treating for 30 minutes using an ultrasound homogenizer for dispersion. The treatment conditions are as follows.

Ultrasound treatment instrument: VP-050 ultrasound homogenizer (TIETECH Co., Ltd.)
Microchip: stepped microchip, 2 mmϕ end diameter
Position of microchip end: center of glass vial, 5 mm height from bottom of vial
Ultrasound conditions: 30% intensity, 30 minutes During this treatment, the ultrasound is applied while cooling the vial with ice water to prevent the temperature of the dispersion from rising. The dispersion is transferred to a glass tube (50 mL) for swing rotor service and centrifugal separation is carried out using a centrifugal separator (H-9R, Kokusan Co., Ltd.) and conditions of 58.33 $S^{-1}$ and 30 minutes. Based on the specific gravity, centrifugal separation can provide separation within the glass tube of a fraction that contains primarily the organosilicon polymer particles. The resulting fraction is dried under vacuum conditions (40° C./24 hours) to obtain the sample. When the organosilicon polymer particles can be acquired as such, the organosilicon polymer particles may then also be measured as such.

Using the sample obtained by the above or organosilicon polymer particles, the abundance of the constituent compounds of the organosilicon polymer particles and proportion for the T3 unit structure in the organosilicon polymer particles is then measured and calculated using solid-state $^{29}$Si-NMR. Pyrolysis GC/MS is used for analysis of the species of constituent compounds of the organosilicon polymer particles. The species of constituent compounds of the organosilicon polymer particles are identified by analysis of the mass spectrum of the pyrolyzate components derived from the organosilicon polymer particles and produced by pyrolysis of the organosilicon polymer particles at 550° C. to 700° C. Specific measurement method is as follows.

[Measurement Conditions for Pyrolysis GC/MS]
pyrolysis instrument: JPS-700 (Japan Analytical Industry Co., Ltd.)
pyrolysis temperature: 590° C.
GC/MS instrument: Focus GC/ISQ (Thermo Fisher)
column: HP-SMS, 60 m length, 0.25 mm inner diameter, 0.25 μm film thickness
injection port temperature: 200° C.
flow pressure: 100 kPa
split: 50 mL/min
MS ionization: EI
ion source temperature: 200° C.
mass range 45 to 650

The abundance of the identified constituent compounds of the organosilicon polymer particles is then measured and calculated using solid-state $^{29}$Si-NMR. In solid-state $^{29}$Si-NMR, peaks are detected in different shift regions depending on the structure of the functional groups bonded to the Si in the constituent compounds of the organosilicon polymer particles. The structure of the functional groups of each peak can be identified by using a reference sample. The abundance of each constituent compound can be calculated from the obtained peak areas. The determination can be carried out by calculating the proportion for the peak area for the T3 unit structure with respect to total peak area. The measurement conditions for the solid-state $^{29}$Si-NMR are as follows.

instrument: JNM-ECX5002 (JEOL RESONANCE)
temperature: room temperature
measurement method: DDMAS method, $^{29}$Si, 45°
sample tube: zirconia 3.2 mmφ
sample: filled in powder form into the sample tube
sample rotation rate: 10 kHz
relaxation delay: 180 s
scans: 2000

After this measurement, peak separation is performed, for the chloroform-insoluble matter of the organosilicon polymer particles, into the following structure X1, structure X2, structure X3, and structure X4 by curve fitting for silane components having different substituents and bonding groups, and their respective peak areas are calculated. The structure X3 indicated below is the T3 unit structure, structure X1:$(Ri)(Rj)(Rk)SiO_{1/2}$ (A1)

structure X2:$(Rg)(Rh)Si(O_{1/2})_2$ (A2)

structure X3:$RmSi(O_{1/2})_3$ (A3)

structure X4:$Si(O_{1/2})_4$ (A4)

X1

(A1)

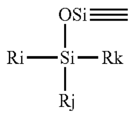

X2

-continued (A2)

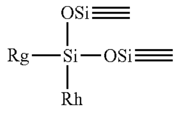

X3

(A3)

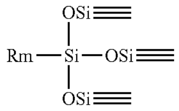

X4

(A4)

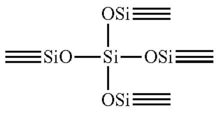

The Ri, Rj, Rk, Rg, Rh, and Rm in formulas (A1), (A2), and (A3) represent a silicon-bonded organic group, e.g., a hydrocarbon group having from 1 to 6 carbons, halogen atom, hydroxy group, acetoxy group, or alkoxy group. The hydrocarbon group represented by the aforementioned $R^1$ is identified by $^{13}$C-NMR.

Measurement Conditions for $^{13}$C-NMR (Solid State)

instrument: JNM-ECX50011 from JEOL RESONANCE, Inc.

sample tube: 3.2 mmϕ sample: filled in powder form into the sample tube measurement temperature: room temperature pulse mode: CP/MAS measurement nucleus frequency: 123.25 MHz ($^{13}$C)

reference material: adamantane (external reference: 29.5 ppm)

sample rotation rate: 20 kHz contact time: 2 ms retardation time: 2 s number of integrations: 1024

In this method, the hydrocarbon group represented by $R^1$ is confirmed by the presence/absence of a signal originating with, e.g., the silicon atom-bonded methyl group ($Si—CH_3$), ethyl group ($Si—C_2H_5$), propyl group ($Si—C_3H_7$), butyl group ($Si—C_4H_9$), pentyl group ($Si—C_5H_{11}$), hexyl group ($Si—C_6H_{13}$), or phenyl group ($Si—C_6H_5$). When a finer structural discrimination is necessary, identification may be carried out using the results of $^1$H-NMR measurement together with the results of the aforementioned $^{13}$C-NMR measurement and $^{29}$Si-NMR measurement.

Method for Quantitating the Organosilicon Polymer Particles Present in the Toner The content of the organosilicon polymer particles present in the toner is measured using x-ray fluorescence. The x-ray fluorescence measurement is based on JIS K 0119-1969, and specifically is carried out as follows. An "Axios" wavelength-dispersive x-ray fluorescence analyzer (PANalytical B.V.) is used as the measurement instrument, and the "SuperQ ver. 5.0L" (PANalytical B.V.) software provided with the instrument is used in order to set the measurement conditions and analyze the measurement data. Rh is used for the x-ray tube anode; a vacuum is used for the measurement atmosphere; and the measurement diameter (collimator mask diameter) is 27 mm. With regard to the measurement, measurement is carried out using the Omnian method in the element range from F to U, and detection is carried out with a proportional counter (PC) in the case of measurement of the light elements and with a scintillation counter (SC) in the case of measurement of the heavy elements.

The acceleration voltage and current value for the x-ray generator are established so as to provide an output of 2.4 kW. For the measurement sample, 4 g of the toner is introduced into a specialized aluminum compaction ring and is smoothed over, and, using a "BRE-32" tablet compression molder (Mackawa Testing Machine Mfg. Co., Ltd.), a pellet is produced by molding to a thickness of 2 mm and a diameter of 39 mm by compression for 60 seconds at 20 MPa, and this pellet is used as the measurement sample. X-ray exposure is carried out on the pellet molded under the aforementioned conditions, and the resulting characteristic x-rays (fluorescent x-rays) are dispersed with a dispersion element. The intensity of the fluorescent x-rays dispersed at the angle corresponding to the wavelength specific to each element contained in the sample is analyzed by the fundamental parameter method (FP method), the content ratio for each element contained in the toner is obtained as a result of the analysis, and the silicon atom content in the toner is determined.

The content of the organosilicon polymer particles in the toner can be obtained by calculation from the relationship between the silicon content in the toner that is determined by x-ray fluorescence and the content ratio for the silicon in the constituent compounds of the organosilicon polymer particles for which the structure has been established using, e.g., solid-state $^{29}$Si-NMR and pyrolysis GC/MS. When a silicon-containing material other than the organosilicon polymer particles is contained in the toner, using the same methods as described above, a sample provided by the removal from the toner of the silicon-containing material other than the organosilicon polymer particles, can be obtained and the organosilicon polymer particles contained in the toner can be quantitated.

Method for Calculating Solubility Parameter (SP Value)

The SP value ($SP_{si}$) of the organosilicon polymer particle, the SP value ($SP_{apes}$) of the amorphous resin, and the SP value ($SP_{cpes}$) of the crystalline polyester resin are determined using the following Fedors formula based on the results of structural analysis of the organosilicon polymer particle, the amorphous resin and the crystalline polyester resin. For the values of Δei and Δvi, reference is made to "Energies of Vaporization and Molar Volumes (25° C.) of Atoms and Atomic Groups" in Tables 3-9 of "Basic Coating Science" (pp. 54-57, 1986 (Maki Shoten Publishing)). The unit for the SP value is $(cal/cm^3)^{1/2}$, but this can be converted to the $(J/m^3)^{1/2}$ unit using 1 $(cal/cm^3)^{1/2}=2.046\times10^3$ $(J/m^3)^{1/2}$.

$$\delta i=(Ev/V)^{1/2}=(\Delta ei/\Delta vi)^{1/2}$$

Ev: energy of vaporization

V: molar volume

Δci: energy of vaporization of the atoms or atomic groups of component i

Δvi: molar volume of the atoms or atomic groups of component i

Method for Measuring Amount of Adsorbed Water of Organosilicon Polymer Particle

The amount of adsorbed water in organosilicon polymer particles is measured using a "high-precision vapor adsorption amount measuring device BELSORP-aqua3" (commercially available from Bel Japan, Inc.). The "high-precision vapor adsorption amount measuring device BELSORP-aqua3" causes a solid-gas equilibrium to be formed under a condition in which there is only a target gas (water in the present disclosure), and measures a solid mass and a vapor pressure at that time. First, about 1 g of a sample is introduced into a sample cell, and degassing is performed at a normal temperature and not more than 100 Pa for 24 hours. After degassing is completed, the weight of the sample is accurately weighed, and the sample is set in the apparatus main body, and measurement is performed under the following conditions.

Air constant temperature bath temperature: 80.0° C.

Adsorption temperature: 30.0° C.

Adsorbate name: $H_2O$

Balancing time: 500 sec

Waiting for temperature: 60 min

Saturated vapor pressure: 4.245 kPa

Sample tube exhaust speed: normal

Introduction pressure initial introduction amount: 0.20 $cm^3$ (STP)·$g^{-1}$

Measured relative pressure P/P0 (measure adsorbing step→desorbing step): 0.05, 0.15, 0.25, 0.35, 0.45, 0.55, 0.65, 0.75, 0.85, 0.90, 0.95

Measurement is performed under the above conditions, a moisture adsorption-desorption isotherm at a temperature of 30° C. is drawn, and the amount of adsorbed water (mg/g) at a humidity of 80% RH in the adsorbing step is calculated.

Measurement of Proportion of Oxygen Atoms Derived from Silanol Groups

The proportion of oxygen atoms derived from silanol groups among oxygen atoms in the organosilicon polymer particles can be measured using a thermal analysis device TGA7 (commercially available from PerkinElmer Co., Ltd.). The measurement method is as follows. In a nitrogen atmosphere, organosilicon polymer particles are heated from 50° C. to 900° C. at a ramp rate of 25° C./min. The reduced mass % between 150° C. and 400° C. is defined as a ratio of mass reduction due to dehydration condensation between silanol groups in the organosilicon polymer particles. In combination with the identification results of the organosilicon polymer particles, the proportion of oxygen atoms derived from silanol groups among oxygen atoms in the organosilicon polymer particles is calculated.

Method for Measuring Attachment Index and Coverage Ratio of Organosilicon Polymer Particle An evaluation of the amount of transfer of the organosilicon polymer particles when the toner is brought into contact with a substrate is used as the procedure for expressing the state of attachment of the organosilicon polymer particles with an index. With regard to the material of the surface layer of the substrate, a substrate that uses a polycarbonate resin for the surface layer material is used as a substrate that simulates the surface layer of the photosensitive member. Specifically, a coating solution is first prepared by dissolving a bisphenol Z-type polycarbonate resin (product name: Iupilon Z-400, Mitsubishi Engineering-Plastics Corporation, viscosity-average molecular weight (Mv) =40000) in toluene to a concentration of 10 mass %. Using a #50 Mayer bar, this coating solution is coated on a 50 μm-thick aluminum sheet to form a coating film. This coating film is dried for 10 minutes at 100° C. to produce a sheet having a polycarbonate resin layer (film thickness=10 μm) on the aluminum sheet. This sheet is supported with a substrate holder. The substrate is a square with 3 mm edges. The measurement step is subdivided into a step of placing the toner on the substrate, a step of removing the toner from the substrate, and a step of quantitating the amount of attachment of the organosilicon polymer particles that have been supplied to the substrate, each of which is described in the following.

Step of Placing the Toner on the Substrate

The toner is introduced into a soft, porous material (denoted below as the "toner carrier"), and this toner carrier is brought into contact with the substrate. The method for impregnating the toner into the toner carrier comprises carrying out the following step five times: dipping the toner carrier into a container filled with sufficient toner and then removing the toner carrier. The surface of the toner carrier is visually confirmed to be coated with the toner and not visible. A sponge (product name: White Wiper, Marusan Industry Co., Ltd.) is used for the toner carrier. The toner-loaded toner carrier is fixed to the end of a load cell that itself is fixed to a stage that moves in the perpendicular direction with respect to the contact surface of the substrate, whereby the toner-loaded toner carrier and substrate can be brought into contact while measuring the load. Designating one step as moving the stage to press the toner-loaded toner carrier against the substrate until the load cell displays 10 N and then separating, contact between the toner-loaded toner carrier and substrate is performed by carrying out this step five times.

Step of Removing the Toner from the Substrate

Ater contact with the toner-loaded toner carrier, an elastomeric suction opening with an inner diameter of 5 mm, which is connected to the nozzle end of a vacuum cleaner, is brought into proximity to the substrate so as to be perpendicular to the toner placement side and the toner adhered on the substrate is removed. This removal is carried out while visually ascertaining the degree to which the toner remains. The distance between the substrate and the end of the suction opening is 1 mm, and the duration of suction is 3 seconds and the suction pressure is 6 kPa.

Step of Quantitating the Amount of Attachment of the Organosilicon Polymer Particles that have been Supplied to the Substrate Image measurement during observation with a scanning electron microscope is used to quantitate the amount and shape of the organosilicon polymer particles that remain on the substrate after removal of the toner. First, after removal of the toner, platinum is sputtered on the substrate using conditions of a current of 20 mA and 60 seconds to prepare a specimen for observation. Any observation magnification that enables observation of the organosilicon polymer particles may be selected for the observation with the scanning electron microscope. A Hitachi Ultrahigh Resolution Field Emission Scanning Electron Microscope (product name: S-4800, Hitachi High-Technologies Corporation) is used for the scanning electron microscope, and observation with the S-4800 (product name) is carried out using the backscattered electron image. 50000× is used for the observation magnification, 10 kV is used for the acceleration voltage, and 3 mm is used for the working distance.

In the image yielded by the observation, the organosilicon polymer particles are displayed at high brightness and the substrate is displayed at low brightness, and because of this the amount of the organosilicon polymer particles in a visual field can be quantitated by binarization. The binarization conditions are selected as appropriate in accordance with the observation instrument and the sputtering conditions, image) image analysis software (available at https://imagej.nih.gov/ij/) is used for the binarization. Only the area of the organosilicon polymer particles is summed with the ImageJ, and the area ratio for the organosilicon polymer particles in the observed visual field is determined by dividing by the area of the overall observed visual field. This measurement is carried out on 100 binarized images, and the average value thereof is used as the area ratio [A] (unit: area %) for the organosilicon polymer particles on the substrate.

The coverage ratio [B] (unit: area %) by the organosilicon polymer particles on the toner particle is then calculated. The coverage ratio by the organosilicon polymer particles is measured using image measurement in observation with a scanning electron microscope. The same magnification as in the observation of the organosilicon polymer particles on the substrate is adopted for the observation magnification used to observe the organosilicon polymer particles in the observation with the scanning electron microscope. The aforementioned S-4800 Hitachi Ultrahigh Resolution Field Emission Scanning Electron Microscope (product name) is used for the scanning electron microscope. When, in the measurement of the area ratio A and the coverage ratio B, fine particles other than the organosilicon polymer particles are present in the toner, EDS analysis is performed on each of the external additive particles during toner observation, and whether the analyzed particle is an organosilicon polymer particle is scored based on the presence/absence of Si element peaks. In specific terms, the same procedure is carried out as for the number-average primary particle diameter of the organosilicon polymer particles. The conditions for image acquisition are as follows.

(1) Sample Production

A conductive paste is thinly applied onto a sample stand (15 mm×6 mm aluminum sample stand), and toner is blown onto the paste. Air is further blown to remove excess toner from the sample stand, and thoroughly dry the toner. The sample stand is set in a sample holder, and the height of the sample stand is adjusted to 36 mm using a sample height gauge.

(2) Setting of S-4800 Observation Conditions

The coverage ratio [B] of the organosilicon polymer particles is calculated using images obtained through backscattered electron image observation in S-4800. The coverage ratio [B] of the organosilicon polymer particles can be measured with good precision because charge-up is less pronounced in backscattered electron images than in secondary electron images. Liquid nitrogen is poured into an anti-contamination trap attached to the housing of S-4800, until overflow, and the whole is allowed to stand for 30 minutes. Then "PC-SEM" of S-4800 is operated, to perform flushing (to purify a FE chip as an electron source). An acceleration voltage display portion of the control panel on the screen is clicked, and the [Flushing] button is pressed, to open a flushing execution dialog. Flushing is executed after the flushing strength is confirmed to be 2. It is then checked that an emission current by flushing is from 20 μA to 40 μA. The sample holder is inserted into a sample chamber of the S-4800 housing. Then [Origin] is pressed on the control panel, to transfer the sample holder to the observation position.

The acceleration voltage display portion is clicked to open an HV setting dialog, and acceleration voltage is set to [0.8 kV] and emission current to [120 μA]. In a [Basic] tab of the operation panel, signal selection is set to [SE], [Upper (U)] and [+BSE] are selected as an SE detector, and [L.A. 100] is selected using the selection button to the right of [+BSE], to set a mode of observation on a backscattered electron image. In the same [Basic] tab of the operation panel, the probe current of a condition block of an electro-optical system is set to [Normal], focus mode to [UHR], and WD to [3.0 mm]. The [ON] button of the acceleration voltage display portion on the control panel is pressed, to apply acceleration voltage.

(3) Focus Adjustment

The magnification indicator in the control panel is dragged to set magnifications to 5000 (5 k) magnifications. The [COARSE] focus knob on the operation panel is turned, and the aperture alignment is adjusted once a certain focus is achieved throughout the field of view. Then, [Align] is clicked on the control panel, to display an alignment dialog, and [Beam] is selected. The STIGMA/ALIGNMENT knobs (X, Y) on the operation panel are turned, and the displayed beam is moved to the center of the concentric circle. Then [Aperture] is selected, and the STIGMA/ALIGNMENT knobs (X, Y) are turned one at a time, until image movement ceases or is minimal. The aperture dialog is closed, and focusing is performed using autofocus. This operation is then repeated twice to adjust focus.

In a state where the midpoint of maximum diameter is aligned with the center of the measurement screen, for the target toner, the magnification indicator in the control panel is dragged to set magnifications to 10000 (10 k) magnifications. The [COARSE] focus knob on the operation panel is turned, and aperture alignment is adjusted once a certain focus is achieved. Then, [Align] is clicked on the control panel to display an alignment dialog, and [Beam] is selected. The STIGMA/ALIGNMENT knobs (X, Y) on the operation panel are turned, and the displayed beam is moved to the center of the concentric circle.

Then, [Aperture] is selected, and the STIGMA/ALIGNMENT knobs (X, Y) are turned one at a time until image movement ceases or is minimal. The aperture dialog is closed, and focusing is performed using autofocus. Thereafter, magnifications are set to 50000 (50 k) magnifications, focus is adjusted using the focus knob and STIGMA/ALIGNMENT knobs as described above, and focusing is performed once more using autofocus. This operation is repeated again to adjust focus. When the inclination angle of an observation surface is large, the measurement precision of coverage ratio is prone to decrease. To perform the analysis, therefore, an observation surface exhibiting as little inclination as possible is selected by choosing the observation surface so that the entirety thereof becomes focused simultaneously.

(4) Image Storage

Brightness is adjusted in an ABC mode, and 640×480 pixel photographs are captured and stored. The analysis described below is performed using these image files. One photograph is captured for each toner, to obtain images of at least 100 particles of toner.

The observed image is binarized using ImageJ image analysis software (available at https://imagej.nih.gov/ij/). After binarization, via [Analyze]-[Analyze Particles], only the organosilicon polymer particles are extracted based on the EDS analysis and the coverage ratio (unit: area %) by the organosilicon polymer particles on the toner particle is determined. This measurement is carried out on 100 binarized images and the average value of the coverage ratio (unit: area %) by the organosilicon polymer particles is used as the coverage ratio [B] by the organosilicon polymer particles. The attachment index for the organosilicon polymer particles is calculated using the following formula (1) from the area ratio [A] for the organosilicon polymer particles on the substrate and the coverage ratio [B] by the organosilicon polymer particles.

$$\text{Attachment index} = \text{area ratio } [A] \text{ for the organosilicon polymer particles transferred to the polycarbonate film} / \text{coverage ratio } [B] \text{ by the organosilicon polymer particles at the toner particle surface} \times 100 \quad \text{(I)}$$

Method for Measuring Coverage Ratio of Organosilicon Polymer Particle

For the coverage ratio of the organosilicon polymer particles on the surface of the toner particles, the value of the coverage ratio [B] of the organosilicon polymer particles with respect to the toner particles in the method for measuring an attachment index of the organosilicon polymer particles is used (unit is area %).

Dispersity Evaluation Index of Organosilicon Polymer Particles

The dispersity evaluation index for the organosilicon polymer particles at the toner surface is determined using an "S-4800" scanning electron microscope. In a visual field enlarged by 10000×, observation at an acceleration voltage of 1.0 kV is performed in the same visual field of the toner to which organosilicon polymer particles have been externally added. The determination is carried out on the observed image as described in the following using "Image-Pro Plus 5.1J" (Media Cybernetics. Inc.) image processing software.

Binarization is performed such that only organosilicon polymer particles are extracted: the number n of the organosilicon polymer particles and the barycentric coordinates for all the organosilicon polymer particles are determined; and the distance dn min to the nearest-neighbor organosilicon polymer particle is determined for each organosilicon polymer particle. The dispersity is given by the following formula using dave for the average value of the nearest-neighbor distances between the organosilicon polymer particles in the image.

The dispersity is determined using this procedure on 50 of the toner observed at random, and the arithmetic average value thereof is taken to be the dispersity evaluation index. Smaller values of the dispersity evaluation index indicate a better dispersity. When fine particles other than the organosilicon polymer particles are present in the toner, the organosilicon polymer particles can be differentiated by the EDS analysis referenced above.

$$\text{dispersity evaluation index} = \sqrt{\frac{\sum_{i}^{n}(dn\ \min - d\ ave)^2}{n}} / d\ ave$$

Method for Measuring Shape Factor SF-1 of Organosilicon Polymer Particle

The SF-1 of the organosilicon polymer particles is measured by observing organosilicon polymer particles on the surface of the toner using a scanning electron microscope (SEM) "S-4800" (commercially available from Hitachi, Ltd.). In a field of view with a magnification of 100,000 to 200,000, the maximum length and the peripheral length of primary particles of 100 organosilicon polymer particles are measured using image processing software Image-Pro Plus5.1J (commercially available from MediaCybernetics).

SF-1 is calculated by the following formula, and the arithmetic average value is used.

$$\text{SF-1} = (\text{maximum length of primary particles})^2/\text{area of primary particles} \times \pi/4 \times 100$$

Molecular Weight and Molecular Weight Distribution of Crystalline Polyester Resin, Amorphous Polyester Resin, and Styrene-Acrylic Resin The molecular weight and the molecular weight distribution of the sample are calculated in terms of polystyrene by gel permeation chromatography (GPC). When the molecular weight of the resin having an acid group is measured, since the column dissolution rate depends on the amount of the acid group, a sample in which the acid group is capped in advance is prepared. Methyl esterification is preferable for capping, and a commercially available methyl esterifying agent can be used. Specific examples thereof include a method of treating with trimethylsilyldiazomethane.

The molecular weight is measured by GPC as follows.

First, the measurement sample is dissolved in tetrahydrofuran (THF) at a normal temperature over 24 hours. Then, the obtained solution is filtered with a solvent-resistant membrane filter "Maishori Disc" with a pore diameter of 0.2 μm (commercially available from Tosoh Corporation) to obtain a sample solution. Here, the sample solution is adjusted so that the concentration of components soluble in THF is 0.8 mass %. Measurement is performed using this sample solution under the following conditions.

Apparatus: HLC8120 GPC (detector: RI) (commercially available from Tosoh Corporation)

Column: 7 columns, Shodex KF-801, 802, 803, 804, 805, 806, and 807 (commercially available from Showa Denko K.K.)

Eluent: tetrahydrofuran (THF)

Flow rate: 1.0 mL/min

Oven temperature: 40.0° C.

Sample injection amount: 0.10 mL

When the molecular weight of the measurement sample is calculated, a molecular weight calibration curve created using a standard polystyrene resin (for example, product name "TSK standard polystyrene F-850, F-450, F-288, F-128, F-80, F-40, F-20, F-10, F-4, F-2, F-1, A-5000, A-2500, A-1000, A-500", commercially available from Tosoh Corporation) is used.

Glass Transition Temperature of Amorphous Resin and Toner Particles

The glass transition temperature Tg of the samples such as resin is measured using a "Q1000" differential scanning calorimeter (TA Instruments) in accordance with ASTM D 3418-82. Temperature correction in the instrument detection section uses the melting points of indium and zinc, and correction of the amount of heat uses the heat of fusion of indium. Specifically, 3 mg of the sample is exactly weighed out and introduced into an aluminum pan; an empty aluminum pan is used for reference. These are measured at a ramp rate of 10° C./min in the measurement temperature range of 30'C to 200° C. For the measurement, the temperature is raised at a ramp rate of 10° C./min to 200° C., then reduced at a ramp down rate of 10° C./min to 30° C., and then raised again at a ramp rate of 10° C./min. Using the DSC curve obtained in this second ramp up step, the glass transition temperature Tg (° C.) is taken to be the point at the intersection between the DSC curve and the line for the midpoint for the baselines for prior to and subsequent to the appearance of the change in the specific heat.

Structural Analysis of Amorphous Resin and Crystalline Polyester Resin

The structure of the amorphous resin and the crystalline polyester resin can be determined using a nuclear magnetic resonance apparatus ($^1$H-NMR, $^{13}$C-NMR) and an FT-IR spectrum. The apparatuses used will be described below. The resin samples may be collected and analyzed by separating them from the toner.

i) $^1$H-NMR, $^{13}$C-NMR

FT-NMR JNM-EX400 (solvent used, deuterated chloroform) (commercially available from JEOL Ltd.)

(ii) FT-1R Spectrum

AVATAR360FT-IR (commercially available from Thermo Fisher Scientific Inc.)

Separation of Amorphous Resin and Crystalline Polyester Resin from Toner

Properties can be measured using materials such as an amorphous resin and a crystalline polyester resin separated from the toner by the following method. The toner is dissolved in an organic solvent such as THF and separated by a known preparative method (preparative GPC or the like) to isolate the compound contained in the toner.

Measurement of Content of Crystalline Polyester Resin

Since the following analysis method is provided as a method for measuring the content of a crystalline polyester resin, this will be exemplified. First, the toner is dissolved in chloroform, and insoluble components are removed using, for example, Maishori Disc H-25-2 (commercially available from Tosoh Corporation). Next, soluble components are introduced into a preparative HPLC (for example, LC-9130 NEXT preparative column [60 cm] commercially available from Japan Analytical Industry Co., Ltd.), and separated into a component with a molecular weight of less than 5000 and a component with a molecular weight of at least 5000. This operation is performed to separate two components using the fact that a release agent generally has a low molecular weight and a crystalline polyester resin has a larger molecular weight than the release agent. Then, the above separated components are subjected to $^1$H-NMR measurement, and thus the amount of the crystalline polyester resin with respect to the binder resin can be calculated.

Measurement of Acid Value of Resin Such as Crystalline Polyester Resin and Amorphous Resin The acid value is mg of potassium hydroxide required to neutralize an acid contained in 1 g of a sample. The acid value is measured according to JIS K 0070-1992, and specifically, measured according to the following procedure. Titration is performed using a 0.1 mol/L potassium hydroxide ethyl alcohol solution (commercially available from Kishida Chemical Co., Ltd.). The factor of the potassium hydroxide ethyl alcohol solution can be determined using a potentiometric titration apparatus (potentiometric titration measuring apparatus AT-510 commercially available from Kyoto Electronics Manufacturing Co., Ltd.). 100 mL of 0.100 mol/L hydrochloric acid is put into a 250 mL tall beaker, titration is performed using the potassium hydroxide ethyl alcohol solution, and the factor is determined from the amount of the potassium hydroxide ethyl alcohol solution required for neutralization. Regarding the 0.100 mol/L hydrochloric acid, an acid prepared according to JIS K 8001-1998 is used.

Measurement conditions during acid value measurement are shown below.

Titration apparatus: potentiometric titration apparatus AT-510 (commercially available from Kyoto Electronics Manufacturing Co., Ltd.)

Electrode: composite glass electrode double junction type (commercially available from Kyoto Electronics Manufacturing Co., Ltd.)

Titration apparatus control software: AT-WIN

Titration analysis software: Tview

Titration parameters and control parameters during titration are shown below.

(Titration Parameters)

Titration mode: blank titration

Titration type: total titration

Maximum titration amount: 20 mL

Waiting time before titration: 30 seconds

Titration direction: automatic (Control Parameters)

End point determination potential: 30 dE

End point determination potential value: 50 dE/d mL

End point detection determination: not set

Control speed mode: standard

Gain: 1

Data collection potential: 4 mV

Data collection titration amount: 0.1 mL

Main Test;

0.100 g of a measurement sample is accurately weighed in a 250 mL tall beaker, and 150 mL of a mixed solution containing toluene/ethanol (3:1) is added and dissolved over 1 hour. Titration is performed using the potassium hydroxide ethyl alcohol solution by the potentiometric titration apparatus.

Blank Test;

The same titration as the above operation is performed except that no sample is used (that is, only a mixed solution containing toluene/ethanol (3:1) is used). The obtained result is assigned to the following formula to calculate the acid value.

$$A=[(C-B)\times f\times 5.61]/S$$

(in the formula, A: acid value (mg KOH/g), B: amount of potassium hydroxide solution added in blank test (mL), C: amount of potassium hydroxide solution added in main test (mL), f: factor of potassium hydroxide solution, and S: mass (g) of sample.)

Measurement of Hydroxyl Value of Resin Such as Crystalline Polyester Resin and Amorphous Resin The hydroxyl value is mg of potassium hydroxide required to neutralize an acetic acid bonded to hydroxy groups when 1 g of a sample is acetylated. The hydroxyl value is measured according to JIS K 0070-1992, and specifically, measured according to the following procedure. 25.0 g of a special grade acetic anhydride is put into a 100 mL volumetric flask and pyridine is added to make a total volume of 100 mL, and the mixture is sufficiently shaken to obtain an acetylation reagent. The obtained acetylation reagent is stored in a brown bottle so that it does not come into contact with moisture, carbon dioxide gas, or the like. Titration is performed using a 1.0 mol/L potassium hydroxide ethyl alcohol solution (commercially available from Kishida Chemical Co., Ltd.). The factor of the potassium hydroxide ethyl alcohol solution is determined using a potentiometric titration apparatus (potentiometric titration measuring apparatus AT-510, commercially available from Kyoto Electronics Manufacturing Co., Ltd.). Specifically, 100 mL of 1.00 mol/L hydrochloric acid is put into a 250 mL tall beaker, titration is performed using a potassium hydroxide ethyl alcohol solution, and the amount of the potassium hydroxide ethyl alcohol solution required for neutralization is determined. Regarding the 1.00 Mol/L hydrochloric acid, an acid prepared according to JIS K 8001-1998 is used.

Measurement conditions during hydroxyl value measurement are shown below.

Titration apparatus: potentiometric titration apparatus AT-510 (commercially available from Kyoto Electronics Manufacturing Co., Ltd.)

Electrode: composite glass electrode double junction type (commercially available from Kyoto Electronics Manufacturing Co., Ltd.)

Titration apparatus control software: AT-WIN

Titration analysis software: Tview

Titration parameters and control parameters during titration are shown below.

(Titration Parameters)

Titration mode: blank titration

Titration type: total titration

Maximum titration amount: 80 mL
Waiting time before titration: 30 seconds
Titration direction: automatic
(Control Parameters)
End point determination potential: 30 dE
End point determination potential value: 50 dE/dmL
End point detection determination: not set
Control speed mode: standard
Gain: 1
Data collection potential: 4 mV
Data collection titration amount: 0.5 mL Main Test 2.00 g of a measurement sample is accurately weighed in a 200 mL roundbottom flask, and 5.00 mL of the above acetylation reagent is accurately added thereto using a volumetric pipette. In this case, when the sample does not easily dissolve in an acetylation reagent, a small amount of special grade toluene is added to dissolve the sample. A small funnel is mounted on the mouth of the flask, and the bottom of the flask is immersed to 1 cm in a glycerin bath at 97° C. and heated. In this case, in order to prevent the temperature of the neck of the flask from rising due to heat of the bath, it is preferable to cover the base of the neck of the flask with a cardboard with round holes. After 1 hour, the flask is removed from the glycerin bath and cooled. After cooling, 1.00 mL of water is added from the funnel and shaken to hydrolyze acetic anhydride. In addition, in order to perform hydrolysis completely, the flask is heated again in the glycerin bath for 10 minutes. After cooling, the walls of the funnel and the flask are washed with 5.00 mL of ethyl alcohol. The obtained sample is transferred to a 250 mL tall beaker, and 100 mL of a mixed solution containing toluene and ethanol (3:1) is added, and dissolved over 1 hour. Titration is performed using the potassium hydroxide ethyl alcohol solution by the potentiometric titration apparatus.

Blank Test

The same titration as the above operation is performed except that no sample is used (that is, only a mixed solution containing toluene and ethanol (3:1) is used). The obtained result is assigned to the following formula to calculate the hydroxyl value.

$$A=[\{(B-C)\times 28.05*f\}/S]+D$$

Here, A: hydroxyl value (mg KOH/g), B: amount of potassium hydroxide ethyl alcohol solution added in blank test (mL). C: amount of potassium hydroxide ethyl alcohol solution added in main test (mL), f: factor of potassium hydroxide ethyl alcohol solution, S: mass (g) of sample, and D: acid value of sample (mg KOR/g).

Method for Measuring Weight-Average Particle Diameter (D4) and Number-Average Particle Diameter (D1) of Toner The weight-average particle diameter (D4) and number-average particle diameter (D1) of the toner is determined proceeding as follows. The measurement instrument used is a "Coulter Counter Multisizer 3" (registered trademark, Beckman Coulter, Inc.), a precision particle size distribution measurement instrument operating on the pore electrical resistance method and equipped with a 100-μm aperture tube. The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels. The aqueous electrolyte solution used for the measurements is prepared by dissolving special-grade sodium chloride in deionized water to provide a concentration of approximately 1 mass % and, for example, "ISOTON 11" (Beckman Coulter, Inc.) can be used.

The dedicated software is configured as follows prior to measurement and analysis. In the "modify the standard operating method (SOM)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1600 μA; the gain is set to 2; the electrolyte solution is set to ISOTON II; and a check is entered for the "post-measurement aperture tube flush". In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm. The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30 mL of the aqueous electrolyte solution is introduced into a 100-mL flat bottom glass beaker, and to this is added as dispersing agent approximately 0.3 mL, of a dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. Approximately 3.3 L of deionized water is introduced into the water tank of the ultrasound disperser and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner is added to the aqueous electrolyte solution in small aliquots and dispersion is carried out. The ultrasound dispersion treatment is continued for an additional 60 seconds. The water temperature in the water tank is controlled as appropriate during ultrasound dispersion to be 10° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) and number-average particle diameter (D1) are calculated. When set to graph/volume % with the dedicated software, the "average diameter" on the "analysis/volumetric statistical value (arithmetic average)" screen is the weight-average particle diameter (D4). When set to graph/% by number with the dedicated software, the "average diameter" on the "analysis/number statistics (arithmetic mean)" screen is the number-average particle diameter (D1).

Method for Measuring Average Circularity of Toner Particles

The average circularity of the toner particles is measured by a flow type particle image analyzing apparatus "FPIA-3000" (commercially available from Sysmex Corporation) under measurement and analysis conditions during a calibration operation. A specific measurement method is as follows. First, about 20 ml of ion-exchanged water in which solid impurities and the like are removed in advance is put into a glass container. About 0.2 ml of a diluted solution obtained by diluting "Contaminon N" (a 10 mass % aqueous solution containing a neutral detergent for washing a precision measuring instrument which is composed of a nonionic surfactant, an anionic surfactant, and an organic builder and has a pH of 7, commercially available from Wako Pure Chemical Corporation) as a dispersing agent with ion-exchanged water about 3 times by mass is added thereto. In addition, about 0.02 g of the measurement sample is added, and a dispersion treatment is performed using an ultrasonic dispersion device for 2 minutes to prepare a measurement dispersion. In this case, cooling is appropriately performed so that the temperature of the dispersion is from 10° C. to 40° C. A desktop ultrasonic cleaner disperser with an oscillation frequency of 50 kHz and an electrical output of 150 W (for example, "VS-150" (commercially available from Velvo-Clear)) is used as the ultrasonic dispersion device, a predetermined amount of ion-exchanged water is put into the water tank, and about 2 ml of the Contaminon N is put into the water tank.

For measurement, the flow type particle image analyzing apparatus in which "LUCPLFLN" (with a magnification of 20 and a numerical aperture of 0.40) is mounted as an objective lens is used, and the particle sheath "PSE-900A" (commercially available from Sysmex Corporation) is used as the sheath solution. The dispersion prepared according to the above procedure is introduced into the flow type particle image analyzing apparatus, and 2000 toner particles are measured in a total count mode in the HPF measurement mode. Then, the binarization threshold during particle analysis is set to 85%, the analytical particle diameter is limited to a circle equivalent diameter of at least 1.977 μm and less than 39.54 μm, and the average circularity of the toner particles is obtained.

In measurement, before the measurement starts, automatic focus adjustment is performed using standard latex particles (for example, obtained by diluting "RESEARCH AND TEST PARTICLES Latex Microsphere Suspensions 5100A" (commercially available from Duke Scientific) with ion-exchanged water). Then, it is preferable to perform focus adjustment every 2 hours after the measurement starts. Here, in this example of the present invention, a flow type particle image analyzing apparatus which is calibrated according to Sysmex Corporation and has received a calibration certificate issued from Sysmex Corporation is used. Measurement is performed under measurement and analysis conditions when calibration certificate is received except that the analytical particle diameter is limited to a circle equivalent diameter of at least 1.977 μm and less than 39.54 μm.

Volume-Based Median Diameter (D50) of Resin Particle

The volume-based median diameter (D50) of resin particles such as a resin particle dispersion is measured using a laser diffraction and scattering type particle diameter distribution measuring apparatus. Specifically, the diameter is measured according to JIS Z8825-1 (2001). A laser diffraction and scattering type particle size distribution measuring apparatus "LA-920" (commercially available from Horiba Ltd.) is used as the measuring apparatus. Dedicated software "HORIBA LA-920 for Windows (registered trademark) WET (LA-920) Ver. 2.02" bundled to LA-920 is used for setting measurement conditions and analysis of measurement data. In addition, ion-exchanged water in which solid impurities and the like are removed in advance is used as a measurement solvent. A measurement procedure is as follows.

(1) A batch cell holder is attached to LA-920.
(2) A predetermined amount of ion-exchanged water is put into a batch cell, and the batch cell is set in the batch cell holder.
(3) The inside of the batch cell is stirred using a dedicated stirrer tip.
(4) Press "Refractive index" button on the "display condition setting" screen, and the relative refractive index is set to a value corresponding to the resin particles.
(5) On the "Display condition setting" screen, particle diameter-based is set as volume-based.
(6) After a warm-up operation is performed for at least 1 hour, the optical axis is adjusted, the optical axis is finely adjusted, and the blank measurement is performed.
(7) 3 ml of a resin particle dispersion is put into a 100.0 ml glass flat bottom beaker. In addition, 57 ml of ion-exchanged water is added to dilute the resin particle dispersion. 0.3 ml of a diluted solution obtained by diluting "Contaminon N" (a 10 mass % aqueous solution containing a neutral detergent for washing a precision measuring instrument which is composed of a nonionic surfactant, an anionic surfactant, and an organic builder and has a pH of 7, commercially available from Wako Pure Chemical Corporation) as a dispersing agent with ion-exchanged water 3 times by mass is added thereto.
(8) An ultrasonic dispersion device "Ultrasonic Dispension System Tetora150" in which two oscillators with an oscillation frequency of 50 kHz and with phases that are shifted by 180 degrees are built and having an electrical output of 120 W (commercially available from Nikkaki Bios Co., Ltd.) is prepared. 3.3 1 of ion-exchanged water is put into a water tank of the ultrasonic dispersion device, and 2.0 nil of Contaminon N is put into the water tank.
(9) The beaker in (7) is set in the beaker fixing hole of the ultrasonic dispersion device and the ultrasonic dispersion device is operated. Then, the height position of the beaker is adjusted so that the resonant state of the liquid level of the aqueous solution in the beaker is saturated.
(10) The ultrasonic dispersion treatment is continued for 60 seconds. In addition, in the ultrasonic dispersion, adjustment is appropriately performed so that the water temperature of the water tank is from 10° C. to 40° C.
(11) Small amounts of the resin particle dispersion prepared in (10) are immediately added to the batch cell, while taking care not to allow bubbles to enter, and the transmittance of the tungsten lamp is adjusted to 90% to 95%. Then, the particle size distribution of the resin particles is measured. D50 is calculated based on the obtained volume-based particle size distribution data.

EXAMPLES

While the present invention will be described below in more detail with reference to examples and comparative examples, but these examples no not limit the present invention. Here, the number of parts in the following formulations is based on mass unless otherwise specified.

Production Example 1 of Crystalline Polyester Resin (CPES)

Sebacic acid: 175 parts
1,6-hexanediol: 170 parts
Ethylene glycol: 50 parts
Potassium titanate oxalate: 0.40 parts The above polyester monomer was put into an autoclave including a decompression device, a water separating device, a nitrogen gas introduction device, a temperature measuring device, and a stirring device, and the reaction was caused under a nitrogen atmosphere and atmospheric pressure at 200° C. for 6 hours, and the reaction was then additionally caused at a reduced pressure of 10 to 20 mmHg and 220° C. for 1.5 hours to obtain a crystalline polyester resin 1. Properties of the obtained crystalline polyester resin 1 were acid value 1.3 mg KOH/g, weight-average molecular weight (Mw)=21000, and DSC endothermic peak=79.8° C.

Production Examples 2 to 20 of Crystalline Polyester Resin (CPES)

Crystalline polyester resins 2 to 20 were obtained in the same manner as in Production Example 1 of the crystalline polyester resin except that the types and amounts of raw materials such as sebacic acid, 1,6-hexanediol, and ethylene glycol and the amount of potassium titanate oxalate were changed as shown in Table 1. The properties are shown in Table 1.

TABLE 1

| CPES | Raw material 1 | | Raw material 2 | | Raw material 3 | | Catalyst potassium titanate oxalate |
|---|---|---|---|---|---|---|---|
| No. | Type | Parts | Type | Parts | Type | Parts | (Parts) |
| 1 | sebacic acid | 175 | 1,6-hexanediol | 170 | ethylene glycol | 50 | 0.40 |
| 2 | sebacic acid | 175 | 1,6-hexanediol | 20 | ethylene glycol | 190 | 0.40 |
| 3 | sebacic acid | 175 | 1,6-hexanediol | 190 | 1,12-dodecanediol | 20 | 0.40 |
| 4 | sebacic acid | 175 | ethylene glycol | 90 | | | 0.40 |
| 5 | sebacic acid | 175 | 1,14-tetradecandiol | 300 | | | 0.40 |
| 6 | adipic acid | 175 | ethylene glycol | 130 | | | 0.40 |
| 7 | suberic add | 100 | adipic acid | 80 | ethylene glycol | 130 | 0.40 |
| 8 | suberic acid | 20 | adipic acid | 180 | 1,4-butanediol | 130 | 0.40 |
| 9 | 1,10-decanedi-carboxylic acid | 100 | 1,14-tetradecandiol | 150 | | | 0.40 |
| 10 | sebacic acid | 175 | 1,3-propanediol | 90 | | | 0.40 |
| 11 | sebacic acid | 150 | 1,6-hexanediol | 96 | | | 0.40 |
| 12 | sebacic acid | 151 | 1,12-dodecanediol | 62 | | | 0.40 |
| 13 | sebacic acid | 150 | 1.10-decanediol | 190 | | | 0.40 |
| 14 | sebacic acid | 150 | 1,9-nonanediol | 170 | | | 0.40 |
| 15 | sebacic acid | 150 | 1,9-nonanediol | 130 | ethylene glycol | 20 | 0.40 |
| 16 | sebacic acid | 175 | 1,6-hexanediol | 170 | ethylene glycol | 50 | 0.28 |
| 17 | sebacic acid | 175 | 1,6-hexanediol | 170 | ethylene glycol | 50 | 0.60 |
| 18 | sebacic acid | 175 | 1,6-hexanediol | 170 | ethylene glycol | 50 | 0.33 |
| 19 | sebacic acid | 175 | 1.6-hexanediol | 170 | ethylene glycol | 50 | 0.30 |
| 20 | sebacic acid | 175 | 1,6-hexanediol | 170 | ethylene glycol | 50 | 0.25 |

| CPES No. | Properties Acid value | Hydroxyl value | Mw | DSC endothermic peak [° C.] | SP value Spapes |
|---|---|---|---|---|---|
| 1 | 1.3 | 32.1 | 21000 | 79.8 | 10.00 |
| 2 | 1.3 | 30.3 | 21000 | 77.8 | 10.51 |
| 3 | 1.3 | 27.3 | 25000 | 75.8 | 9.80 |
| 4 | 1.3 | 31.9 | 22000 | 78.3 | 10.22 |
| 5 | 1.3 | 32.3 | 21000 | 74.3 | 9.44 |
| 6 | 1.3 | 29.8 | 23000 | 76.3 | 10.88 |
| 7 | 3.3 | 29.5 | 24000 | 78.5 | 10.69 |
| 8 | 3.5 | 29.5 | 24000 | 78.5 | 10.44 |
| 9 | 1.3 | 32.3 | 21000 | 74.6 | 9.29 |
| 10 | 1.3 | 31.8 | 22000 | 77.9 | 10.08 |
| 11 | 1.3 | 32.1 | 21000 | 79.8 | 9.79 |
| 12 | 1.3 | 32.1 | 21000 | 75.8 | 9.53 |
| 13 | 1.3 | 32.1 | 21000 | 76.1 | 9.57 |
| 14 | 1.3 | 32.1 | 21000 | 76.1 | 9.62 |
| 15 | 1.3 | 32.1 | 21000 | 76.1 | 9.73 |
| 16 | 1.3 | 39.8 | 12000 | 77.8 | 10.00 |
| 17 | 1.3 | 28.9 | 32000 | 80.1 | 10.00 |
| 18 | 4.5 | 32.5 | 16500 | 80.3 | 10.00 |
| 19 | 8.5 | 32.8 | 13200 | 80.9 | 10.00 |
| 20 | 11.3 | 33.1 | 8900 | 81.3 | 10.00 |

In the table, the units of the acid value and the hydroxyl value are mg KOH/g.

Production of Amorphous Polyester Resin (APES) 1

Terephthalic acid: 75 parts

Bisphenol A-propylene oxide 2 mol adduct: 100 parts

Tetrabutoxytitanate: 0.125 parts

The above polyester monomer was put into an autoclave including a decompression device, a water separating device, a nitrogen gas introduction device, a temperature measuring device, and a stirring device, and the reaction was caused under a nitrogen atmosphere and atmospheric pressure at 200° C. for 5 hours. Then, 2.1 parts of trimellitic acid and 0.120 parts of tetrabutoxytitanate were added, the reaction was caused at 220° C. for 3 hours, and the reaction was additionally caused at a reduced pressure of 10 to 20 mmHg for 2 hours to obtain an amorphous polyester resin 1. Properties of the obtained amorphous polyester resin 1 were acid value=8.3 mg KOH/g, hydroxyl value 33.3 mg KOH/g, weight-average molecular weight (Mw) 10000, and glass transition temperature=72.5° C.

Production Example of Amorphous Polyester Resins (APES) 2 to 8

Amorphous polyester resins 2 to 8 were obtained in the same manner as in Production Example 1 of the amorphous polyester resin except that the types and amounts of raw materials such as terephthalic acid and bisphenol A-propylene oxide 2 mol adduct were changed as shown in Table 2. The properties are shown in Table 2.

Styrene: 89.0 parts 2-hydroxyethyl methacrylate: 9.0 parts

Methacrylic acid: 6.0 parts

Ditert-butyl peroxide (product name "Perbutyl D" commercially available from NOF Corporation): 1.00 part After dropwise addition was completed, the solution was stirred for 3 hours, and then distilled off at atmospheric pressure while the liquid temperature was raised to 170° C., and after the liquid temperature reached 170° C., the solution was distilled off under a reduced pressure of 1 hPa for 1 hour, and the solvent was removed to obtain a resin solid component. The solid component was dissolved in tetrahydrofuran and reprecipitated with n-hexane, and the precipitated solid was filtered to obtain a styrene-acrylic resin 1. The properties of the obtained styrene-acrylic resin 1 were as follows. Mw=18000, acid value=25 mg KOH/g, hydroxyl value=5 mg KOH/g, Tg=92° C.

Production Example of Styrene-Acrylic Resins (StAc) 2 to 6

Styrene-acrylic resins (StAc) 2 to 6 were obtained in the same manner as in Production Example 1 of the styrene-acrylic resin (StAc) 1 except that the types and amounts of the raw materials were changed as shown in Table 3. The properties are shown in Table 3.

TABLE 2

| APES | Raw material 1 | | Raw material 2 | | Raw material 3 | | Raw material 4 | | Properties | | | | |
|---|---|---|---|---|---|---|---|---|---|---|---|---|---|
| | | | | | | | | | Acid | Hydroxyl | | DSC endothermic | SP value |
| No. | Type | Parts | Type | Parts | Type | Parts | Type | Parts | value | value | Mw | peak [° C.] | Spapes |
| 1 | terephthalic acid | 75 | bisphenol A-propylene oxide 2 mol adduct | 100 | | | | | 8.3 | 33.3 | 10000 | 72.5 | 10.04 |
| 2 | terephthalic acid | 61 | bisphenol A-propylene oxide 2 mol adduct | 100 | fumaric acid | 27 | | | 10.0 | 30.3 | 12000 | 71.3 | 10.51 |
| 2 | terephthalic acid | 31 | bisphenol A-propylene oxide 2 mol adduct | 100 | fumaric acid | 9 | | | 10.0 | 30.1 | 12000 | 71.6 | 10.04 |
| 4 | terephthalic acid | 65 | bisphenol A-propylene oxide 2 mol adduct | 100 | bisphenol A-ethylene oxide 2 mol adduct | 45 | fumaric acid | 5 | 9.8 | 29.8 | 13000 | 70.2 | 10.00 |
| 5 | terephthalic acid | 65 | bisphenol A-propylene oxide 2 mol adduct | 100 | bisphenol A-ethylene oxide 2 mol adduct | 100 | fumaric acid | 5 | 8.9 | 31.2 | 12500 | 68.9 | 9.92 |
| 6 | terephthalic acid | 30 | bisphenol A-propylene oxide 2 mol adduct | 100 | trimellitic acid | 5 | fumaric acid | 5 | 11.3 | 28.2 | 12800 | 72.5 | 9.98 |
| 7 | terephthalic acid | 30 | bisphenol A-propylene oxide 2 mol adduct | 100 | trimellitic acid | 5 | | | 11.2 | 28.1 | 12100 | 72.3 | 9.86 |
| 8 | terephthalic acid | 40 | bisphenol A-propylene oxide 2 mol adduct | 100 | trimellitic acid | 5 | fumaric acid | 10 | 12.3 | 27.6 | 12600 | 72.1 | 10.15 |

In the table, the units of the acid value and the hydroxyl value are ng KOH/g.

Production Example of Styrene-Acrylic Resin (StAc) 1

100 parts of propylene glycol monomethyl ether was heated while performing nitrogen substitution and refluxed at a liquid temperature of at least 120° C., and a mixture of the following materials was added dropwise thereto over 3 hours.

TABLE 3

| | Monomer composition | | | | | | |
|---|---|---|---|---|---|---|---|
| StAc | Ac | MMA | St | 2-HEMA | Mac | BA | SP value |
| 1 | 0.0 | 0.0 | 89.0 | 9.0 | 6.0 | 0.0 | 10.15 |
| 2 | 0.0 | 2.0 | 95.0 | 1.0 | 3.3 | 0.0 | 9.90 |
| 3 | 30.0 | 20.0 | 80.0 | 1.5 | 0.0 | 0.0 | 10.50 |
| 4 | 30.0 | 0.0 | 70.0 | 0.0 | 30.0 | 0.0 | 10.90 |

TABLE 3-continued

| | Monomer composition | | | | | | | |
|---|---|---|---|---|---|---|---|---|
| | StAc | Ac | MMA | St | 2-HEMA | Mac | BA | SP value |
| 5 | 30.0 | 0.0 | 55.0 | 0.0 | 30.0 | 0.0 | 11.09 |
| 6 | 0.0 | 0.0 | 80.0 | 0.0 | 0.0 | 20.0 | 9.81 |

In the table, the numerical value of the composition indicates the number of parts. Abbreviations are as follows.

Ac: acrylic acid

MMA: methyl methacrylate

St: styrene

2-HEMA: 2-hydroxyethyl methacrylate

Mac: methacrylic acid

BA: butyl acrylate

Production Example of Organosilicon Polymer Particles 1

First Step 360.0 parts of water was put into a reaction vessel including a thermometer and a stirrer, and 15.0 parts of hydrochloric acid having a concentration of 5.0 mass % was added to prepare a uniform solution. 136.0 parts of methyltrimethoxysilane was added while the solution was stirred at a temperature of 25° C., and the mixture was stirred for 5 hours and then filtered to obtain a transparent reaction solution containing a silanol compound or its partial condensate.

Second Step 540.0 parts of water was put into a reaction vessel including a thermometer, a stirrer, and a dropping device, and 17.0 parts of aqueous ammonia having a concentration of 10.0 mass % was added to prepare a uniform solution. While the solution was stirred at a temperature of 35° C., 100 parts of the reaction solution obtained in the first step was added dropwise over 0.50 hours, and the mixture was stirred for 6 hours to obtain an organosilicon polymer particle dispersion.

Third Step 5.0 parts of hexamethyl disilazane (HMDS) as a hydrophobic agent was added to the obtained organosilicon polymer particle dispersion, and when the mixture was stirred at 25° C.; for 48 hours, a powder suspension in which hydrophobized spherical polymethylsilsesquioxane fine powder particles were suspended on the upper layer of the liquid was obtained. After being left for 5 minutes, the suspended powder was collected by suction filtration, and dried under a reduced pressure at 100° C. for 24 hours to obtain a dry powder of white hydrophobized spherical polymethylsilsesquioxane fine particles (organosilicon polymer particles 1). The properties of the obtained organosilicon polymer particles 1 are shown in Tables 4-1 to 4-3.

Production Example of Organosilicon Polymer Particles 20

First Step 360.0 parts of water was put into a reaction vessel including a thermometer and a stirrer, and 17.0 parts of hydrochloric acid having a concentration of 5.0 mass % was added to prepare a uniform solution. 136.0 parts of methyltrimethoxysilane was added while the solution was stirred at a temperature of 25° C., and the mixture was stirred for 5 hours and then filtered to obtain a transparent reaction solution containing a silanol compound or its partial condensate.

Second Step 700.0 parts of water and 1500 parts of methanol were put into a reaction vessel including a thermometer, a stirrer, and a dropping device, and 19.0 parts of aqueous ammonia having a concentration of 10.0 mass % was added to prepare a uniform solution. While the solution was stirred at a temperature of 30° C., 100 parts of the reaction solution obtained in the first step was added dropwise over 0.33 hours, and the mixture was stirred for 6 hours to obtain an organosilicon polymer particle dispersion. The obtained suspension was put into a centrifugal separator, fine particles were precipitated and removed, and drying was performed in a dryer at a temperature of 200° C. for 24 hours to obtain organosilicon polymer particles 20. The properties of the obtained organosilicon polymer particles 20 are shown in Tables 4-1 to 4-3.

Production Example of Organosilicon Polymer Particles 2 to 19, and 21 to 37

Organosilicon polymer particles 2 to 19, and 21 to 37 were obtained in the same manner as in the production example of the organosilicon polymer particles 1 except that the silane compound, the reaction start temperature, the amount of catalyst added, and the duration of dropwise addition were changed as shown in Table 3. The properties are shown in Tables 4-1 to 4-3.

Production Example of Organosilicon Polymer Particles 38

672 parts of water and 6 parts of dinonyl benzenesulfonic acid as an acid catalyst were put into a reaction vessel, 90 parts of methyltrimethoxysilane was added dropwise over 10 minutes while performing stirring, and the hydrolysis reaction and the condensation reaction were performed at the same time. During dropwise addition, the reaction solution was appropriately cooled in order to control the temperature rise in the reaction system due to heat generation to 20° C. to 25° C. After dropwise addition of methyltrimethoxysilane was completed, stirring was additionally continued while controlling the temperature of the reaction solution to 20° C. to 25° C., and 24 hours after dropwise addition of methyltrimethoxysilane started, 14.7 parts of a 5% sodium hydroxide aqueous solution was added, the catalyst was neutralized, the hydrolysis reaction and the condensation reaction were completed, and an aqueous suspension was obtained. The aqueous suspension was dried with a spray dryer to obtain organosilicon polymer particles 38. The number average particle diameter was 89 nm, the SF-1 was 113, the hydrophobicity was 35 vol %, the silanol ratio was 43.8%, and the amount of adsorbed water was 33 mg/g.

Production Example of Organosilicon Polymer Particles 39 Tospearl 103 (commercially available from Toshiba Silicones Co., Ltd.) was used as organosilicon polymer particles 39. The number average particle diameter was 300 nm, the T3 unit structure ratio=1.00, the SF-1 was 114, the hydrophobicity was 75 vol %, the silanol ratio was 0.0%, and the amount of adsorbed water was 0.8 mg/g.

TABLE 4-1

| Organosilicon polymer particle No. | First step | | | | | | | | | | |
|---|---|---|---|---|---|---|---|---|---|---|---|
| | Water | HA | RT | Silane compound A | | Silane compound B | | Siane compound C | | Silane compound D | |
| | Parts | Parts | ° C. | Name | Parts | Name | Parts | Name | Parts | Name | Parts |
| 1 | 360 | 15 | 25 | methyltrimethoxysilane | 136 | — | — | — | — | — | — |
| 2 | 360 | 17 | 25 | methyltrimethoxysilane | 136 | — | — | — | — | — | — |
| 3 | 360 | 11.9 | 25 | methyltrimethoxysilane | 136 | — | — | — | — | — | — |
| 4 | 360 | 12.2 | 25 | methyltrimethoxysilane | 136 | — | — | — | — | — | — |
| 5 | 360 | 12.6 | 25 | methyltrimethoxysilane | 136 | — | — | — | — | — | — |
| 6 | 360 | 13 | 25 | methyltrimethoxysilane | 136 | — | — | — | — | — | — |
| 7 | 360 | 13.4 | 25 | methyltrimethoxysilane | 136 | — | — | — | — | — | — |
| 8 | 360 | 14.2 | 25 | methyltrimethoxysilane | 136 | — | — | — | — | — | — |
| 9 | 360 | 18.5 | 25 | methyltrimethoxysilane | 136 | — | — | — | — | — | — |
| 10 | 360 | 20 | 25 | methyltrimethoxysilane | 136 | — | — | — | — | — | — |
| 11 | 360 | 21.5 | 25 | methyltrimethoxysilane | 136 | — | — | — | — | — | — |
| 12 | 360 | 23 | 25 | methyltrimethoxysilane | 136 | — | — | — | — | — | — |
| 13 | 360 | 24.5 | 25 | methyltrimethoxysilane | 136 | — | — | — | — | — | — |
| 14 | 360 | 26 | 25 | methyltrimethoxysilane | 136 | — | — | — | — | — | — |
| 15 | 360 | 17 | 25 | methyltrimethoxysilane | 136 | — | — | — | — | — | — |
| 16 | 360 | 17 | 25 | methyltrimethoxysilane | 136 | — | — | — | — | — | — |
| 17 | 360 | 17 | 25 | methyltrimethoxysilane | 136 | — | — | — | — | — | — |
| 18 | 360 | 17 | 25 | methyltrimethoxysilane | 136 | — | — | — | — | — | — |
| 19 | 360 | 17 | 25 | methyltrimethoxysilane | 136 | — | — | — | — | — | — |
| 20 | 360 | 17 | 25 | methyltrimethoxysilane | 136 | — | — | — | — | — | — |
| 21 | 360 | 17 | 25 | methyltrimethoxysilane | 136 | — | — | — | — | — | — |
| 22 | 360 | 17 | 25 | methyltrimethoxysilane | 136 | — | — | — | — | — | — |
| 23 | 360 | 17 | 25 | ethystrimethoxysilane | 136 | — | — | — | — | — | — |
| 24 | 360 | 17 | 25 | n-propyltrimethoxysilane | 136 | — | — | — | — | — | — |
| 25 | 360 | 17 | 25 | methyltrimethoxysilane | 136 | — | — | — | — | — | — |
| 26 | 360 | 17 | 25 | methyltrimethoxysilane | 136 | — | — | — | — | — | — |
| 27 | 360 | 17 | 25 | methyltrimethoxysilane | 136 | — | — | — | — | — | — |
| 28 | 360 | 17 | 25 | methyltrimethoxysilane | 136 | — | — | — | — | — | — |
| 29 | 360 | 17 | 25 | methyltrimethoxysilane | 136 | trimethylmethoxysilane | 2.0 | DMDMS | 1 | — | — |
| 30 | 360 | 17 | 25 | methyltrimethoxysilane | 136 | TMOS | 17.0 | | | | |
| 31 | 360 | 17 | 25 | methyltrimethoxysilane | 136 | trimethylmethoxysilane | 5.0 | DMDMS | 20 | — | — |
| 32 | 360 | 17 | 25 | methyltrimethoxysilane | 120 | trimethylmethoxysilane | 20.8 | DMDMS | 18 | — | — |
| 33 | 360 | 17 | 25 | methyltrimethoxysilane | 136 | trimethylmethoxysilane | 5.0 | DMDMS | 50 | — | — |
| 34 | 360 | 17 | 25 | methyltrimethoxysilane | 136 | trimethylmethoxysilane | 8.2 | DMDMS | 94 | TMOS | 15 |
| 35 | 360 | 17 | 25 | methyltrimethoxysilane | 136 | trimethylmethoxysilane | 4.4 | DMDMS | 117 | TMOS | 16 |
| 36 | 360 | 17 | 25 | methyltrimethoxysilane | 136 | trimethylmethoxysilane | 1.0 | DMDMS | 1 | TMOS | 50 |
| 37 | 360 | 17 | 25 | methyltrimethoxysilane | 136 | trimethylmethoxysilane | 1.0 | DMDMS | 1 | TMOS | 50 |

In the Table, "HA" indicates "hydrochloric acid", "RT" indicates "reaction temperature", "TMOS" indicates "tetramethoxysilane" and "DMDMS" indicates "dimethyl-dimethoxysiliane".

TABLE 4-2

| Organosilicon polymer particle No. | Second step | | | | | Third step | | |
|---|---|---|---|---|---|---|---|---|
| | Reaction solution obtained in first step Parts | Water Parts | Aqueous ammonia Parts | Reaction start temperature ° C. | Duration of dropwise addition h | HMDS Parts | Reaction temperature ° C. | Reaction time h |
| 1 | 100 | 540 | 17.0 | 35 | 0.50 | 5.0 | 25 | 48 |
| 2 | 100 | 540 | 19.0 | 30 | 0.33 | 5.0 | 25 | 48 |
| 3 | 100 | 540 | 13.9 | 43 | 1.30 | 93.8 | 25 | 48 |
| 4 | 100 | 540 | 14.2 | 42 | 1.20 | 75.0 | 25 | 48 |
| 5 | 100 | 540 | 14.6 | 41 | 1.10 | 25.0 | 25 | 48 |
| 6 | 100 | 540 | 15.0 | 40 | 1.00 | 5.0 | 25 | 48 |
| 7 | 100 | 540 | 15.4 | 39 | 0.90 | 5.0 | 25 | 48 |
| 8 | 100 | 540 | 16.2 | 37 | 0.70 | 5.0 | 25 | 48 |
| 9 | 100 | 540 | 20.0 | 30 | 0.29 | 5.0 | 25 | 48 |
| 10 | 100 | 540 | 21.0 | 30 | 0.25 | 5.0 | 25 | 48 |
| 11 | 100 | 540 | 22.0 | 30 | 0.21 | 5.0 | 25 | 48 |
| 12 | 100 | 540 | 23.0 | 30 | 0.17 | 5.0 | 25 | 48 |
| 13 | 100 | 540 | 24.0 | 30 | 0.13 | 1.6 | 25 | 48 |
| 14 | 100 | 540 | 25.0 | 30 | 0.09 | 1.3 | 25 | 48 |
| 15 | 100 | 540 | 19.0 | 30 | 0.33 | 20.0 | 25 | 48 |
| 16 | 100 | 540 | 19.0 | 30 | 0.33 | 18.0 | 25 | 48 |

TABLE 4-2-continued

| Organosilicon polymer particle No. | Second step: Reaction solution obtained in first step Parts | Second step: Water Parts | Second step: Aqueous ammonia Parts | Second step: Reaction start temperature ° C. | Second step: Duration of dropwise addition h | Third step: HMDS Parts | Third step: Reaction temperature ° C. | Third step: Reaction time h |
|---|---|---|---|---|---|---|---|---|
| 17 | 100 | 540 | 19.0 | 30 | 0.33 | 15.0 | 25 | 48 |
| 18 | 100 | 540 | 19.0 | 30 | 0.33 | 12.0 | 25 | 48 |
| 19 | 100 | 540 | 19.0 | 30 | 0.33 | 10.0 | 25 | 48 |
| 20 | 100 | 700 | 19.0 | 30 | 0.33 | 7.0 | 25 | 48 |
| 21 | 100 | 620 | 19.0 | 30 | 0.33 | 6.0 | 25 | 48 |
| 22 | 100 | 500 | 19.0 | 30 | 0.33 | 5.0 | 25 | 48 |
| 23 | 100 | 540 | 19.0 | 30 | 0.33 | 5.0 | 25 | 48 |
| 24 | 100 | 540 | 19.0 | 30 | 0.33 | 5.0 | 25 | 48 |
| 25 | 100 | 540 | 19.0 | 30 | 0.33 | 2.0 | 25 | 48 |
| 26 | 100 | 540 | 19.0 | 30 | 0.33 | 1.0 | 25 | 48 |
| 27 | 100 | 540 | 19.0 | 30 | 0.33 | — | — | — |
| 28 | 100 | 540 | 19.0 | 30 | 0.33 | 5.0 | 25 | 48 |
| 29 | 100 | 540 | 19.0 | 30 | 0.33 | 5.0 | 25 | 48 |
| 30 | 100 | 540 | 19.0 | 30 | 0.33 | 3.0 | 25 | 48 |
| 31 | 100 | 540 | 19.0 | 30 | 0.33 | 5.0 | 25 | 48 |
| 32 | 100 | 540 | 19.0 | 30 | 0.33 | 5.0 | 25 | 48 |
| 33 | 100 | 540 | 19.0 | 30 | 0.33 | 5.0 | 25 | 48 |
| 34 | 100 | 540 | 19.0 | 30 | 0.33 | 5.0 | 25 | 48 |
| 35 | 100 | 540 | 19.0 | 30 | 0.33 | 5.0 | 25 | 48 |
| 36 | 100 | 540 | 19.0 | 30 | 0.33 | 5.0 | 25 | 48 |
| 37 | 100 | 540 | 19.0 | 30 | 0.33 | 3.0 | 25 | 48 |

TABLE 4-3

| Organosilicon polymer particle No. | Number-average particle diameter nm | SF-1 | Hydro-phobicity | T3 unit structure ratio | SP value | Silanol ratio | Amount of adsorbed water mg/g |
|---|---|---|---|---|---|---|---|
| 1 | 100 | 110 | 55 | 1.00 | 8.94 | 16.7 | 10 |
| 2 | 150 | 110 | 55 | 1.00 | 8.94 | 22.3 | 10 |
| 3 | 8 | 110 | 55 | 1.00 | 8.94 | 25.1 | 13 |
| 4 | 10 | 110 | 55 | 1.00 | 8.94 | 24.9 | 13 |
| 5 | 30 | 110 | 55 | 1.00 | 8.94 | 24.1 | 12 |
| 6 | 50 | 110 | 55 | 1.00 | 8.94 | 23.5 | 10 |
| 7 | 60 | 110 | 55 | 1.00 | 8.94 | 23.3 | 10 |
| 8 | 80 | 110 | 55 | 1.00 | 8.94 | 23.1 | 10 |
| 9 | 200 | 110 | 55 | 1.00 | 8.94 | 22.3 | 10 |
| 10 | 250 | 110 | 55 | 1.00 | 8.94 | 22.3 | 10 |
| 11 | 300 | 110 | 55 | 1.00 | 8.94 | 22.3 | 10 |
| 12 | 350 | 110 | 55 | 1.00 | 8.94 | 22.3 | 10 |
| 13 | 480 | 110 | 55 | 1.00 | 8.94 | 21.5 | 5 |
| 14 | 600 | 110 | 55 | 1.00 | 8.94 | 20.8 | 5 |
| 15 | 150 | 110 | 75 | 1.00 | 8.94 | 0.8 | 1 |
| 16 | 150 | 110 | 70 | 1.00 | 8.94 | 1.5 | 3 |
| 17 | 150 | 110 | 68 | 1.00 | 8.94 | 2.1 | 5 |
| 18 | 150 | 110 | 67 | 1.00 | 8.94 | 4.8 | 6 |
| 19 | 150 | 110 | 65 | 1.00 | 8.94 | 7.5 | 7 |
| 20 | 150 | 125 | 55 | 1.00 | 8.94 | 17.3 | 9 |
| 21 | 150 | 118 | 55 | 1.00 | 8.94 | 20.3 | 10 |
| 22 | 150 | 105 | 55 | 1.00 | 8.94 | 22.3 | 10 |
| 23 | 150 | 110 | 55 | 1.00 | 8.83 | 26.1 | 11 |
| 24 | 150 | 110 | 55 | 1.00 | 8.77 | 18.9 | 11 |
| 25 | 150 | 110 | 50 | 1.00 | 8.94 | 35.1 | 13 |
| 26 | 150 | 110 | 46 | 1.00 | 8.94 | 38.5 | 14 |
| 27 | 150 | 110 | 43 | 1.00 | 8.94 | 41.3 | 15 |
| 28 | 150 | 110 | 55 | 1.00 | 10.31 | 35.8 | 13 |
| 29 | 150 | 110 | 55 | 0.97 | 8.83 | 21.3 | 10 |
| 30 | 150 | 110 | 46 | 0.90 | 9.02 | 23.3 | 10 |
| 31 | 150 | 110 | 55 | 0.82 | 8.46 | 7.8 | 8 |
| 32 | 150 | 110 | 55 | 0.72 | 8.06 | 13.5 | 6 |
| 33 | 150 | 110 | 55 | 0.68 | 8.21 | 9.8 | 6 |
| 34 | 150 | 110 | 55 | 0.51 | 8.29 | 16.2 | 12 |
| 35 | 150 | 110 | 55 | 0.47 | 8.25 | 14.8 | 12 |
| 36 | 150 | 110 | 55 | 0.74 | 9.62 | 29.1 | 12 |
| 37 | 150 | 110 | 46 | 0.74 | 9.62 | 38.3 | 18 |

In the table, the unit of the hydrophobicity is vol %. The silanol ratio (mol %) indicates "proportion of oxygen atoms derived from silanol groups among oxygen atoms in the organosilicon polymer particle".

Production Example of Hydrophobic Silica 1

100 parts of Silica (AEROSIL 200CF, commercially available from Nippon Aerosil Co., Ltd.) was treated with 10 parts of hexamethyl disilazane, and additionally treated with 20 parts of dimethyl silicone oil to obtain hydrophobic silica 1. The number average diameter of primary particles of the hydrophobic silica 1 was 12 nm, and the hydrophobicity was 97 vol %.

Example 1

Production Example of Toner 1

Amorphous polyester resin (APES) 8 80.0 parts

Crystalline polyester resin (CPES) 1 20.0 parts

Carbon black "Nipex35 (commercially available from Orion Engineered Carbons)" 7.00 parts Fischer-Tropsch wax (product name "C80": DSC endothermic peak 83.0° C., commercially available from Schumann Sasol) 5.00 parts The above materials were mixed with a Henschel mixer, and then melted and kneaded at 125° C. by a twin-screw kneading extruder, the kneaded product was gradually cooled to normal temperature, and then coarsely pulverized with a cutter mill, and pulverized with a fine pulverizing machine using a jet stream, and classified by wind power to prepare toner particles 1.

External Addition Method

Mixing Process Apparatus 1

The mixing process apparatus 1 shown in FIG. 1 was used. An apparatus having a diameter of 130 mm of the inner peripheral part of the main body casing 31 and a volume of $2.0\times10^{-3}$ $m^3$ of the processing space 39 was used, the rated power of the drive member 38 was set to 5.5 kW, and the shape of the stirring member 33 was shown in FIG. 2. Then, the overlapping width d of the stirring member 33*a* and the stirring member 33*b* in FIG. 2 was set to 0.25 D with respect to the maximum width D of the stirring member 33, and the clearance between the stirring member 33 and the inner periphery of the main body casing 31 was set to 3.0 mm. A cold medium was caused to pass through the jacket to adjust the temperature.

Mixing Process Apparatus 2

FM mixer (FM10C; commercially available from Nippon Coke & Engineering. Co., Ltd.) was used.

External Addition Step 100 parts of the obtained toner particles 1, 7.0 parts of the organosilicon polymer fine particles 1, and 0.43 parts of the hydrophobic silica 1 were mixed using a mixing process apparatus 2 at a rotational speed of 3600 rpm for 3 minutes. Mixing started after the temperature was stable at 30° C., and the temperature was adjusted so that 30° C.±1° C. was maintained during mixing.

Heating Step

Subsequently, hot water was caused to pass through the jacket so that the temperature of the mixing process apparatus 1 having the above configuration was 55° C. Mixing started after the temperature was stable at 55° C., and the temperature was adjusted so that 55° C.±1° C. was maintained during mixing. After the external addition toner was put into the mixing process apparatus 1, a heat treatment was performed for 10 minutes while adjusting the peripheral velocity of the outermost end of the stirring member 33 so that the power of the drive member 38 was constant at $1.5\times10^{-2}$ W/g (rotational speed of the drive member 38: 150 rpm). After the heat treatment was completed, sieving was performed with a mesh having an opening of 75 μm to obtain a toner 1. Production conditions for the toner 1 are shown in Tables 5-1 and 5-2 and Table 6, and properties of the toner 1 are shown in Tables 7-1 and 7-2. The evaluation results of the obtained toner 1 are shown in Tables 8-1 and 8-2.

Production Example of Toners 2 to 108, and 114 to 118

Toners 2 to 108, and 114 to 118 were obtained in the same manner as in Toner Production Example 1 except that the types and amounts of raw materials and production conditions were changed as shown in Tables 5-1 and 5-2 and Table 6. The properties are shown in Tables 7-1 and 7-2. The evaluation results are shown in Tables 8-1 and 8-2.

Production Example of Toners 112 and 113

Toners 112 and 113 were obtained in the same manner as in Toner Production Example 1 except that wind power classification conditions were appropriately adjusted. The properties are shown in Tables 7-1 and 7-2. The evaluation results are shown in Tables 8-1 and 8-2.

Production Example of Toner 109

Dispersion Medium (Aqueous Medium 1)

19.2 parts of sodium phosphate and 6.2 parts of 10% hydrochloric acid were added to 1000 parts of ion-exchanged water in the reaction vessel, and the mixture was kept warm at 65° C. for 60 minutes while purging with $N_2$. While performing stirring at 12,000 rpm using a T.K. homomixer (commercially available from Tokushu Kika Kogyo Co., Ltd.), a calcium chloride aqueous solution prepared by dissolving 10.7 parts of calcium chloride in 13.8 parts of ion-exchanged water was added at once to prepare an aqueous medium 1 containing a dispersion stabilizer.

Polymerizable Monomer Composition

Styrene 60 parts

Carbon black (commercially available from Orion Engineered Carbons, product name "Printex35") 7 parts Charge control agent (Bontron E-89, commercially available from Orient Corporation) 0.25 parts The above materials were put into an attritor dispersing machine (commercially available from Mitsui Miike Machinery Co., Ltd.), and additionally dispersed using zirconia particles with a diameter of 1.7 mm at 220 rpm for 5 hours to obtain a polymerizable monomer composition.

Styrene 20 parts n-Butyl acrylate 20 parts crystalline polyester resin 1 25 parts amorphous polyester resin 8 4 parts Fischer-Tropsch wax (product name "C80": DSC endothermic peak 83.0° C., commercially available from Schumann Sasol) 9.00 parts were added to the above polymerizable monomer composition, The above materials were kept warm at 65° C. in a separate container, and uniformly dissolved and dispersed at 500 rpm using a T.K. homomixer (commercially available from Tokushu Kika Kogyo Co., Ltd.). 10.0 parts of a polymerization initiator t-hexyl peroxypivalate (product name "Perhexyl PV", molecular weight: 202, 10-hour half-life temperature: 53.2° C., commercially available from NOF Corporation) was dissolved therein to prepare a polymerizable monomer composition. The polymerizable monomer composition was added to the aqueous medium 1 in a granulation tank, and stirred at 65° C. under purging with $N_2$ at 10000 rpm for 5 minutes using a T.K. homomixer, and granulated at a pH of 5.2. Then, the mixture was transferred to the polymerization tank, and while stirring with a paddle stirring blade at 30 times/minute, heating was performed at 70° C. for 6 hours (conversion rate was 90%), and additionally performed at 95° C., and the reaction was caused for 2 hours.

After the polymerization reaction was completed, the cooling step was performed. Water at 5° C. was mixed with a toner particle precursor dispersion at 95° C., and the mixture was cooled to 30° C. at a cooling rate of 4.000° C./sec. Then, the temperature was raised to 55° C. at a ramp rate of 1.00° C./min, the temperature was maintained at 55° C. for 180 minutes, water at 5° C. was then mixed and the mixture was cooled to 30° C. at a cooling rate of 5° C./sec. Hydrochloric acid was added to the obtained toner particle dispersion to adjust the pH to not more than 1.5, the mixture was stirred and left for 1 hour and then solid-liquid separated with a pressure filter to obtain a toner cake. This was reslurried with ion-exchanged water to form a dispersion again and then solid-liquid separated with the above filter. The reslurry and solid-liquid separation were repeated until the electrical conductivity of the filtrate became not more than 5.0 μS/cm, and solid-liquid separation was then finally performed to obtain a toner cake.

The obtained toner cake was dried by an airflow dryer Flash Jet Dryer (commercially available from Seishin Enterprise Co., Ltd.). In drying conditions, the blowing temperature was 90° C., the dryer outlet temperature was 40° C., and the feed rate of the toner cake was adjusted to a rate at which the outlet temperature did not deviate from 40° C. according to the water content in the toner cake. In addition, the fine and coarse powder was cut using a multi-grade classifier using the Coanda effect to obtain toner particles 109. In the same manner as in Toner Production Example 1, a toner 109 containing an external additive was obtained from the obtained toner particles. The properties of the obtained toner 109 are shown in Tables 7-1 and 7-2. The evaluation results of the obtained toner 109 are shown in Tables 8-1 and 8-2.

Preparation of Resin Particle Dispersion 1

3,000 parts of the amorphous polyester resin 1, 10,000 parts of ion-exchanged water, and 150 parts of the surfactant sodium dodecylbenzene sulfonate were put into an emulsification tank of a high temperature and high pressure emulsification apparatus (Cavitron CD1010, slit: 0.4 mm). Then, the mixture was heated and melted at 130° C. and dispersed at 110° C., a flow rate of 3 L/m, and 10,000 rpm for 30 minutes, and caused to pass through a cooling tank, and the amorphous polyester resin dispersion (high temperature and high pressure emulsification apparatus (Cavitron CD1010, slit 0.4 mm, commercially available from Cavitron)) was collected. The obtained dispersion was cooled to normal temperature, and ion-exchanged water was added to obtain a resin particle dispersion 1 that is a dispersion of the amorphous polyester resin 1 having a solid content concentration of 12.5 mass % and a volume-based median diameter of 0.15 μm.

Preparation of Resin Particle Dispersion 2

3,000 parts of the crystalline polyester resin 1, 10,000 parts of ion-exchanged water, and 150 parts of the surfactant sodium dodecylbenzene sulfonate were put into an emulsification tank of a high temperature and high pressure emulsification apparatus (Cavitron CD1010, slit: 0.4 mm). Then, the mixture was heated and melted at 130° C. and dispersed at 110° C., a flow rate of 3 L/m, and 10,000 rpm for 30 minutes, and caused to pass through a cooling tank, and the crystalline polyester resin dispersion (high temperature and high pressure emulsification apparatus (Cavitron CD1010, slit 0.4 mm, commercially available from Cavitron)) was collected. The obtained dispersion was cooled to normal temperature, and ion-exchanged water was added to obtain a resin particle dispersion 2 that is a dispersion of the crystalline polyester resin 1 having a solid content concentration of 12.5 mams % and a volume-based median diameter of 0.15 μm.

Preparation of Colorant Dispersion 1

100 parts of carbon black "Nipex35 (commercially available from Orion Engineered Carbons)" as a colorant, and 15 parts of Neogen RK were mixed with 885 parts of ion-exchanged water, and dispersed using a wet jet mill JN100 for about 1 hour to obtain a colorant dispersion 1.

Preparation of Wax Dispersion 1

100 parts of Fischer-Tropsch wax (commercially available from Schumann Sasol, product name "C80": DSC endothermic peak 83.0° C.) and 15 parts of Neogen RK were mixed with 385 parts of ion-exchanged water and dispersed using a wet jet mill JN100 (commercially available from JOKOH) for about 1 hour to obtain a wax dispersion 1. The concentration of the wax dispersion was 20 mass %. The volume-based median diameter of the wax fine particles was measured using a dynamic light scattering particle size distribution diameter (Nanotrac: commercially available from Nikkiso Co., Ltd.) and was 0.20 μm.

Production Example of Toner 110

195 parts of the resin particle dispersion 1, 265 parts of the resin particle dispersion 2, 20 parts of the wax dispersion 1, and 20 parts of the colorant dispersion 1 were dispersed using a homogenizer (commercially available from IKA: Ultra Turrax T50). The temperature in the container was adjusted to 30° C. with stirring, and a 1 mol/L sodium hydroxide aqueous solution was added to adjust the pH to 8.0. An aqueous solution prepared by dissolving 0.250 parts of magnesium sulfate as a flocculant in 10 parts of ion-exchanged water was added at 30° C. over 10 minutes with stirring. After being left for 3 minutes, heating was started, the temperature was raised to 50° C., and associated particles were produced. After maintaining at 50° C. for 30 minutes, 70.0 parts of the resin particle dispersion 1 was additionally added. In that state, the particle diameter of the associated particles was measured using "Coulter counter Multisizer 3" (registered trademark, commercially available from Beckman Coulter Inc.). When the weight-average particle diameter reached 4.5 μm, 3.0 parts of sodium chloride and 8.0 parts of Neogen RK were added and particle growth was slopped.

Then, the temperature was raised to 95° C., and the associated particles were fused and made spherical. When the average circularity reached 0.980, the cooling step was performed. Water at 5° C. was mixed with a toner particle precursor dispersion at 95° C., and the mixture was cooled to 30° C. at a cooling rate of 4.000° C./sec. Then, the temperature was raised to 55° C. at a ramp rate of 1.00° C./min, the temperature was maintained at 55° C. for 180 minutes, water at 5° C. was then mixed and the mixture was cooled to 30° C. at a cooling rate of 5° C./sec. Hydrochloric acid was added to the obtained toner particle dispersion to adjust the pH to not more than 1.5, the mixture was stirred and left for 1 hour and then solid-liquid separated with a pressure filter to obtain a toner coke. This was reslurried with ion-exchanged water to form a dispersion again and then solid-liquid separated with the above filter. The reslurry and solid-liquid separation were repeated until the electrical conductivity of the filtrate became not more than 5.0 μS/cm, and solid-liquid separation was then finally performed to obtain a toner cake.

The obtained toner cake was dried by an airflow dryer Flash Jet Dryer (commercially available from Seishin Enterprise Co., Ltd.). In drying conditions, the blowing temperature was 90° C., the dryer outlet temperature was 40° C., and the feed rate of the toner cake was adjusted to a rate at which the outlet temperature did not deviate from 40° C. according to the water content in the toner cake. In addition, the fine and coarse powder was cut using a multi-grade classifier using the Coanda effect to obtain toner particles 110. In the same manner as in Toner Production Example 1, a toner 110 containing an external additive was obtained from the obtained toner particles. The properties of the obtained toner 110 are shown in Tables 7-1 and 7-2. The evaluation results of the obtained toner 110 are shown in Tables 8-1 and 8-2.

Production Example of Toner 111

Synthesis of Toner Binder Solution 800 parts of the amorphous polyester resin 8, 200 parts of the crystalline polyester resin 1, and 2000 parts of an ethyl acetate solvent were dissolved and mixed to obtain an ethyl acetate solution of a toner binder (1).

Preparation of Toner 240 parts of the ethyl acetate solution of the toner binder (1), 6.0 parts of carbon black (commercially available from Orion Engineered Carbons, product name "Printex 35"), 1.0 part of a 3,5-di-tert-butyl salicylic acid aluminum compound [Bontron E88 (commercially available from Orient Chemical Industries Co., Ltd.)], and 13 parts of Fischer-Tropsch wax (commercially available from Schumann Sasol, product name "C80": DSC endothermic peak 83.0° C.) were put into a beaker, the mixture was stirred at 55° C. using a TK type homomixer at 12,000 rpm and uniformly dissolved and dispersed to obtain a toner material solution. 1036.3 parts of the aqueous medium 1 and 0.27 parts of sodium dodecylbenzene sulfonate were put into a beaker and uniformly dissolved.

Then, while stirring at 60° C. using a TK type homomixer at 12,000 rpm, the toner material solution was added and stirred for 3 hours. Then, the mixed solution was transferred to a flask having a stirring rod and a thermometer, the temperature was raised to 98° C., and the solvent was removed. After the solvent was completely removed, the cooling step was performed. Water at 5° C. was mixed with a toner particle precursor dispersion at 95° C., and the mixture was cooled to 30° C. at a cooling rate of 4.000° C./sec. Then, the temperature was raised to 55° C. at a ramp rate of 1.00° C./min, the temperature was maintained at 55° C. for 180 minutes, water at 5° C. was then mixed and the mixture was cooled to 30° C. at a cooling rate of 5° C./sec. Hydrochloric acid was added to the obtained toner particle dispersion to adjust the pH to not more than 1.5, the mixture was stirred and left for 1 hour and then solid-liquid separated with a pressure filter to obtain a toner cake. This was reslurried with ion-exchanged water to form a dispersion again and then solid-liquid separated with the above filter. The reslurry and solid-liquid separation were repeated until the electrical conductivity of the filtrate became not more than 5.0 μS/cm, and solid-liquid separation was then finally performed to obtain a toner cake.

The obtained toner cake was dried by an airflow dryer Flash Jet Dryer (commercially available from Seishin Enterprise Co., Ltd.). In drying conditions, the blowing temperature was 90° C., the dryer outlet temperature was 40° C., and the feed rate of the toner cake was adjusted to a rate at which the outlet temperature did not deviate from 40° C. according to the water content in the toner cake. In addition, the fine and coarse powder was cut using a multi-grade classifier using the Coanda effect to obtain toner particles 111. In the same manner as in Toner Production Example 1, a toner 111 containing an external additive was obtained from the obtained toner particles. The properties of the obtained toner 111 are shown in Tables 7-1 and 7-2. The evaluation results are shown in Tables 8-1 and 8-2.

TABLE 5-1

| | Pigment | amorphous resin | | | Crystaline resin | | | Organosilicon polymer particle | | | | | | | | | |
|---|---|---|---|---|---|---|---|---|---|---|---|---|---|---|---|---|---|
| Toner No. | Type (—) | No. (—) | Parts | SPapes | No. (—) | Parts | SPapes | No. (—) | Parts | Spsi | H [%] | AAW mg/g | SR mol % | T3 ratio | CR [%] | PD nm | Parts of HS1 |
| 1 | CB | APES8 | 80.0 | 10.15 | CPES1 | 20.0 | 10.00 | 1 | 7.0 | 8.94 | 55 | 10 | 16.7 | 1.00 | 45 | 100 | 0.43 |
| 2 | CB | APES8 | 80.0 | 10.15 | CPES16 | 20.0 | 10.00 | 1 | 7.0 | 8.94 | 55 | 10 | 16.7 | 1.00 | 45 | 100 | 0.43 |
| 3 | CB | APES8 | 80.0 | 10.15 | CPES17 | 20.0 | 10.00 | 1 | 7.0 | 8.94 | 55 | 10 | 16.7 | 1.00 | 45 | 100 | 0.43 |
| 4 | CB | APES8 | 80.0 | 10.15 | CPES18 | 20.0 | 10.00 | 1 | 7.0 | 8.94 | 55 | 10 | 16.7 | 1.00 | 45 | 100 | 0.43 |
| 5 | CB | APES8 | 80.0 | 10.15 | CPES19 | 20.0 | 10.00 | 1 | 7.0 | 8.94 | 55 | 10 | 16.7 | 1.00 | 15 | 100 | 0.43 |
| 6 | CB | APES8 | 80.0 | 10.15 | CPES20 | 20.0 | 10.00 | 1 | 7.0 | 8.94 | 55 | 10 | 16.7 | 1.00 | 45 | 100 | 0.43 |
| 7 | CB | StAc1 | 80.0 | 10.15 | CPES1 | 20.0 | 10.00 | 1 | 7.0 | 8.94 | 55 | 10 | 16.7 | 1.00 | 46 | 100 | 0.43 |
| 8 | CB | APES8 | 80.0 | 10.15 | CPES13 | 20.0 | 9.57 | 36 | 7.0 | 9.62 | 55 | 12 | 29.1 | 0.74 | 30 | 150 | 0.43 |
| 9 | CB | APES8 | 80.0 | 10.15 | CPES15 | 20.0 | 9.73 | 36 | 7.0 | 9.62 | 55 | 12 | 29.1 | 0.74 | 30 | 150 | 0.43 |
| 10 | CB | APES8 | 80.0 | 10.15 | CPES2 | 20.0 | 10.51 | 1 | 7.0 | 8.94 | 55 | 10 | 16.7 | 1.00 | 45 | 100 | 0.43 |
| 11 | CB | APES8 | 80.0 | 10.15 | CPES4 | 20.0 | 10.22 | 1 | 7.0 | 8.94 | 55 | 10 | 16.7 | 1.00 | 45 | 100 | 0.43 |
| 12 | CB | APES8 | 80.0 | 10.15 | CPES6 | 20.0 | 10.88 | 1 | 7.0 | 8.94 | 55 | 10 | 16.7 | 1.00 | 45 | 100 | 0.43 |
| 13 | CB | APES8 | 80.0 | 10.15 | CPES7 | 20.0 | 10.69 | 1 | 7.0 | 8.94 | 55 | 10 | 16.7 | 1.00 | 45 | 100 | 0.43 |
| 14 | CB | APES8 | 80.0 | 10.15 | CPES15 | 20.0 | 9.73 | 1 | 7.0 | 8.94 | 55 | 10 | 16.7 | 1.00 | 45 | 100 | 0.43 |
| 15 | CB | APES8 | 80.0 | 10.15 | CPES1 | 20.0 | 10.00 | 23 | 7.0 | 8.83 | 55 | 11 | 26.1 | 1.00 | 30 | 150 | 0.43 |
| 16 | CB | APES8 | 80.0 | 10.15 | CPES2 | 20.0 | 10.51 | 23 | 7.0 | 8.83 | 55 | 11 | 26.1 | 1.00 | 30 | 150 | 0.38 |
| 17 | CB | APES8 | 80.0 | 10.15 | CPES4 | 20.0 | 10.22 | 23 | 7.0 | 8.83 | 55 | 11 | 26.1 | 1.00 | 30 | 150 | 0.38 |
| 18 | CB | APES8 | 80.0 | 10.15 | CPEST | 20.0 | 10.69 | 23 | 7.0 | 8.83 | 55 | 11 | 26.1 | 1.00 | 30 | 150 | 0.38 |
| 19 | CB | APES8 | 80.0 | 10.15 | CPES15 | 20.0 | 9.73 | 23 | 7.0 | 8.83 | 55 | 11 | 26.1 | 1.00 | 30 | 150 | 0.43 |
| 20 | CB | APES8 | 80.0 | 10.15 | CPES1 | 20.0 | 10.00 | 24 | 7.0 | 8.77 | 55 | 10 | 18.9 | 1.00 | 30 | 150 | 0.43 |
| 21 | CB | APES8 | 80.0 | 10.15 | CPES2 | 20.0 | 10.51 | 24 | 7.0 | 8.77 | 55 | 11 | 18.9 | 1.00 | 30 | 150 | 0.43 |
| 22 | CB | APES8 | 80.0 | 10.15 | CPES4 | 20.0 | 10.22 | 24 | 7.0 | 8.77 | 55 | 11 | 18.9 | 1.00 | 30 | 150 | 0.43 |
| 23 | CB | APES8 | 80.0 | 10.15 | CPES7 | 20.0 | 10.69 | 24 | 7.0 | 8.77 | 55 | 11 | 18.9 | 1.00 | 30 | 150 | 0.43 |
| 24 | CB | APES8 | 80.0 | 10.15 | CPES15 | 20.0 | 9.73 | 24 | 7.0 | 8.77 | 55 | 11 | 18.9 | 1.00 | 30 | 150 | 0.43 |
| 25 | CB | APESS | 80.0 | 10.15 | CPES1 | 20.0 | 10.00 | 28 | 7.0 | 10.31 | 55 | 13 | 35.8 | 1.00 | 30 | 150 | 0.43 |
| 26 | CB | APES8 | 80.0 | 10.15 | CPES1 | 20.0 | 10.00 | 29 | 7.0 | 8.83 | 55 | 10 | 21.3 | 0.97 | 30 | 150 | 0.43 |
| 27 | CB | APES8 | 80.0 | 10.15 | CPES1 | 20.0 | 10.00 | 32 | 7.0 | 8.06 | 55 | 6 | 13.5 | 0.72 | 30 | 150 | 0.43 |
| 28 | CB | APES8 | 80.0 | 10.15 | CPES1 | 20.0 | 10.00 | 33 | 7.0 | 8.21 | 55 | 6 | 9.8 | 0.68 | 30 | 150 | 0.43 |
| 29 | CB | APES8 | 80.0 | 10.15 | CPES1 | 20.0 | 10.00 | 31 | 7.0 | 8.46 | 55 | 8 | 7.8 | 0.82 | 30 | 150 | 0.43 |
| 30 | CB | APES8 | 80.0 | 10.15 | CPES1 | 20.0 | 10.00 | 36 | 7.0 | 9.62 | 55 | 12 | 29.1 | 0.74 | 30 | 150 | 0.43 |
| 31 | CB | APES8 | 80.0 | 10.15 | CPES1 | 20.0 | 10.00 | 37 | 7.0 | 9.62 | 46 | 18 | 38.3 | 0.74 | 30 | 150 | 0.43 |

TABLE 5-1-continued

| | Pigment | amorphous resin | | | Crystaline resin | | | Organosilicon polymer particle | | | | | | | | | |
|---|---|---|---|---|---|---|---|---|---|---|---|---|---|---|---|---|---|
| Toner No. | Type (—) | No. (—) | Parts | SPapes | No. (—) | Parts | SPapes | No. (—) | Parts | Spsi | H [%] | AAW mg/g | SR mol % | T3 ratio | CR [%] | PD nm | Parts of HS1 |
| 32 | CB | APES8 | 80.0 | 10.15 | CPES1 | 20.0 | 10.00 | 30 | 7.0 | 9.02 | 46 | 10 | 23.3 | 0.90 | 30 | 150 | 0.43 |
| 33 | CB | APES8 | 80.0 | 10.15 | CPES1 | 20.0 | 10.00 | 34 | 7.0 | 8.29 | 55 | 12 | 16.2 | 0.51 | 30 | 150 | 0.43 |
| 34 | CB | APES8 | 80.0 | 10.15 | CPES1 | 20.0 | 10.00 | 35 | 7.0 | 8.25 | 55 | 12 | 14.8 | 0.47 | 30 | 150 | 0.43 |
| 35 | CB | APES8 | 80.0 | 10.15 | CPES3 | 20.0 | 9.80 | 1 | 7.0 | 8.94 | 55 | 10 | 16.7 | 1.00 | 45 | 100 | 0.43 |
| 36 | CB | APES8 | 80.0 | 10.15 | CPES5 | 20.0 | 9.44 | 1 | 7.0 | 8.94 | 55 | 10 | 16.7 | 1.00 | 45 | 100 | 0.43 |
| 37 | CB | APES8 | 80.0 | 10.15 | CPES8 | 20.0 | 10.44 | 1 | 7.0 | 8.94 | 55 | 10 | 16.7 | 1.00 | 45 | 100 | 0.43 |
| 38 | CB | APES8 | 80.0 | 10.15 | CPES9 | 20.0 | 9.29 | 1 | 7.0 | 8.94 | 55 | 10 | 16.7 | 1.00 | 45 | 100 | 0.43 |
| 39 | CB | APES8 | 80.0 | 10.15 | CPES10 | 20.0 | 10.08 | 1 | 7.0 | 8.94 | 55 | 10 | 16.7 | 1.00 | 45 | 100 | 0.43 |
| 40 | CB | APES8 | 80.0 | 10.15 | CPES11 | 20.0 | 9.79 | 1 | 7.0 | 8.94 | 55 | 10 | 16.7 | 1.00 | 45 | 100 | 0.43 |
| 41 | CB | APES8 | 80.0 | 10.15 | CPES12 | 20.0 | 9.53 | 1 | 7.0 | 8.94 | 55 | 10 | 16.7 | 1.00 | 45 | 100 | 0.43 |
| 42 | CB | APES8 | 80.0 | 10.15 | CPES13 | 20.0 | 9.57 | 1 | 7.0 | 8.94 | 55 | 10 | 16.7 | 1.00 | 45 | 100 | 0.43 |
| 43 | CB | APES8 | 80.0 | 10.15 | CPES14 | 20.0 | 9.62 | 1 | 7.0 | 8.94 | 55 | 10 | 16.7 | 1.00 | 45 | 100 | 0.43 |
| 44 | CB | APES8 | 80.0 | 10.15 | CPES1 | 20.0 | 10.00 | 2 | 7.0 | 8.94 | 55 | 10 | 22.3 | 1.00 | 30 | 150 | 0.43 |
| 45 | CB | APES8 | 80.0 | 10.15 | CPES1 | 20.0 | 10.00 | 3 | 0.6 | 8.94 | 55 | 13 | 25.1 | 1.00 | 48 | 9 | 0.43 |
| 46 | CB | APES8 | 80.0 | 10.15 | CPES1 | 20.0 | 10.00 | 4 | 0.7 | 8.94 | 55 | 13 | 24.9 | 1.00 | 45 | 10 | 0.43 |
| 47 | CB | APES8 | 80.0 | 10.15 | CPES1 | 20.0 | 10.00 | 5 | 2.1 | 8.94 | 55 | 12 | 24.1 | 1.00 | 45 | 30 | 0.43 |
| 48 | CB | APES8 | 80.0 | 10.15 | CPES1 | 20.0 | 10.00 | 6 | 3.5 | 8.94 | 55 | 10 | 23.5 | 1.00 | 45 | 50 | 0.43 |
| 49 | CB | APES8 | 80.0 | 10.15 | CPES1 | 20.0 | 10.00 | 7 | 3.5 | 8.94 | 55 | 10 | 23.3 | 1.00 | 38 | 60 | 0.43 |
| 50 | CB | APES8 | 80.0 | 10.15 | CPES1 | 20.0 | 10.00 | 8 | 5.0 | 8.94 | 55 | 10 | 23.1 | 1.00 | 40 | 80 | 0.43 |
| 51 | CB | APES8 | 80.0 | 10.15 | CPES1 | 20.0 | 10.00 | 9 | 14.0 | 8.94 | 55 | 10 | 22.3 | 1.00 | 46 | 200 | 0.43 |
| 52 | CB | APES8 | 80.0 | 10.15 | CPES1 | 20.0 | 10.00 | 10 | 14.0 | 8.94 | 55 | 10 | 22.3 | 1.00 | 36 | 250 | 0.43 |
| 53 | CB | APES8 | 80.0 | 10.15 | CPES1 | 20.0 | 10.00 | 11 | 14.0 | 8.94 | 55 | 10 | 22.3 | 1.00 | 30 | 300 | 0.43 |
| 54 | CB | APES8 | 80.0 | 10.15 | CPES1 | 20.0 | 10.00 | 12 | 21.0 | 8.94 | 55 | 10 | 22.3 | 1.00 | 39 | 350 | 0.43 |
| 55 | CB | APES8 | 80.0 | 10.15 | CPES1 | 20.0 | 10.00 | 13 | 28.0 | 8.94 | 55 | 5 | 21.5 | 1.00 | 36 | 480 | 0.43 |
| 56 | CB | APES8 | 80.0 | 10.15 | CPES1 | 20.0 | 10.00 | 14 | 28.0 | 8.94 | 55 | 5 | 20.8 | 1.00 | 32 | 600 | 0.43 |
| 57 | CB | APES8 | 80.0 | 10.15 | CPES1 | 20.0 | 10.00 | 22 | 7.0 | 8.94 | 55 | 10 | 22.3 | 1.00 | 30 | 150 | 0.43 |
| 58 | CB | APES8 | 80.0 | 10.15 | CPES1 | 20.0 | 10.00 | 21 | 7.0 | 8.94 | 55 | 10 | 20.3 | 1.00 | 30 | 150 | 0.43 |
| 59 | CB | APES8 | 80.0 | 10.15 | CPES1 | 20.0 | 10.00 | 20 | 7.0 | 8.94 | 55 | 9 | 17.3 | 1.00 | 30 | 150 | 0.43 |

TABLE 5-2

| | Pigment | amorphous resin | | | Crystalline resin | | | Organosilicon polymer particle | | | | | | | | | |
|---|---|---|---|---|---|---|---|---|---|---|---|---|---|---|---|---|---|
| Toner No. | Type (—) | No. (—) | Parts | SPapes | No. (—) | Parts | SPapes | No. (—) | Parts | Spsi | H [%] | AAW mg/g | SR mol % | T3 ratio | CR [%] | PD nm | Parts of HS1 |
| 60 | CB | APES8 | 80.0 | 10.15 | CPES1 | 20.0 | 10.00 | 19 | 7.0 | 8.94 | 65 | 7 | 7.5 | 1.00 | 30 | 150 | 0.43 |
| 61 | CB | APES8 | 80.0 | 10.15 | CPES1 | 20.0 | 10.00 | 17 | 7.0 | 8.94 | 68 | 5 | 2.1 | 1.00 | 30 | 150 | 0.43 |
| 62 | CB | APES8 | 80.0 | 10.15 | CPES1 | 20.0 | 10.00 | 16 | 7.0 | 8.94 | 70 | 3 | 1.5 | 1.00 | 30 | 150 | 0.43 |
| 63 | CB | APES8 | 80.0 | 10.15 | CPES1 | 20.0 | 10.00 | 15 | 7.0 | 8.94 | 75 | 1 | 0.8 | 1.00 | 30 | 150 | 0.43 |
| 64 | CB | APES8 | 80.0 | 10.15 | CPES1 | 20.0 | 10.00 | 18 | 7.0 | 8.94 | 67 | 6 | 4.8 | 1.00 | 30 | 150 | 0.43 |
| 65 | CB | APES8 | 80.0 | 10.15 | CPES1 | 20.0 | 10.00 | 25 | 7.0 | 8.94 | 50 | 13 | 35.1 | 1.00 | 30 | 150 | 0.26 |
| 66 | CB | APES8 | 80.0 | 10.15 | CPES1 | 20.0 | 10.00 | 26 | 7.0 | 8.94 | 46 | 14 | 38.5 | 1.00 | 30 | 150 | 0.55 |
| 67 | CB | APES8 | 80.0 | 10.15 | CPES1 | 20.0 | 10.00 | 27 | 7.0 | 8.94 | 43 | 15 | 41.3 | 1.00 | 30 | 150 | 0.43 |
| 68 | CB | APES1 | 80.0 | 10.04 | CPES1 | 20.0 | 10.00 | 1 | 7.0 | 8.94 | 55 | 10 | 16.7 | 1.00 | 45 | 100 | 0.55 |
| 69 | CB | APES2 | 80.0 | 10.51 | CPES1 | 20.0 | 10.00 | 1 | 7.0 | 8.94 | 55 | 10 | 16.7 | 1.00 | 45 | 100 | 0.43 |
| 70 | CB | APES3 | 80.0 | 10.04 | CPES1 | 20.0 | 10.00 | 1 | 7.0 | 8.94 | 55 | 10 | 16.7 | 1.00 | 45 | 100 | 0.43 |
| 71 | CB | APES4 | 80.0 | 10.00 | CPES1 | 20.0 | 10.00 | 1 | 7.0 | 8.94 | 55 | 10 | 16.7 | 1.00 | 45 | 100 | 0.43 |
| 72 | CB | APES5 | 80.0 | 9.92 | CPES1 | 20.0 | 10.00 | 1 | 7.0 | 8.94 | 55 | 10 | 16.7 | 1.00 | 45 | 100 | 0.43 |
| 73 | CB | APES6 | 80.0 | 9.98 | CPES1 | 20.0 | 10.00 | 1 | 7.0 | 8.94 | 55 | 10 | 16.7 | 1.00 | 45 | 100 | 0.43 |
| 74 | CB | APES7 | 80.0 | 9.86 | CPES1 | 20.0 | 10.00 | 1 | 7.0 | 8.94 | 55 | 10 | 16.7 | 1.00 | 45 | 100 | 0.43 |
| 75 | CB | StAc2 | 80.0 | 9.90 | CPES1 | 20.0 | 10.00 | 1 | 7.0 | 8.94 | 55 | 10 | 16.7 | 1.00 | 45 | 100 | 0.43 |
| 76 | CB | StAc3 | 80.0 | 10.50 | CPES! | 20.0 | 10.00 | 1 | 7.0 | 8.94 | 55 | 10 | 16.7 | 1.00 | 45 | 100 | 0.43 |
| 77 | CB | StAc4 | 80.0 | 10.90 | CPES1 | 20.0 | 10.00 | 1 | 7.0 | 8.94 | 55 | 10 | 16.7 | 1.00 | 45 | 100 | 0.43 |
| 78 | CB | StAc5 | 80.0 | 11.09 | CPES1 | 20.0 | 10.00 | 1 | 7.0 | 8.94 | 55 | 10 | 16.7 | 1.00 | 45 | 100 | 0.43 |
| 79 | CB | StAc6 | 80.0 | 9.81 | CPES1 | 20.0 | 10.00 | 1 | 7.0 | 8.94 | 55 | 10 | 16.7 | 1.00 | 46 | 100 | 0.55 |
| 80 | CB | APES8 | 98.0 | 10.15 | CPES1 | 2.0 | 10.00 | 1 | 7.0 | 8.94 | 55 | 10 | 16.7 | 1.00 | 45 | 100 | 0.35 |
| 81 | CB | APES8 | 95.5 | 10.15 | CPES1 | 4.5 | 10.00 | 1 | 7.0 | 8.94 | 55 | 10 | 16.7 | 1.00 | 45 | 100 | 0.55 |
| 82 | CB | APES8 | 90.0 | 10.15 | CPES1 | 10.0 | 10.00 | 1 | 7.0 | 8.94 | 55 | 10 | 16.7 | 1.00 | $5 | 100 | 0.23 |
| 83 | CB | APES8 | 70.0 | 10.15 | CPES1 | 30.0 | 10.00 | 1 | 7.0 | 8.94 | 55 | 10 | 16.7 | 1.00 | 45 | 100 | 0.43 |
| 84 | CB | APES8 | 50,0 | 10.15 | CPES1 | 50.0 | 10.00 | 1 | 7.0 | 8.94 | 55 | 10 | 16.7 | 1.00 | 45 | 100 | 0.43 |
| 85 | CB | APES8 | 45.0 | 10.15 | CPES1 | 55.0 | 10.00 | 1 | 7.0 | 8.94 | 55 | 10 | 16.7 | 1.00 | 45 | 100 | 0.43 |
| 86 | CB | APES8 | 80.0 | 10.15 | CPES1 | 20.0 | 10.00 | 1 | 0.1 | 8.94 | 55 | 10 | 16.7 | 1.00 | 1 | 100 | 0.43 |
| 87 | CB | APES8 | 80.0 | 10.15 | CPES1 | 20.0 | 10.00 | 1 | 0.3 | 8.94 | 65 | 10 | 16.7 | 1.00 | 2 | 100 | 0.43 |
| 88 | CB | APES8 | 80.0 | 10.15 | CPES1 | 20.0 | 10.00 | 1 | 1.0 | 8.94 | 55 | 10 | 16.7 | 1.00 | 6 | 100 | 0.43 |
| 89 | CB | APES8 | 80.0 | 10.15 | CPES1 | 20.0 | 10.00 | 1 | 3.0 | 8.94 | 55 | 10 | 16.7 | 1.00 | 19 | 100 | 0.43 |
| 90 | CB | APES8 | 80.0 | 10.15 | CPES1 | 20.0 | 10.00 | 1 | 4.0 | 8.94 | 55 | 10 | 16.7 | 1.00 | 26 | 100 | 0.43 |
| 91 | CB | APES8 | 80.0 | 10.15 | CPES1 | 20.0 | 10.00 | 1 | 5.0 | 8.94 | 55 | 10 | 16.7 | 1.00 | 32 | 100 | 0.43 |
| 92 | CB | APES8 | 80.0 | 10.15 | CPES1 | 20.0 | 10.00 | 1 | 10.0 | 8.94 | 55 | 10 | 16.7 | 1.00 | 64 | 100 | 0.43 |
| 93 | CB | APES8 | 80.0 | 10.15 | CPES1 | 20.0 | 10.00 | 1 | 11.0 | 8.94 | 55 | 10 | 16.7 | 1.00 | 71 | 100 | 0.43 |
| 94 | CB | APES8 | 80.0 | 10.15 | CPES1 | 20.0 | 10.00 | 1 | 7.0 | 8.94 | 55 | 10 | 16,7 | 1.00 | 25 | 100 | 0.43 |
| 95 | CB | APES8 | 80.0 | 10.15 | CPES1 | 20.0 | 10.00 | 1 | 7.0 | 8.94 | 55 | 10 | 16.7 | 1.00 | 25 | 100 | 0.43 |

TABLE 5-2-continued

| | Pigment | amorphous resin | | | Crystalline resin | | | Organosilicon polymer particle | | | | | | | | | |
|---|---|---|---|---|---|---|---|---|---|---|---|---|---|---|---|---|---|
| Toner No. | Type (—) | No. (—) | Parts | SPapes | No. (—) | Parts | SPapes | No. (—) | Parts | Spsi | H [%] | AAW mg/g | SR mol % | T3 ratio | CR [%] | PD nm | Parts of HS1 |
| 96 | CB | APES8 | 80.0 | 10.15 | CPES1 | 20.0 | 10.00 | 1 | 7.0 | 8.94 | 55 | 10 | 16.7 | 1.00 | 26 | 100 | 0.43 |
| 97 | CB | APES8 | 80.0 | 10.15 | CPES1 | 20.0 | 10.00 | 1 | 7.0 | 8.94 | 55 | 10 | 16.7 | 1.00 | 25 | 100 | 0.43 |
| 98 | CB | APES8 | 80.0 | 10.15 | CPES1 | 20.0 | 10.00 | 1 | 7.0 | 8.94 | 55 | 10 | 16.7 | 1.00 | 25 | 100 | 0.43 |
| 99 | CB | APES8 | 80.0 | 10.15 | CPES1 | 20.0 | 10.00 | 1 | 7.0 | 8.94 | 55 | 10 | 16.7 | 1.00 | 25 | 100 | 0.43 |
| 100 | CB | APES8 | 80.0 | 10.15 | CPES1 | 20.0 | 10.00 | 1 | 7.0 | 8.94 | 55 | 10 | 16.7 | 1.00 | 25 | 100 | 0.43 |
| 101 | CB | APES8 | 80.0 | 10.15 | CPES1 | 20.0 | 10.00 | 1 | 7.0 | 8.94 | 55 | 10 | 16.7 | 1.00 | 25 | 100 | 0.43 |
| 102 | CB | APES8 | 80.0 | 10.13 | CPES1 | 20.0 | 10.00 | 1 | 7.0 | 8.94 | 55 | 10 | 16.7 | 1.00 | 26 | 100 | 0.43 |
| 103 | CB | APES8 | 80.0 | 10.15 | CPES1 | 20.0 | 10.00 | 1 | 7.0 | 8.94 | 55 | 10 | 16.7 | 1.00 | 26 | 100 | 0.43 |
| 104 | CB | APES8 | 80.0 | 10,15 | CPES1 | 20.0 | 10.00 | 1 | 7.0 | 8.94 | 55 | 10 | 16.7 | 1.00 | 25 | 100 | 0.43 |
| 105 | PR122 | APES8 | 80.0 | 10.15 | CPES1 | 20.0 | 10.00 | 1 | 7.0 | 8.94 | 55 | 10 | 16.7 | 1.00 | 25 | 100 | 0.43 |
| 106 | PB1513 | APES8 | 80.0 | 10.15 | CPES1 | 20.0 | 10.00 | 1 | 7.0 | 8.94 | 55 | 10 | 16.7 | 1.00 | 25 | 100 | 0.43 |
| 107 | PY155 | APES8 | 80.0 | 10.15 | CPES1 | 20.0 | 10.00 | 1 | 7.0 | 8.94 | 55 | 10 | 16.7 | 1.00 | 25 | 100 | 0.43 |
| 108 | PY74 | APES8 | 80.0 | 10.15 | CPES1 | 20.0 | 10.00 | 1 | 7.0 | 8.94 | 55 | 10 | 16.7 | 1.00 | 25 | 100 | 0.43 |
| 109 | | | Described in this text | | | | | 1 | 7.0 | 8.94 | 55 | 10 | 16.7 | 1.00 | 45 | 100 | 0.43 |
| 110 | | | | | | | | 1 | 7.0 | 8.94 | 55 | 10 | 16.7 | 1.00 | 45 | 100 | 0.43 |
| 111 | | | | | | | | 1 | 7.0 | 8.94 | 55 | 10 | 16.7 | 1.00 | 45 | 100 | 0.43 |
| 112 | CB | APES8 | 80.0 | 10.15 | CPES1 | 20.0 | 10.00 | 1 | 7.0 | 8.94 | 55 | 10 | 16.7 | 1.00 | 45 | 100 | 0.43 |
| 113 | CB | APES8 | 80.0 | 10.15 | CPES1 | 20.0 | 10.00 | 1 | 7.0 | 8.94 | 55 | 10 | 16.7 | 1.00 | 46 | 100 | 0.43 |
| 114 | CB | APES8 | 80.0 | 10.15 | CPES1 | 20.0 | 10.00 | 39 | 14.0 | 8.94 | 75 | 0.8 | 0 | 1.00 | 30 | 300 | 0.43 |
| 115 | CB | APES8 | 80.0 | 10.15 | CPES1 | 20.0 | 10.00 | — | — | — | — | — | — | — | — | — | 0.43 |
| 116 | CB | APES8 | 80.0 | 10.15 | — | — | — | 1 | 7.0 | 8.94 | 55 | 10 | 16.7 | 1.00 | 25 | 100 | 0.43 |
| 117 | CB | APES8 | 80.0 | 10.15 | CPES6 | 20.0 | 10.88 | 29 | 7.0 | 8.83 | 55 | 10 | 21.3 | 0.97 | 30 | 150 | 0.43 |
| 118 | CB | APES8 | 80.0 | 10.15 | CPES1 | 20.0 | 10.00 | 38 | 7.0 | 8.94 | 35 | 33 | 43.8 | 1.00 | 25 | 100 | 0.43 |

In the table, "H" indicates "Hydrophobicity" and the unit of the hydrophobicity is vol %. "AAW" indicates "Amount of adsorbed water". The unit of the SP value is $(cal/cm^3)^{1/2}$. "SR" indicates "silanol ratio" and the silanol ratio (mol %) indicates "proportion of oxygen atoms derived from silanol groups among oxygen atoms in the organosilicon polymer particle". The "T3 ratio" indicates "the ratio of the area of a peak originating with silicon having the T3 unit structure to the total area of peaks originating with all silicon elements contained in the organosilicon polymer particles". The "CR" indicates coverage ratio of the surface of the toner particles. The "PD" indicates the number-average particle diameter of the primary particles. The "Parts of HS1" indicates "Parts of Hydrophobic silica 1".

TABLE 6

| | External addition step | | | Heating step | | | | External addition step | | | Heating step | | |
|---|---|---|---|---|---|---|---|---|---|---|---|---|---|
| Toner No. | Mixing process apparatus No. | Condition | Tem. ° C. | Mixing process apparatus No. | Condition | Tem. ° C. | Toner No. | Mixing process apparatus No. | Condition | Tem. ° C. | Mixing process apparatus No. | Condition | Tem. ° C. |
| 1 | 2 | 3600 rpm × 3 min. | 30° C. | 1 | 150 rpm × 10 min. | 55° C. | 60 | 2 | 3600 rpm × 3 min. | 30° C. | 1 | 150 rpm × 10 min. | 55° C. |
| 2 | 2 | 3600 rpm × 3 min. | 30° C. | 1 | 150 rpm × 10 min. | 55° C. | 61 | 2 | 3600 rpm × 3 min. | 30° C. | 1 | 150 rpm × 10 min. | 55° C. |
| 3 | 2 | 3600 rpm × 3 min. | 30° C. | 1 | 150 rpm × 10 min. | 55° C. | 62 | 2 | 3600 rpm × 3 min. | 30° C. | 1 | 150 rpm × 10 min. | 55° C. |
| 4 | 2 | 3600 rpm × 3 min. | 30° C. | 1 | 150 rpm × 10 min. | 55° C. | 63 | 2 | 3600 rpm × 3 min. | 30° C. | 1 | 150 rpm × 10 min. | 55° C. |
| 5 | 2 | 3600 rpm × 3 min. | 30° C. | 1 | 150 rpm × 10 min. | 55° C. | 64 | 2 | 3600 rpm × 3 min. | 30° C. | 1 | 150 rpm × 10 min. | 55° C. |
| 8 | 2 | 3600 rpm × 3 min. | 30° C. | 1 | 150 rpm × 10 min. | 55° C. | 65 | 2 | 3600 rpm × 3 min. | 30° C. | 1 | 150 rpm × 10 min. | 55° C. |
| 7 | 2 | 3600 rpm × 3 min. | 30° C. | 1 | 150 rpm × 10 min. | 55° C. | 66 | 2 | 3600 rpm × 3 min. | 30° C. | 1 | 150 rpm × 10 min. | 55° C. |
| 8 | 2 | 3600 rpm × 3 min. | 30° C. | 1 | 150 rpm × 10 min. | 55° C. | 67 | 2 | 3600 rpm × 3 min. | 30° C. | 1 | 150 rpm × 10 min. | 55° C. |
| 9 | 2 | 3600 rpm × 3 min. | 30° C. | 1 | 150 rpm × 10 min. | 55° C. | 68 | 2 | 3600 rpm × 3 min. | 30° C. | 1 | 150 rpm × 10 min. | 55° C. |
| 10 | 2 | 3600 rpm × 3 min. | 30° C. | 1 | 150 rpm × 10 min. | 55° C. | 69 | 2 | 3600 rpm × 3 min. | 30° C. | 1 | 150 rpm × 10 min. | 55° C. |
| 11 | 2 | 3600 rpm × 3 min. | 30° C. | 1 | 150 rpm × 10 min. | 55° C. | 70 | 2 | 3600 rpm × 3 min. | 30° C. | 1 | 150 rpm × 10 min. | 55° C. |
| 12 | 2 | 3600 rpm × 3 min. | 30° C. | 1 | 150 rpm × 10 min. | 55° C. | 71 | 2 | 3600 rpm × 3 min. | 30° C. | 1 | 150 rpm × 10 min. | 55° C. |
| 13 | 2 | 3600 rpm × 3 min. | 30° C. | 1 | 150 rpm × 10 min. | 55° C. | 72 | 2 | 3600 rpm × 3 min. | 30° C. | 1 | 150 rpm × 10 min. | 55° C. |
| 14 | 2 | 3600 rpm × 3 min. | 30° C. | 1 | 150 rpm × 10 min. | 55° C. | 73 | 2 | 3600 rpm × 3 min. | 30° C. | 1 | 150 rpm × 10 min. | 55° C. |
| 15 | 2 | 3600 rpm × 3 min. | 30° C. | 1 | 150 rpm × 10 min. | 55° C. | 74 | 2 | 3600 rpm × 3 min. | 30° C. | 1 | 150 rpm × 10 min. | 55° C. |
| 16 | 2 | 3600 rpm × 3 min. | 30° C. | 1 | 150 rpm × 10 min. | 55° C. | 75 | 2 | 3600 rpm × 3 min. | 30° C. | 1 | 150 rpm × 10 min. | 55° C. |
| 17 | 2 | 3600 rpm × 3 min. | 30° C. | 1 | 150 rpm × 10 min. | 55° C. | 76 | 2 | 3600 rpm × 3 min. | 30° C. | 1 | 150 rpm × 10 min. | 55° C. |
| 18 | 2 | 3600 rpm × 3 min. | 30° C. | 1 | 150 rpm × 10 min. | 55° C. | 77 | 2 | 3600 rpm × 3 min. | 30° C. | 1 | 150 rpm × 10 min. | 55° C. |
| 19 | 2 | 3600 rpm × 3 min. | 30° C. | 1 | 150 rpm × 10 min. | 55° C. | 78 | 2 | 3600 rpm × 3 min. | 30° C. | 1 | 150 rpm × 10 min. | 55° C. |
| 20 | 2 | 3600 rpm × 3 min. | 30° C. | 1 | 150 rpm × 10 min. | 55° C. | 79 | 2 | 3600 rpm × 3 min. | 30° C. | 1 | 150 rpm × 10 min. | 55° C. |
| 21 | 2 | 3600 rpm × 3 min. | 30° C. | 1 | 150 rpm × 10 min. | 55° C. | 80 | 2 | 3600 rpm × 3 min. | 30° C. | 1 | 150 rpm × 10 min. | 55° C. |
| 22 | 2 | 3600 rpm × 3 min. | 30° C. | 1 | 150 rpm × 10 min. | 55° C. | 81 | 2 | 3600 rpm × 3 min. | 30° C. | 1 | 150 rpm × 10 min. | 55° C. |
| 23 | 2 | 3600 rpm × 3 min. | 30° C. | 1 | 150 rpm × 10 min. | 55° C. | 82 | 2 | 3600 rpm × 3 min. | 30° C. | 1 | 150 rpm × 10 min. | 55° C. |
| 24 | 2 | 3600 rpm × 3 min. | 30° C. | 1 | 150 rpm × 10 min. | 55° C. | 83 | 2 | 3600 rpm × 3 min. | 30° C. | 1 | 150 rpm × 10 min. | 55° C. |
| 25 | 2 | 3600 rpm × 3 min. | 30° C. | 1 | 150 rpm × 10 min. | 55° C. | 84 | 2 | 3600 rpm × 3 min. | 30° C. | 1 | 150 rpm × 10 min. | 55° C. |
| 26 | 2 | 3600 rpm × 3 min. | 30° C. | 1 | 150 rpm × 10 min. | 55° C. | 85 | 2 | 3600 rpm × 3 min. | 30° C. | 1 | 150 rpm × 10 min. | 55° C. |
| 27 | 2 | 3600 rpm × 3 min. | 30° C. | 1 | 150 rpm × 10 min. | 55° C. | 86 | 2 | 3600 rpm × 3 min. | 30° C. | 1 | 150 rpm × 10 min. | 55° C. |
| 28 | 2 | 3600 rpm × 3 min. | 30° C. | 1 | 150 rpm × 10 min. | 55° C. | 87 | 2 | 3600 rpm × 3 min. | 30° C. | 1 | 150 rpm × 10 min. | 55° C. |
| 29 | 2 | 3600 rpm × 3 min. | 30° C. | 1 | 150 rpm × 10 min. | 55° C. | 88 | 2 | 3600 rpm × 3 min. | 30° C. | 1 | 150 rpm × 10 min. | 55° C. |
| 30 | 2 | 3600 rpm × 3 min. | 30° C. | 1 | 150 rpm × 10 min. | 55° C. | 89 | 2 | 3600 rpm × 3 min. | 30° C. | 1 | 150 rpm × 10 min. | 55° C. |
| 31 | 2 | 3600 rpm × 3 min. | 30° C. | 1 | 150 rpm × 10 min. | 55° C. | 90 | 2 | 3600 rpm × 3 min. | 30° C. | 1 | 150 rpm × 10 min. | 55° C. |
| 32 | 2 | 3600 rpm × 3 min. | 30° C. | 1 | 150 rpm × 10 min. | 55° C. | 91 | 2 | 3600 rpm × 3 min. | 30° C. | 1 | 150 rpm × 10 min. | 55° C. |
| 33 | 2 | 3600 rpm × 3 min. | 30° C. | 1 | 150 rpm × 10 min. | 55° C. | 92 | 2 | 3600 rpm × 3 min. | 30° C. | 1 | 150 rpm × 10 min. | 55° C. |
| 34 | 2 | 3600 rpm × 3 min. | 30° C. | 1 | 150 rpm × 10 min. | 55° C. | 93 | 2 | 3600 rpm × 3 min. | 30° C. | 1 | 150 rpm × 10 min. | 55° C. |
| 35 | 2 | 3600 rpm × 3 min. | 30° C. | 1 | 150 rpm × 10 min. | 55° C. | 94 | 2 | 3600 rpm × 5 min. | 30° C. | 1 | 150 rpm × 10 min. | 55° C. |
| 36 | 2 | 3600 rpm × 3 min. | 30° C. | 1 | 150 rpm × 10 min. | 55° C. | 95 | 2 | 3600 rpm × 4 min. | 30° C. | 1 | 150 rpm × 10 min. | 55° C. |
| 37 | 2 | 3600 rpm × 3 min. | 30° C. | 1 | 150 rpm × 10 min. | 55° C. | 96 | 2 | 3600 rpm × 5 min. | 30° C. | 1 | 150 rpm × 10 min. | 55° C. |
| 38 | 2 | 3600 rpm × 3 min. | 30° C. | 1 | 150 rpm × 10 min. | 55° C. | 97 | 2 | 3600 rpm × 3 min. | 30° C. | 1 | 150 rpm × 10 min. | 55° C. |
| 38 | 2 | 3600 rpm × 3 min. | 30° C. | 1 | 150 rpm × 10 min. | 55° C. | 98 | 2 | 3600 rpm × 3 min. | 30° C. | 1 | 150 rpm × 10 min. | 55° C. |
| 40 | 2 | 3600 rpm × 3 min. | 30° C. | 1 | 150 rpm × 10 min. | 55° C. | 99 | 2 | 3600 rpm × 3 min. | 30° C. | 1 | 150 rpm × 10 min. | 55° C. |
| 41 | 2 | 3600 rpm × 3 min. | 30° C. | 1 | 150 rpm × 10 min. | 55° C. | 100 | 2 | 3600 rpm × 3 min. | 30° C. | 1 | 300 rpm × 10 min. | 55° C. |
| 42 | 2 | 3600 rpm × 3 min. | 30° C. | 1 | 150 rpm × 10 min. | 55° C. | 101 | 2 | 3600 rpm × 3 min. | 30° C. | 1 | 300 rpm × 8 min. | 55° C. |
| 43 | 2 | 3600 rpm × 3 min. | 30° C. | 1 | 150 rpm × 10 min. | 55° C. | 102 | 2 | 3600 rpm × 3 min. | 30° C. | 1 | 100 rpm × 10 min. | 55° C. |
| 44 | 2 | 3600 rpm × 3 min. | 30° C. | 1 | 150 rpm × 10 min. | 55° C. | 103 | 2 | 3600 rpm × 3 min. | 30° C. | 1 | 100 rpm × 5 min. | 55° C. |
| 45 | 2 | 3600 rpm × 3 min. | 30° C. | 1 | 150 rpm × 10 min. | 55° C. | 104 | 2 | 3600 rpm × 3 min. | 30° C. | 1 | 80 rpm × 10 min. | 55° C. |
| 46 | 2 | 3600 rpm × 3 min. | 30° C. | 1 | 150 rpm × 10 min. | 55° C. | 105 | 2 | 3600 rpm × 3 min. | 30° C. | 1 | 150 rpm × 10 min. | 55° C. |

TABLE 6-continued

| Toner No. | External addition step | | | Heating step | | | Toner No. | External addition step | | | Heating step | | |
|---|---|---|---|---|---|---|---|---|---|---|---|---|---|
| | Mixing process apparatus No. | Condition | Tem. ° C. | Mixing process apparatus No. | Condition | Tem. ° C. | | Mixing process apparatus No. | Condition | Tem. ° C. | Mixing process apparatus No. | Condition | Tem. ° C. |
| 47 | 2 | 3600 rpm × 3 min. | 30° C. | 1 | 150 rpm × 10 min. | 55° C. | 106 | 2 | 3600 rpm × 3 min. | 30° C. | 1 | 150 rpm × 10 min. | 55° C. |
| 48 | 2 | 3600 rpm × 3 min. | 30° C. | 1 | 150 rpm × 10 min. | 55° C. | 107 | 2 | 3600 rpm × 3 min. | 30° C. | 1 | 150 rpm × 10 min. | 55° C. |
| 49 | 2 | 3600 rpm × 3 min. | 30° C. | 1 | 150 rpm × 10 min. | 55° C. | 108 | 2 | 3600 rpm × 3 min. | 30° C. | 1 | 150 rpm × 10 min. | 55° C. |
| 60 | 2 | 3600 rpm × 3 min. | 30° C. | 1 | 150 rpm × 10 min. | 55° C. | 109 | 2 | 3600 rpm × 3 min. | 30° C. | 1 | 150 rpm × 10 min. | 55° C. |
| 51 | 2 | 3600 rpm × 3 min. | 30° C. | 1 | 150 rpm × 10 min. | 55° C. | 110 | 2 | 3600 rpm × 3 min. | 30° C. | 1 | 150 rpm × 10 min. | 55° C. |
| 52 | 2 | 3600 rpm × 3 min. | 30° C. | 1 | 150 rpm × 10 min. | 55° C. | 111 | 2 | 3600 rpm × 3 min. | 30° C. | 1 | 150 rpm × 10 min. | 55° C. |
| 53 | 2 | 3600 rpm × 3 min. | 30° C. | 1 | 150 rpm × 10 min. | 55° C. | 112 | 2 | 3600 rpm × 3 min. | 30° C. | 1 | 150 rpm × 10 min. | 55° C. |
| 54 | 2 | 3600 rpm × 3 min. | 30° C. | 1 | 150 rpm × 10 min. | 55° C. | 113 | 2 | 3600 rpm × 3 min. | 30° C. | 1 | 150 rpm × 10 min. | 55° C. |
| 55 | 2 | 3600 rpm × 3 min. | 30° C. | 1 | 150 rpm × 10 min. | 55° C. | 114 | 2 | 3600 rpm × 3 min. | 30° C. | 1 | 150 rpm × 10 min. | 55° C. |
| 56 | 2 | 3600 rpm × 3 min. | 30° C. | 1 | 150 rpm × 10 min. | 55° C. | 115 | 2 | 3600 rpm × 3 min. | 30° C. | 1 | 150 rpm × 10 min. | 55° C. |
| 57 | 2 | 3600 rpm × 3 min. | 30° C. | 1 | 150 rpm × 10 min. | 55° C. | 116 | 2 | 3600 rpm × 3 min. | 30° C. | 1 | 150 rpm × 10 min. | 55° C. |
| 58 | 2 | 3600 rpm × 3 min. | 30° C. | 1 | 150 rpm × 10 min. | 55° C. | 117 | 2 | 3600 rpm × 3 min. | 30° C. | 1 | 150 rpm × 10 min. | 55° C. |
| 59 | 2 | 3600 rpm × 3 min. | 30° C. | 1 | 150 rpm × 10 min. | 55° C. | 118 | 2 | 3600 rpm × 3 min. | 30° C. | 1 | 150 rpm × 10 min. | 55° C. |

In the Table, "Tem." indicates Temperature.

TABLE 7-1

| | Particle diameter | | | | | | | | Dispersity |
|---|---|---|---|---|---|---|---|---|---|
| Toner No. | Dt (μm) | Dsi (nm) | Dsi/Dt (—) | Tg (° C.) | Average circularity | \|SPapes-SPsi\| | \|SPapes-SPapes\| | Attachment index | evaluation index |
| 1 | 6.5 | 100 | 0.0154 | 54.8 | 0.955 | 1.06 | 0.15 | 2.5 | 1.0 |
| 2 | 6.5 | 100 | 0.0154 | 54.8 | 0.955 | 1.06 | 0.15 | 2.5 | 1.0 |
| 3 | 6.5 | 100 | 0.0154 | 54.8 | 0.955 | 1.06 | 0.15 | 2.5 | 1.0 |
| 4 | 6.5 | 100 | 0.0154 | 54.8 | 0.955 | 1.06 | 0.15 | 2.5 | 1.0 |
| 5 | 6.5 | 100 | 0.0154 | 54.8 | 0.955 | 1.06 | 0.15 | 2.5 | 1.0 |
| 6 | 6.5 | 100 | 0.0154 | 54.8 | 0.955 | 1.06 | 0.15 | 2.5 | 1.0 |
| 7 | 6.5 | 100 | 0.0154 | 54.8 | 0.955 | 1.06 | 0.15 | 2.5 | 1.0 |
| 8 | 6.5 | 150 | 0.0231 | 54.8 | 0.955 | 0.05 | 0.58 | 2.5 | 1.0 |
| 9 | 6.5 | 150 | 0.0231 | 54.8 | 0.955 | 0.11 | 0.42 | 2.5 | 1.0 |
| 10 | 6.5 | 100 | 0.0154 | 54.8 | 0.955 | 1.57 | 0.36 | 2.5 | 1.0 |
| 11 | 6.5 | 100 | 0.0154 | 54.8 | 0.955 | 1.28 | 0.07 | 2.5 | 1.0 |
| 12 | 6.5 | 100 | 0.0154 | 54.8 | 0.955 | 1.94 | 0.73 | 2.5 | 1.0 |
| 13 | 6.5 | 100 | 0.0154 | 54.8 | 0.955 | 1.75 | 0.54 | 2.5 | 1.0 |
| 14 | 6.5 | 100 | 0.0154 | 54.8 | 0.955 | 0.79 | 0.42 | 2.5 | 1.0 |
| 15 | 6.5 | 150 | 0.0231 | 54.8 | 0.955 | 1.17 | 0.15 | 2.5 | 1.0 |
| 16 | 6.5 | 150 | 0.0231 | 54.8 | 0.955 | 1.68 | 0.36 | 2.5 | 1.0 |
| 17 | 6.5 | 150 | 0.0231 | 54.8 | 0.955 | 1.39 | 0.07 | 2.5 | 1.0 |
| 18 | 6.5 | 150 | 0.0231 | 54.8 | 0.955 | 1.86 | 0.54 | 2.5 | 1.0 |
| 19 | 6.5 | 150 | 0.0231 | 54.8 | 0.955 | 0.90 | 0.42 | 2.5 | 1.0 |
| 20 | 6.5 | 150 | 0.0231 | 54.8 | 0.955 | 1.23 | 0.15 | 2.5 | 1.0 |
| 21 | 6.5 | 150 | 0.0231 | 54.8 | 0.955 | 1.74 | 0.36 | 2.5 | 1.0 |
| 22 | 6.5 | 150 | 0.0231 | 54.8 | 0.955 | 1.45 | 0.07 | 2.5 | 1.0 |
| 23 | 6.5 | 150 | 0.0231 | 54.8 | 0.955 | 1.92 | 0.54 | 2.5 | 1.0 |
| 24 | 6.5 | 150 | 0.0231 | 54.8 | 0.955 | 0.96 | 0.42 | 2.5 | 1.0 |
| 25 | 6.5 | 150 | 0.0231 | 54.8 | 0.955 | 0.31 | 0.15 | 2.5 | 1.0 |
| 26 | 6.5 | 150 | 0.0231 | 54.8 | 0.955 | 1.17 | 0.15 | 2.5 | 1.0 |
| 27 | 6.5 | 150 | 0.0231 | 54.8 | 0.955 | 1.94 | 0.15 | 2.5 | 1.0 |
| 28 | 6.5 | 150 | 0.0231 | 54.8 | 0.955 | 1.79 | 0.15 | 2.5 | 1.0 |
| 29 | 6.5 | 150 | 0.0231 | 54.8 | 0.955 | 1.54 | 0.15 | 2.5 | 1.0 |
| 30 | 6.5 | 150 | 0.0231 | 54.8 | 0.955 | 0.38 | 0.15 | 2.5 | 1.0 |
| 31 | 6.5 | 150 | 0.0231 | 54.8 | 0.955 | 0.38 | 0.15 | 2.5 | 1.0 |
| 32 | 6.5 | 150 | 0.0231 | 54.8 | 0.955 | 0.98 | 0.15 | 2.5 | 1.0 |
| 33 | 6.5 | 150 | 0.0231 | 54.8 | 0.955 | 1.71 | 0.15 | 2.5 | 1.0 |
| 34 | 6.5 | 150 | 0.0231 | 54.8 | 0.955 | 1.75 | 0.15 | 2.5 | 1.0 |
| 35 | 6.5 | 100 | 0.0154 | 54.8 | 0.955 | 0.86 | 0.35 | 2.5 | 1.0 |
| 36 | 6.5 | 100 | 0.0154 | 54.8 | 0.955 | 0.50 | 0.71 | 2.5 | 1.0 |
| 37 | 6.5 | 100 | 0.0154 | 54.8 | 0.955 | 1.50 | 0.29 | 2.5 | 1.0 |
| 38 | 6.5 | 100 | 0.0154 | 54.8 | 0.955 | 0.35 | 0.86 | 2.5 | 1.0 |
| 39 | 6.5 | 100 | 0.0154 | 54.8 | 0.955 | 1.14 | 0.07 | 2.5 | 1.0 |
| 40 | 6.5 | 100 | 0.0154 | 54.8 | 0.955 | 0.85 | 0.36 | 2.5 | 1.0 |
| 41 | 6.5 | 100 | 0.0154 | 54.8 | 0.955 | 0.59 | 0.62 | 2.5 | 1.0 |
| 42 | 6.5 | 100 | 0.0154 | 54.8 | 0.955 | 0.63 | 0.58 | 2.5 | 1.0 |
| 43 | 6.5 | 100 | 0.0154 | 54.8 | 0.955 | 0.68 | 0.53 | 2.5 | 1.0 |
| 44 | 6.5 | 150 | 0.0231 | 54.8 | 0.955 | 1.06 | 0.15 | 2.5 | 1.0 |
| 45 | 6.5 | 8 | 0.0012 | 54.8 | 0.955 | 1.06 | 0.15 | 2.5 | 1.0 |
| 46 | 6.5 | 10 | 0.0015 | 54.8 | 0.955 | 1.06 | 0.15 | 2.5 | 1.0 |
| 47 | 6.5 | 30 | 0.0046 | 54.8 | 0.955 | 1.06 | 0.15 | 2.5 | 1.0 |
| 48 | 6.5 | 50 | 0.0077 | 54.8 | 0.955 | 1.06 | 0.15 | 2.5 | 1.0 |
| 49 | 6.5 | 60 | 0.0092 | 54.8 | 0.955 | 1.06 | 0.15 | 2.5 | 1.0 |
| 50 | 6.5 | 80 | 0.0123 | 54.8 | 0.955 | 1.06 | 0.15 | 2.5 | 1.0 |
| 51 | 6.5 | 200 | 0.0308 | 54.8 | 0.955 | 1.06 | 0.15 | 2.6 | 1.0 |
| 52 | 6.5 | 250 | 0.0385 | 54.8 | 0.955 | 1.06 | 0.15 | 2.6 | 1.0 |
| 53 | 6.5 | 300 | 0.0462 | 54.8 | 0.955 | 1.06 | 0.15 | 2.6 | 1.0 |
| 54 | 6.5 | 350 | 0.0538 | 54.8 | 0.955 | 1.06 | 0.15 | 2.8 | 1.0 |
| 55 | 6.5 | 480 | 0.0738 | 54.8 | 0.955 | 1.06 | 0.15 | 3.0 | 1.0 |
| 56 | 6.5 | 600 | 0.0923 | 54.8 | 0.955 | 1.06 | 0.15 | 3.1 | 1.0 |
| 57 | 6.5 | 150 | 0.0231 | 54.8 | 0.955 | 1.06 | 0.15 | 2.5 | 1.0 |
| 58 | 6.5 | 150 | 0.0231 | 54.8 | 0.955 | 1.06 | 0.15 | 2.5 | 1.0 |
| 59 | 6.5 | 150 | 0.0231 | 54.8 | 0.955 | 1.06 | 0.15 | 2.5 | 1.0 |

TABLE 7-2

| | Particle diameter | | | | | | | | Dispersity |
|---|---|---|---|---|---|---|---|---|---|
| Toner No. | Dt (μm) | Dsi (nm) | Dsi/Dt (—) | Tg (° C.) | Average circularity | \|SPapes-SPsi\| | \|SPapes-SPapes\| | Attachment index | evaluation index |
| 60 | 6.5 | 150 | 0.0231 | 54.8 | 0.955 | 1.06 | 0.15 | 2.5 | 1.0 |
| 61 | 6.5 | 150 | 0.0231 | 54.8 | 0.955 | 1.06 | 0.15 | 2.5 | 1.0 |
| 62 | 6.5 | 150 | 0.0231 | 54.8 | 0.955 | 1.06 | 0.15 | 2.5 | 1.0 |
| 63 | 6.5 | 150 | 0.0231 | 54.8 | 0.955 | 1.06 | 0.15 | 2.5 | 1.0 |

TABLE 7-2-continued

| | Particle diameter | | | | | | | | Dispersity |
|---|---|---|---|---|---|---|---|---|---|
| Toner No. | Dt (μm) | Dsi (nm) | Dsi/Dt (—) | Tg (° C.) | Average circularity | \|SPapes-SPsi\| | \|SPapes-SPapes\| | Attachment index | evaluation index |
| 64 | 6.5 | 150 | 0.0231 | 54.8 | 0.955 | 1.06 | 0.15 | 2.5 | 1.0 |
| 65 | 6.5 | 150 | 0.0231 | 54.8 | 0.955 | 1.06 | 0.15 | 2.5 | 1.0 |
| 66 | 6.5 | 150 | 0.0231 | 54.8 | 0.955 | 1.06 | 0.15 | 2.5 | 1.0 |
| 67 | 6.5 | 150 | 0.0231 | 54.8 | 0.955 | 1.06 | 0.15 | 2.5 | 1.0 |
| 68 | 6.5 | 100 | 0.0154 | 54.8 | 0.955 | 1.06 | 0.04 | 2.5 | 1.0 |
| 69 | 6.5 | 100 | 0.0154 | 54.8 | 0.955 | 1.06 | 0.51 | 2.5 | 1.0 |
| 70 | 6.5 | 100 | 0.0154 | 54.8 | 0.955 | 1.06 | 0.04 | 2.5 | 1.0 |
| 73 | 6.5 | 100 | 0.0154 | 54.8 | 0.955 | 1.06 | 0.00 | 2.5 | 1.0 |
| 72 | 6.5 | 100 | 0.0154 | 54.8 | 0.955 | 1.06 | 0.08 | 2.5 | 1.0 |
| 73 | 6.5 | 100 | 0.0154 | 54.8 | 0.955 | 1.06 | 0.02 | 2.5 | 1.0 |
| 74 | 6.5 | 100 | 0.0154 | 54.8 | 0.955 | 1.06 | 0.14 | 2.5 | 1.0 |
| 75 | 6.5 | 100 | 0.0154 | 54.8 | 0.955 | 1.06 | 0.10 | 2.5 | 1.0 |
| 76 | 6.5 | 100 | 0.0154 | 54.8 | 0.955 | 1.06 | 0.50 | 2.5 | 1.0 |
| 77 | 6.5 | 100 | 0.0154 | 54.8 | 0.955 | 1.06 | 0.90 | 2.5 | 1.0 |
| 78 | 6.5 | 100 | 0.0154 | 54.8 | 0.955 | 1.06 | 1.09 | 2.5 | 1.0 |
| 79 | 6.5 | 100 | 0.0154 | 54.8 | 0.955 | 1.06 | 0.19 | 2.5 | 1.0 |
| 80 | 6.5 | 100 | 0.0154 | 54.8 | 0.955 | 1.06 | 0.15 | 2.5 | 1.0 |
| 81 | 6.5 | 100 | 0.0154 | 54.8 | 0.955 | 1.06 | 0.15 | 2.5 | 1.0 |
| 82 | 6.5 | 100 | 0.0154 | 54.8 | 0.955 | 1.06 | 0.15 | 2.5 | 1.0 |
| 83 | 6.5 | 100 | 0.0154 | 54.8 | 0.955 | 1.06 | 0.15 | 2.5 | 1.0 |
| 84 | 6.5 | 100 | 0.0154 | 54.8 | 0.955 | 1.06 | 0.15 | 2.5 | 1.0 |
| 85 | 6.5 | 100 | 0.0154 | 54.8 | 0.955 | 1.06 | 0.15 | 2.5 | 1.0 |
| 86 | 6.5 | 100 | 0.0154 | 54.8 | 0.955 | 1.06 | 0.15 | 2.5 | 1.0 |
| 87 | 6.5 | 100 | 0.0154 | 54.8 | 0.955 | 1.06 | 0.15 | 2.5 | 1.0 |
| 88 | 6.5 | 100 | 0.0154 | 54.8 | 0.955 | 1.06 | 0.15 | 2.5 | 1.0 |
| 89 | 6.5 | 100 | 0.0154 | 54.8 | 0.955 | 1.06 | 0.15 | 2.5 | 1.0 |
| 90 | 6.5 | 100 | 0.0154 | 54.8 | 0.955 | 1.06 | 0.15 | 2.5 | 1.0 |
| 91 | 6.5 | 100 | 0.0154 | 54.8 | 0.955 | 1.06 | 0.15 | 2.5 | 1.0 |
| 92 | 6.5 | 100 | 0.0154 | 54.8 | 0.955 | 1.06 | 0.15 | 2.5 | 1.0 |
| 93 | 6.5 | 100 | 0.0154 | 54.8 | 0.955 | 1.06 | 0.15 | 2.5 | 1.0 |
| 94 | 6.5 | 100 | 0.0154 | 54.8 | 0.955 | 1.06 | 0.15 | 0.5 | 1.0 |
| 95 | 6.5 | 100 | 0.0154 | 54.8 | 0.955 | 1.06 | 0.15 | 1.0 | 1.0 |
| 96 | 6.5 | 100 | 0.0154 | 54.8 | 0.955 | 1.06 | 0.15 | 2.0 | 1.0 |
| 97 | 6.5 | 100 | 0.0154 | 54.8 | 0.955 | 1.06 | 0.15 | 3.0 | 1.0 |
| 98 | 6.5 | 100 | 0.0154 | 54.8 | 0.955 | 1.06 | 0.15 | 4.3 | 1.0 |
| 99 | 6.5 | 100 | 0.0154 | 54.8 | 0.955 | 1.06 | 0.15 | 4.8 | 1.0 |
| 100 | 6.5 | 100 | 0.0154 | 54.8 | 0.955 | 1.06 | 0.15 | 2.5 | 0.4 |
| 101 | 6.5 | 100 | 0.0154 | 54.8 | 0.955 | 1.06 | 0.15 | 2.5 | 0.5 |
| 102 | 6.5 | 100 | 0.0154 | 54.8 | 0.955 | 1.06 | 0.15 | 2.5 | 1.5 |
| 103 | 6.5 | 100 | 0.0154 | 54.8 | 0.955 | 1.06 | 0.15 | 2.5 | 2.0 |
| 104 | 6.5 | 100 | 0.0154 | 54.8 | 0.955 | 1.06 | 0.15 | 2.5 | 2.2 |
| 105 | 6.5 | 100 | 0.0154 | 54.8 | 0.955 | 1.06 | 0.15 | 2.5 | 1.0 |
| 106 | 6.5 | 100 | 0.0154 | 54.8 | 0.955 | 1.06 | 0.15 | 2.5 | 1.0 |
| 107 | 6.5 | 100 | 0.0154 | 54.8 | 0.955 | 1.06 | 0.15 | 2.5 | 1.0 |
| 108 | 6.5 | 100 | 0.0154 | 54.8 | 0.955 | 1.06 | 0.15 | 2.5 | 1.0 |
| 109 | 6.5 | 100 | 0.0154 | 54.8 | 0.975 | 1.06 | 0.15 | 2.5 | 1.0 |
| 110 | 6.5 | 100 | 0.0154 | 54.8 | 0.965 | 1.06 | 0.15 | 2.5 | 1.0 |
| 111 | 6.5 | 100 | 0.0154 | 54.8 | 0.965 | 1.06 | 0.15 | 2.5 | 1.0 |
| 112 | 5.5 | 100 | 0.0182 | 54.8 | 0.955 | 1.06 | 0.15 | 2.5 | 1.0 |
| 113 | 7.5 | 100 | 0.0133 | 54.8 | 0.955 | 1.06 | 0.15 | 2.5 | 1.0 |
| 114 | 6.5 | 300 | 0.0462 | 54.8 | 0.955 | 1.06 | 0.15 | 2.6 | 1.0 |
| 115 | 6.5 | — | — | 54.8 | 0.955 | — | 0.15 | 2.5 | 1.0 |
| 116 | 6.5 | 100 | 0.0154 | 54.8 | 0.955 | — | — | 2.5 | 1.0 |
| 117 | 6.5 | 150 | 0.0231 | 54.8 | 0.955 | 2.05 | 0.73 | 2.5 | 1.0 |
| 118 | 6.5 | 100 | 0.0154 | 54.8 | 0.955 | 1.06 | 0.15 | 2.5 | 1.0 |

Dt: number-average particle diameter (D1) of toner particles

Dsi: number-average particle diameter of organosilicon polymer particles

Examples 1 to 114

Toners 1 to 114 were subjected to various image evaluations using an evaluation machine. The evaluation results are shown in Tables 8-1 and 8-2.

Comparative Examples 1 to 4

Toners 115 to 118 were subjected to various image evaluations using an evaluation machine. The evaluation results are shown in Tables 8-1 and 8-2.

Toner Evaluation

The laser beam printer LBP652C (commercially available from Canon Inc.) was modified so that the fixation temperature and the process speed were able to be adjusted, and the following evaluations were performed.

Fogging

In measurement of fogging, the above evaluation machine was used as image forming apparatus, a durability test was performed in each of the following environments with a print percentage of 1% and a pause of 1 minute whenever two sheets were printed, and after 13000 durable sheets were printed from the beginning, they were left for 6 days in each of the environments.

under a normal temperature and normal humidity environment (N/N): 25.0° C. 60% RH under high temperature and high humidity environment (H/H): 32.5° C. 85% RH under low temperature and low humidity environment (U/L): 10° C. 10% RH Then, the amount of fogging on the first image sample was measured using REFLECT METER MODELTC-6DS (commercially available from Tokyo Denshoku Co., Ltd.), and calculated by the following formula. A4 size plain paper (GF-C081A4 commercially available from Canon Marketing Japan Inc.) was used as a recording material used in the durability test.

Amount of fogging (%)=(whiteness of recording material before printout)−(whiteness of non-image forming part (white background part) of recording material after printing)

Fixability

Under a harsh low temperature and low humidity environment (SL/L: a temperature of 5° C. and a humidity of 10% RH), using the above evaluation machine, the power was turned on when the machine and a cartridge filled with the toner were adapted to the environment (after being left for 24 hours under the environment). Immediately after wake up, a horizontal line pattern with a width of 200 μm (with a horizontal width of 200 μm and an interval of 200 μm) was printed out, and the fixability of the 50th print image was evaluated. For fixability evaluation, the image was rubbed with lens-cleaning paper with a load of 100 g for 5 round trips, and the peeling of the image was evaluated according to an average of the decline percentage (%) of the reflection density. For evaluation, bond paper with a surface smoothness 10 [sec] or less was used.

Toner Fusion and Adhesion to Toner Carrying Member and Toner Layer Thickness Control Member Toner fusion and adhesion to the toner carrying member and the toner layer thickness control member were evaluated under a high temperature and high humidity environment (H/H: a temperature of 32.5° C. and a humidity of 80% RH) and under a harsh high temperature and high humidity environment (SH/H: a temperature of 35.0° C. and a humidity of 85% RH) using the above evaluation machine. A durability test was performed with a print percentage of 1% and a pause of 1 minute whenever two sheets were printed, and the 8000th durable image sample from the beginning was visually evaluated. A4 size plain paper (GF-C081A4 commercially available from Canon Marketing Japan Inc.) was used as a recording material. The evaluation criteria are shown below.

A: No fusion and adhesion occurred on the image

B: Slight fusion and adhesion occurred on the image (from 1 to 3 minor streaks at the end)

C: Fusion and adhesion occurred on the image (at least 4 streaks at the end)

Filming on Latent Image Carrier

In evaluation of filming on the latent image carrier, a durability test was performed according to continuous printing at a print percentage of 1% using the above evaluation machine under a low temperature and low humidity environment (L/L: a temperature of 10° C. and a humidity of 10% RH) and under a harsh low temperature and low humidity environment (SLL: a temperature of 0° C. and a humidity of 10% RH). The 2000th durable image sample from the beginning was visually evaluated. A4 size plain paper (GF-C081A4 commercially available from Canon Marketing Japan Inc.) was used as a recording material. The evaluation criteria are shown below.

A: no filming occurred

B: slight filming occurred (a small number of vertical lines with about a length of 2 mm were present on the recording material)

C: filming occurred (a large number of vertical lines with about a length of 5 mm were present on the recording material)

Image Density

In evaluation of the initial image density, one full solid chart in which the amount of the toner laid on paper was 0.38 ($mg/cm^2$) was printed using the above evaluation machine under a harsh high temperature and high humidity environment (SH/H: a temperature of 35.0° C. and a humidity of 85% RH), and the image density of each image was measured. The density of the image sample was measured using REFLECT METER MODELTC-6DS (commercially available from Tokyo Denshoku Co., Ltd.). A4 size plain paper (GF-C081A4 commercially available from Canon Marketing Japan Inc.) was used as the recording material.

Storage Stability of Toner

The storage stability of the toner was evaluated based on the state after 10 g of the toner was weighed in a 100 ml resin cup, left in a constant temperature layer at 50° C. or 55° C. for 3 days, and then passed through a 200-mesh (opening) sieve. A Powder Tester (commercially available from Hosokawa Micron Corporation) including a digital vibration meter (DIGITAL VIBLATIONMETERMODEL 1332 SHOWA SOKKI CORPORATION) was used as the measuring apparatus. In a measurement method, an evaluation toner was placed on a set 200-mesh sieve (with an opening of 75 μm), the displacement value of the digital vibration meter was adjusted to 0.50 mm (peak-to-peak), and vibration was applied for 30 seconds. Then, the storage stability was evaluated based on the state of aggregates of the toner remaining on each sieve. The evaluation criteria are shown below.

A: the amount of the toner remaining on the mesh was less than 1.0 g. and the flowability was excellent B: the amount of the toner remaining on the mesh was at least 1.0 g and less than 2.5 g, and the flowability was excellent C: the amount of the toner remaining on the mesh was at least 2.5 g, and aggregates were not easily loosened Decrease in Glossiness of Fixed Image In evaluation of decrease in glossiness of the fixed image, under a low temperature and low humidity environment (UL: a temperature of 10° C. and a humidity of 10% RH), an evaluation machine to be described below was used for evaluation. The power was turned on when the machine and a cartridge filled with the toner were adapted to the environment (ater being left for 24 hours under the environment), and 100 full solid images were printed out immediately after wake up. The image was left under a normal temperature and normal humidity environment (N/N: a temperature of 25° C. and a humidity of 50% RH) for 7 days, and the image sample was evaluated. A4 size plain paper (GF-C081A4 commercially available from Canon Marketing Japan Inc.) was used for evaluation.

A: gloss of the entire surface of the image due to recrystallization of the crystalline polyester resin was not reduced B: a part of the image was less glossy and slightly whitish due to recrystallization of the crystalline polyester resin C: the entire surface of the image was less glossy and became whitish due to recrystallization of the crystalline polyester resin

TABLE 8-1

| Example No. | Toner No. | Fogging N/N | Fogging H/H | Fogging L/L | Image density | Filming L/L | Filming SL/L | Fixability | Offset resistance L/L | Offset resistance SL/L | Toner fusion and adhesion H/H | Toner fusion and adhesion SH/H | Storage stability 50° C. | Storage stability 55° C. | Decrease in glossiness of fixed image |
|---|---|---|---|---|---|---|---|---|---|---|---|---|---|---|---|
| 1 | 1 | 0.2 | 0.4 | 0.2 | 1.45 | A | A | 3 | A | A | A | A | A | A | A |
| 2 | 2 | 0.2 | 0.4 | 0.2 | 1.45 | A | A | 3 | A | A | A | A | A | A | A |
| 3 | 3 | 0.2 | 0.4 | 0.2 | 1.45 | A | A | 3 | A | A | A | A | A | A | A |
| 4 | 4 | 0.2 | 0.4 | 0.2 | 1.45 | A | A | 3 | A | A | A | A | A | A | A |
| 5 | 5 | 0.2 | 0.4 | 0.2 | 1.45 | A | A | 3 | A | A | A | A | A | A | A |
| 6 | 6 | 0.3 | 0.6 | 0.2 | 1.45 | A | A | 3 | A | A | A | A | A | A | A |
| 7 | 7 | 0.2 | 0.4 | 0.2 | 1.45 | A | A | 5 | A | A | A | A | A | A | A |
| 8 | 8 | 0.2 | 0.5 | 0.2 | 1.45 | A | A | 3 | A | A | A | A | A | A | A |
| 9 | 9 | 0.2 | 0.4 | 0.2 | 1.45 | A | A | 3 | A | A | A | A | A | A | A |
| 10 | 10 | 0.2 | 0.4 | 0.2 | 1.45 | A | A | 3 | A | A | A | A | A | A | A |
| 11 | 11 | 0.3 | 0.6 | 0.3 | 1.45 | A | A | 3 | A | A | A | B | A | A | A |
| 12 | 12 | 0.2 | 0.4 | 0.2 | 1.45 | A | A | 3 | A | A | A | A | A | A | A |
| 13 | 13 | 0.2 | 0.4 | 0.2 | 1.45 | A | A | 3 | A | A | A | A | A | A | A |
| 14 | 14 | 0.2 | 0.4 | 0.2 | 1.45 | A | A | 3 | A | A | A | A | A | A | A |
| 15 | 15 | 0.2 | 0.4 | 0.2 | 1.45 | A | A | 3 | A | A | A | A | A | A | A |
| 16 | 16 | 0.2 | 0.4 | 0.2 | 1.45 | A | A | 3 | A | A | A | A | A | A | A |
| 17 | 17 | 0.3 | 0.6 | 0.3 | 1.45 | A | A | 3 | A | A | A | B | A | A | A |
| 18 | 18 | 0.2 | 0.4 | 0.2 | 1.45 | A | A | 3 | A | A | A | A | A | A | A |
| 19 | 19 | 0.2 | 0.4 | 0.2 | 1.45 | A | A | 3 | A | A | A | A | A | A | A |
| 20 | 20 | 0.2 | 0.4 | 0.2 | 1.45 | A | A | 5 | A | A | A | A | A | A | A |
| 21 | 21 | 0.2 | 0.4 | 0.2 | 1.45 | A | A | 5 | A | A | A | A | A | A | A |
| 22 | 22 | 0.3 | 0.6 | 0.3 | 1.45 | A | A | 5 | A | A | A | A | A | A | A |
| 23 | 23 | 0.2 | 0.4 | 0.2 | 1.45 | A | A | 5 | A | A | A | A | A | A | A |
| 24 | 24 | 0.2 | 0.4 | 0.2 | 1.45 | A | A | 5 | A | A | A | A | A | A | A |
| 25 | 25 | 0.2 | 0.6 | 0.2 | 1.45 | A | A | 5 | A | A | A | A | A | A | A |
| 26 | 26 | 0.2 | 0.4 | 0.2 | 1.45 | A | A | 5 | A | A | A | A | A | A | A |
| 27 | 27 | 0.2 | 0.4 | 0.5 | 1.45 | A | A | 5 | A | A | A | A | A | A | A |
| 28 | 28 | 0.5 | 0.7 | 0.5 | 1.45 | A | A | 7 | A | A | A | A | A | A | A |
| 29 | 29 | 0.2 | 0.4 | 0.2 | 1.45 | A | A | 5 | A | A | A | A | A | A | A |
| 30 | 30 | 0.2 | 0.4 | 0.2 | 1.45 | A | A | 5 | A | A | A | A | A | A | A |
| 31 | 31 | 0.2 | 0.7 | 0.2 | 1.41 | A | A | 5 | A | A | A | A | A | A | A |
| 32 | 32 | 0.2 | 0.4 | 0.2 | 1.45 | A | A | 5 | A | A | A | A | A | A | A |
| 33 | 33 | 0.5 | 0.7 | 0.5 | 1.45 | A | A | 7 | A | A | A | A | A | A | A |
| 34 | 34 | 0.7 | 0.9 | 0.7 | 1.45 | A | A | 9 | A | A | A | B | A | A | B |
| 35 | 35 | 0.4 | 0.6 | 0.4 | 1.41 | A | A | 10 | A | A | A | A | A | A | A |
| 36 | 36 | 0.4 | 0.6 | 0.4 | 1.41 | A | A | 10 | A | A | A | A | A | A | A |
| 37 | 37 | 0.4 | 0.6 | 0.4 | 1.41 | A | A | 10 | A | A | A | A | A | A | A |
| 38 | 38 | 0.4 | 0.6 | 0.4 | 1.41 | A | A | 10 | A | A | A | A | A | A | A |
| 39 | 39 | 0.5 | 0.8 | 0.5 | 1.41 | A | A | 10 | A | A | A | B | A | A | A |
| 40 | 40 | 0.4 | 0.6 | 0.4 | 1.41 | A | A | 10 | A | A | A | A | A | A | A |
| 41 | 41 | 0.4 | 0.6 | 0.4 | 1.41 | A | A | 10 | A | A | A | A | A | A | A |
| 42 | 42 | 0.4 | 0.6 | 0.4 | 1.41 | A | A | 10 | A | A | A | A | A | A | A |
| 43 | 43 | 0.4 | 0.6. | 0.4 | 1.41 | A | A | 10 | A | A | A | A | A | A | A |
| 44 | 44 | 0.2 | 0.4 | 0.2 | 1.45 | A | A | 5 | A | A | A | A | A | A | A |
| 45 | 45 | 0.3 | 0.6 | 0.3 | 1.45 | A | A | 5 | A | A | A | B | A | A | A |
| 46 | 4€ | 0.2 | 0.6 | 0.2 | 1.45 | A | A | 5 | A | A | A | A | A | A | A |
| 47 | 47 | 0.2 | 0.4 | 0.2 | 1.45 | A | A | 5 | A | A | A | A | A | A | A |
| 48 | 48 | 0.2 | 0.4 | 0.2 | 1.45 | A | A | 5 | A | A | A | A | A | A | A |
| 49 | 49 | 0.2 | 0.4 | 0.2 | 1.45 | A | A | 5 | A | A | A | A | A | A | A |
| 60 | 60 | 0.2 | 0.4 | 0.2 | 1.45 | A | A | 5 | A | A | A | A | A | A | A |
| 51 | 51 | 0.2 | 0.4 | 0.2 | 1.45 | A | A | 5 | A | A | A | A | A | A | A |
| 52 | 52 | 0.2 | 0.4 | 0.2 | 1.45 | A | A | 5 | A | A | A | A | A | A | A |
| 53 | 63 | 0.2 | 0.4 | 0.2 | 1.45 | A | A | 5 | A | A | A | A | A | A | A |
| 54 | 54 | 0.2 | 0.6 | 0.2 | 1.45 | A | A | 5 | A | A | A | A | A | A | A |
| 55 | SS | 0.2 | 0.6 | 0.2 | 1.45 | A | A | 5 | A | A | A | A | A | A | A |
| 56 | 56 | 0.3 | 0.6 | 0.3 | 1.41 | A | B | 5 | A | A | A | A | A | A | A |
| 57 | 57 | 0.2 | 0.4 | 0.2 | 1.45 | A | A | 5 | A | A | A | A | A | A | A |
| 68 | 68 | 0.2 | 0.4 | 0.2 | 1.45 | A | A | 5 | A | A | A | A | A | A | A |
| 59 | 59 | 0.2 | 0.4 | 0.2 | 1.45 | A | A | 5 | A | A | A | A | A | A | A |

TABLE 8-2

| Example No. | Toner No. | Fogging N/N | Fogging N/H | Fogging L/L | Image density | Filming L/L | Filming SL/L | Fixability | Offset resistance L/L | Offset resistance SL/L | Toner fusion and adhesion H/H | Toner fusion and adhesion SH/H | Storage stability 50° C. | Storage stability 55° C. | Decrease in glossiness of fixed image |
|---|---|---|---|---|---|---|---|---|---|---|---|---|---|---|---|
| 60 | 60 | 0.2 | 0.4 | 0.2 | 1.45 | A | A | 5 | A | A | A | A | A | A | A |
| 61 | 61 | 0.2 | 0.4 | 0.2 | 1.45 | A | A | 5 | A | A | A | A | A | A | A |
| 62 | 62 | 0.2 | 0.4 | 0.3 | 1.45 | A | A | 5 | A | A | A | A | A | A | A |
| 63 | 63 | 0.3 | 0.4 | 0.5 | 1.45 | A | B | 5 | A | A | A | A | A | A | A |

TABLE 8-2-continued

| Example | Toner | Fogging | | | Image | Filming | | | Offset resistance | | Toner fusion and adhesion | | Storage stability | | Decrease in glossiness of fixed |
|---|---|---|---|---|---|---|---|---|---|---|---|---|---|---|---|
| No. | No. | N/N | N/H | L/L | density | L/L | SL/L | Fixability | L/L | SL/L | H/H | SH/H | 50° C. | 55° C. | image |
| 64 | 64 | 0.2 | 0.4 | 0.2 | 1.45 | A | A | 5 | A | A | A | A | A | A | A |
| 65 | 65 | 0.2 | 0.4 | 0.2 | 1.45 | A | A | 5 | A | A | A | A | A | A | A |
| 66 | 66 | 0.2 | 0.4 | 0.2 | 1.45 | A | A | 5 | A | A | A | A | A | A | A |
| 67 | 67 | 0.2 | 0.8 | 0.2 | 1.45 | A | A | 5 | A | A | A | A | A | A | B |
| 68 | 68 | 0.3 | 0.6 | 0.3 | 1.45 | A | A | 5 | A | A | A | A | A | A | A |
| 69 | 69 | 0.2 | 0.4 | 0.2 | 1.45 | A | A | 5 | A | A | A | A | A | A | A |
| 70 | 70 | 0.3 | 0.6 | 0.3 | 1.45 | A | A | 5 | A | A | A | A | A | A | A |
| 71 | 71 | 0.3 | 0.6 | 0.3 | 1.45 | A | A | 5 | A | A | A | A | A | A | A |
| 72 | 72 | 0.3 | 0.6 | 0.3 | 1.45 | A | B | 5 | A | A | A | A | A | A | A |
| 73 | 73 | 0.3 | 0.6 | 0.3 | 1.45 | A | A | 5 | A | A | A | A | A | A | A |
| 74 | 74 | 0.2 | 0.2 | 0.2 | 1.45 | A | A | 5 | A | A | A | A | A | A | A |
| 75 | 75 | 0.2 | 0.4 | 0.2 | 1.45 | A | A | 5 | A | A | A | A | A | A | A |
| 76 | 76 | 0.2 | 0.4 | 0.2 | 1.45 | A | A | 5 | A | A | A | A | A | A | A |
| 77 | 77 | 0.2 | 0.4 | 0.2 | 1.45 | A | A | 5 | A | A | A | A | A | A | A |
| 78 | 78 | 0.2 | 0.4 | 0.2 | 1.45 | A | A | 5 | A | A | A | A | A | A | A |
| 79 | 79 | 0.2 | 0.4 | 0.2 | 1.45 | A | A | 5 | A | A | A | A | A | A | A |
| 80 | 80 | 0.2 | 0.4 | 0.2 | 1.45 | A | A | 6 | A | A | A | A | A | A | B |
| 81 | 81 | 0.2 | 0.4 | 0.2 | 1.45 | A | A | 3 | A | A | A | A | A | A | A |
| 82 | 82 | 0.2 | 0.4 | 0.2 | 1.45 | A | A | 3 | A | A | A | A | A | A | A |
| 83 | 83 | 0.2 | 0.4 | 0.2 | 1.45 | A | A | 3 | A | A | A | A | A | A | A |
| 84 | 84 | 0.2 | 0.4 | 0.2 | 1.45 | A | A | 3 | A | A | A | A | A | A | A |
| 85 | 85 | 0.5 | 1.0 | 0.5 | 1.45 | A | A | 3 | A | A | A | B | A | A | A |
| 86 | 86 | 0.3 | 0.8 | 0.2 | 1.45 | A | B | 3 | A | A | A | B | A | A | A |
| 87 | 87 | 0.2 | 0.6 | 0.2 | 1.45 | A | A | 3 | A | A | A | A | A | A | A |
| 88 | 88 | 0.2 | 0.6 | 0.2 | 1.45 | A | A | 3 | A | A | A | A | A | A | A |
| 89 | 89 | 0.2 | 0.5 | 0.2 | 1.45 | A | A | 3 | A | A | A | A | A | A | A |
| 90 | 90 | 0.2 | 0.5 | 0.2 | 1.45 | A | A | 3 | A | A | A | A | A | A | A |
| 91 | 91 | 0.2 | 0.4 | 0.2 | 1.45 | A | A | 3 | A | A | A | A | A | A | A |
| 92 | 92 | 0.2 | 0.4 | 0.2 | 1.45 | A | A | 3 | A | A | A | A | A | A | A |
| 93 | 93 | 0.2 | 0.4 | 0.2 | 1.45 | A | A | 8 | A | A | A | A | A | A | A |
| 94 | 94 | 0.2 | 0.4 | 0.2 | 1.45 | A | A | 3 | A | A | A | A | A | A | A |
| 95 | 95 | 0.2 | 0.4 | 0.2 | 1.45 | A | A | 3 | A | A | A | A | A | A | A |
| 96 | 96 | 0.2 | 0.4 | 0.2 | 1.45 | A | A | 3 | A | A | A | A | A | A | A |
| 97 | 97 | 0.2 | 0.4 | 0.2 | 1.45 | A | A | 3 | A | A | A | A | A | A | A |
| 98 | 98 | 0.2 | 0.4 | 0.2 | 1.45 | A | A | 3 | A | A | A | A | A | A | A |
| 99 | 99 | 0.2 | 0.6 | 0.6 | 1.45 | A | B | 3 | A | A | A | B | A | A | A |
| 100 | 100 | 0.2 | 0.4 | 0.2 | 1.45 | A | A | 3 | A | A | A | A | A | A | A |
| 101 | 101 | 0.2 | 0.4 | 0.2 | 1.45 | A | A | 3 | A | A | A | A | A | A | A |
| 102 | 102 | 0.2 | 0.4 | 0.2 | 1.45 | A | A | 3 | A | A | A | A | A | A | A |
| 103 | 103 | 0.2 | 0.4 | 0.2 | 1.45 | A | A | 3 | A | A | A | A | A | A | A |
| 104 | 104 | 0.2 | 0.6 | 0.2 | 1.45 | A | A | 3 | A | A | A | B | A | A | B |
| 105 | 105 | 0.2 | 0.4 | 0.2 | 1.45 | A | A | 3 | A | A | A | A | A | A | A |
| 106 | 106 | 0.2 | 0.4 | 0.2 | 1.45 | A | A | 3 | A | A | A | A | A | A | A |
| 107 | 107 | 0.2 | 0.4 | 0.2 | 1.45 | A | A | 3 | A | A | A | A | A | A | A |
| 108 | 108 | 0.2 | 0.4 | 0.2 | 1.45 | A | A | 3 | A | A | A | A | A | A | A |
| 109 | 109 | 0.2 | 0.2 | 0.2 | 1.45 | A | A | 5 | A | A | A | A | A | A | A |
| 110 | 110 | 0.2 | 0.2 | 0.2 | 1.45 | A | A | 5 | A | A | A | A | A | A | A |
| 111 | 111 | 0.2 | 0.2 | 0.2 | 1.45 | A | A | 5 | A | A | A | A | A | A | A |
| 112 | 112 | 0.2 | 0.4 | 0.2 | 1.45 | A | A | 3 | A | A | A | A | A | A | A |
| 113 | 113 | 0.2 | 0.4 | 0.2 | 1.45 | A | A | 3 | A | A | A | A | A | A | A |
| 114 | 114 | 0.4 | 0.4 | 0.7 | 1.45 | A | B | 5 | A | A | A | A | A | A | A |
| C.E. 1 | 115 | 0.8 | 1.2 | 0.8 | 1.45 | A | A | 3 | A | A | A | C | A | B | C |
| C.E. 2 | 116 | 0.2 | 0.4 | 0.2 | 1.35 | A | A | 15 | A | A | A | A | A | A | A |
| C.E. 3 | 117 | 0.3 | 0.5 | 0.3 | 1.45 | A | A | 3 | A | A | A | A | A | A | C |
| C.E. 4 | 118 | 0.2 | 0.8 | 0.2 | 1.45 | A | A | 3 | A | A | A | B | A | A | C |

In the Table, "C.E." indicates "comparative example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-045846, filed Mar. 16, 2020, which is hereby incorporated by reference herein in its entirety.

What is claimed is:

1. A toner, comprising:

a toner particle comprising a binder resin and organosilicon polymer particles on a surface of the toner particle; the binder resin comprising an amorphous resin and a crystalline polyester resin, wherein a concentration of methanol is 45 to 80 vol % when a transmittance of light with a wavelength of 780 nm is 50% in a wettability test of the organosilicon polymer particles using a mixed solvent of methanol/water, $|SP_{cpes}-SP_{si}|$ is not more than 2.00 $(cal/cm^3)^{1/2}$ where $SP_{si}$ is an SP value of the organosilicon polymer particles and $SP_{cpes}$ is an SP value of the crystalline polyester resin, and an amount of adsorbed water in the organosilicon polymer particles at a temperature of 30° C. and a humidity of 80% RH is not more than 20 mg/g.

2. The toner according to claim 1, wherein a coverage ratio of the organosilicon polymer particles on the surfaces of the toner particle is at least 15 area %.

3. The toner according to claim 1, wherein a content of the organosilicon polymer particles is 0.3 to 10.0 parts by mass with respect to 100 parts by mass of the toner particle.

4. The toner according to claim 1, wherein a number-average particle diameter of primary particles of the organosilicon polymer particles is 10 to 500 nm.

5. The toner according to claim 1, wherein the organosilicon polymer particles have a T3 unit structure represented by Formula (1)

$$R^1—SiO_{3/2} \quad (1)$$

where $R^1$ represents an alkyl group having 1 to 6 carbon atoms or phenyl group, and a ratio of an area of a peak originating with silicon having the T3 unit structure to a total area of peaks originating with all silicon elements contained in the organosilicon polymer particles is 0.50 to 1.00 in $^{29}$Si-NMR measurement of the organosilicon polymer particles.

6. The toner according to claim 1, wherein a ratio of oxygen atoms derived from silanol groups among oxygen atoms in the organosilicon polymer particles is not more than 40.0 mol %.

7. The toner according to claim 1, wherein a content of the crystalline polyester resin in the binder resin is 4.0 to 50.0 mass %.

8. The toner according to claim 1, wherein $SP_{cpes}$ is 9.25 to 10.80.

9. The toner according to claim 1, wherein the crystalline polyester resin comprises at least one of (a) a structure in which at least one monomer selected from the group consisting of α,ω-linear aliphatic diols having from 2 to 3 carbon atoms is polycondensed, and (b) a structure in which at least one monomer selected from the group consisting of α,ω-linear aliphatic dicarboxylic acids having from 2 to 3 carbon atoms is polycondensed.

10. The toner according to claim 1, wherein an attachment index of the organosilicon polymer particles with respect to a polycarbonate film is not more than 4.5, where attachment index=area ratio A of the organosilicon polymer particles transferred to the polycarbonate film/coverage ratio B of the organosilicon polymer particles on the surface of the toner particle×100.

11. The toner according to claim 1, wherein a dispersity evaluation index of the organosilicon polymer particles on the toner surface is 0.5 to 2.0.

12. The toner according to claim 6, wherein the ratio of oxygen atoms derived from silanol groups among oxygen atoms in the organosilicon polymer particles is 2.0 to 40.0 mol %.

13. The toner according to claim 1, wherein the amount of adsorbed water in the organosilicon polymer particles at a temperature of 30° C. and a humidity of 80% RH is 10 to 20 mg/g.

14. The toner according to claim 1, wherein (Dsi/Dt) is 0.0125 to 0.0250 when Dsi is the number-average particle diameter of primary particles of the organosilicon polymer particles, and Dt is the number-average particle diameter of the toner particle.

15. The toner according to claim 1, wherein $SP_{cpes}$ is 9.79 to 10.55.

* * * * *